US011991492B2

(12) United States Patent
Lee

(10) Patent No.: US 11,991,492 B2
(45) Date of Patent: *May 21, 2024

(54) DISPLAY APPARATUS

(71) Applicant: LG Display Co., Ltd., Seoul (KR)

(72) Inventor: Sungtae Lee, Incheon (KR)

(73) Assignee: LG DISPLAY CO., LTD., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/967,732

(22) Filed: Oct. 17, 2022

(65) Prior Publication Data

US 2023/0040802 A1 Feb. 9, 2023

Related U.S. Application Data

(63) Continuation of application No. 17/204,881, filed on Mar. 17, 2021, now Pat. No. 11,503,391, which is a continuation of application No. 17/028,973, filed on Sep. 22, 2020, now Pat. No. 11,395,055, which is a continuation of application No. 15/974,013, filed on May 8, 2018, now Pat. No. 10,820,082.

(30) Foreign Application Priority Data

May 11, 2017 (KR) ........................ 10-2017-0058946

(51) Int. Cl.

*H04R 1/02* (2006.01)
*H04R 7/04* (2006.01)
*H04R 9/02* (2006.01)

(52) U.S. Cl.

CPC ............. *H04R 1/028* (2013.01); *H04R 7/045* (2013.01); *H04R 9/022* (2013.01); *H04R 2499/15* (2013.01)

(58) Field of Classification Search

CPC ........ H04R 1/028; H04R 7/045; H04R 9/022; H04R 2499/15

See application file for complete search history.

(56) References Cited

U.S. PATENT DOCUMENTS 4,300,655 A 11/1981 Sakamoto
4,934,079 A 6/1990 Hoshi
5,930,376 A 7/1999 Markow
6,731,764 B2 5/2004 Asada et al.
8,180,074 B2 5/2012 Ko et al.

(Continued)

FOREIGN PATENT DOCUMENTS

CN 1575028 A 2/2005
CN 101043765 A 9/2007

(Continued)

OTHER PUBLICATIONS

Office Action dated May 25, 2022 in a corresponding Korean Divisional Patent application.

(Continued)

*Primary Examiner* — Suhan Ni

(74) *Attorney, Agent, or Firm* — Morgan, Lewis & Bockius LLP

(57) ABSTRACT

A display apparatus includes a display panel configured to display an image, and a sound generating device on a rear surface of the display panel and configured to vibrate the display panel to generate sound, wherein the sound generating device includes a plate, a magnet and a center pole on the plate, and an oval-shaped bobbin around the center pole.

17 Claims, 31 Drawing Sheets

(56) References Cited

U.S. PATENT DOCUMENTS

| | | | |
|---|---|---|---|
| 8,755,543 | B2 | 6/2014 | Chabanne et al. |
| 10,009,683 | B2 | 6/2018 | Choi et al. |
| 2004/0246109 | A1 | 12/2004 | Suzuki et al. |
| 2005/0069165 | A1 | 3/2005 | Wu |
| 2005/0129258 | A1 | 6/2005 | Fincham |
| 2005/0226445 | A1 | 10/2005 | Murray |
| 2006/0120542 | A1 | 6/2006 | Lee et al. |
| 2006/0182292 | A1 | 8/2006 | Aarts et al. |
| 2007/0206822 | A1 | 9/2007 | Whitwell et al. |
| 2007/0258604 | A1 | 11/2007 | Bosnecker |
| 2009/0279720 | A1 | 11/2009 | Kim et al. |
| 2010/0150392 | A1 | 6/2010 | O'neill |
| 2011/0001734 | A1 | 1/2011 | Kim |
| 2011/0044489 | A1 | 2/2011 | Saiki et al. |
| 2011/0164774 | A1 | 7/2011 | Gladwin |
| 2013/0259270 | A1 | 10/2013 | Zhou et al. |
| 2014/0056468 | A1 | 2/2014 | Kuze et al. |
| 2014/0355214 | A1 | 12/2014 | Tamai et al. |
| 2015/0326975 | A1 | 11/2015 | Takada |
| 2018/0070167 | A1 | 3/2018 | Kim et al. |
| 2018/0317011 | A1 | 11/2018 | Choi et al. |

FOREIGN PATENT DOCUMENTS

| | | | |
|---|---|---|---|
| CN | 108124224 | A | 6/2018 |
| CN | 108810760 | A | 11/2018 |
| EP | 2 892 248 | A1 | 7/2015 |
| EP | 3 331 251 | A1 | 6/2018 |
| JP | H03-106298 | A | 5/1991 |
| JP | H0723499 | A | 1/1995 |
| KR | 20060035319 | A | 4/2006 |
| KR | 20080082663 | A | 9/2008 |
| KR | 20100088810 | A | 8/2010 |
| KR | 20110003654 | A | 1/2011 |
| KR | 2011-0048742 | A | 5/2011 |
| KR | 2014-0146744 | A | 12/2014 |
| KR | 10-1704517 | B1 | 2/2017 |

OTHER PUBLICATIONS

Office Action dated Dec. 10, 2020, issued in corresponding Korean Patent Application No. 10-2017-0058946.
First Notification of Office Action dated Dec. 17, 2019, issued in corresponding Chinese patent Application No. 201810449288.9.
Office Action dated Jun. 14, 2021, issued in corresponding Korean Patent Application No. 10-2017-0058946.

DISPLAY APPARATUS

CROSS REFERENCE TO RELATED APPLICATIONS

This application is a continuation of U.S. application Ser. No. 17/204,881, filed on Mar. 17, 2021, which is a continuation of Ser. No. 17/028,973, filed on Sep. 22, 2020, which is a continuation of Ser. No. 15/974,013, filed May 8, 2018, and also claims the benefit of the Korean Patent Application No. 10-2017-0058946 filed on May 11, 2017, all of which are hereby incorporated by reference as if fully set forth herein.

BACKGROUND

Technical Field

The present disclosure relates to a display apparatus, and more particularly, to a display apparatus for generating sound by vibrating a display panel.

Discussion of the Related Art

With the advancement of an information-oriented society, various requirements for the display field of expressing information in accordance with an electric information signal are increasing, and thus, research is being conducted on various display apparatuses that are thin, light, and have low power consumption. For example, a display apparatus may be categorized by technology type into a liquid crystal display (LCD) apparatus, a field emission display (FED) apparatus, an organic light emitting display (OLED) apparatus, etc.

Among the above display apparatuses, the LCD apparatus may include an array substrate including a thin film transistor, an upper substrate including a color filter and/or black matrix, and a liquid crystal layer interposed between the array substrate and the upper substrate. An alignment state of the liquid crystal layer is controlled based on an electric field applied to two electrodes of a pixel region, whereby light transmittance is adjusted based on the alignment state of the liquid crystal layer, thereby displaying an image.

The OLED apparatus, which is a self-light emitting display device, has advantages of low power consumption, fast response speed, high light-emitting efficiency, high luminance and wide viewing angle.

SUMMARY

Generally, a display apparatus displays an image on a display panel, and an additional speaker for supplying sound has to be provided. If the speaker is provided in the display apparatus, the sound generated in the speaker is projected toward a lower or rear portion of the display panel instead of a front portion of the display panel. Thus, the sound does not project toward the front portion of the display panel, that is, a user watching the image displayed on the display panel, thereby diminishing a user's immersion. Further, as the sound generated in the speaker projects toward the lower or rear portion of the display panel, sound quality is deteriorated due to interference with sound reflected on the wall or floor. Moreover, if providing the speaker included in a set apparatus, such as a television, the speaker occupies a space so that it may impose a restriction on design and a spatial disposition of the set apparatus.

Therefore, the inventor has recognized the above-described problems and has conducted various experiments so that when watching an image in front of a display panel, a traveling direction of a sound becomes a direction toward a front surface of the display panel, and thus, sound quality is enhanced. Through the various experiments, the inventor has invented a display apparatus having a new structure, which facilitates to output sound so that a traveling direction of a sound becomes a direction toward a front direction of a display panel, thereby enhancing sound quality.

Accordingly, embodiments of the present disclosure are directed to a display apparatus that substantially obviates one or more of the problems due to limitations and disadvantages of the related art.

An aspect of the present disclosure is to provide a display apparatus including a sound generating device capable of outputting sound to a front direction of a display panel.

Another aspect of the present disclosure is to provide a sound generating device with a new structure capable of improving a low-pitched sound band and a high-pitched sound band.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other advantages and in accordance with embodiments of the disclosure, as embodied and broadly described herein, a display apparatus comprises a display panel configured to display an image, and a sound generating device on a rear surface of the display panel and configured to vibrate the display panel to generate sound, wherein the sound generating device includes a plate, a magnet and a center pole on the plate, and an oval-shaped bobbin around the center pole.

In another aspect, a display apparatus comprises a display panel configured to display an image, the display panel having a first area and a second area; first and second sound generating devices on the first and second areas, respectively; and at least one partition between the first and second areas, wherein the first and second sound generating devices are configured to vibrate the display panel to generate sound, and wherein at least one of the first and second sound generating devices has an oval shape.

In another aspect, a display apparatus comprises a display panel configured to display an image, the display panel having first, second, and third areas; a first sound generating device on one of the first, second, and third areas; a first partition between the first and third areas; and a second partition between the second and third areas, wherein the first sound generating device includes an oval-shaped sound generator and is configured to vibrate the display panel to generate sound.

Details of other embodiments are included in the detailed description and the drawings.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles. In the drawings.

DETAILED DESCRIPTION

Figure 1A:
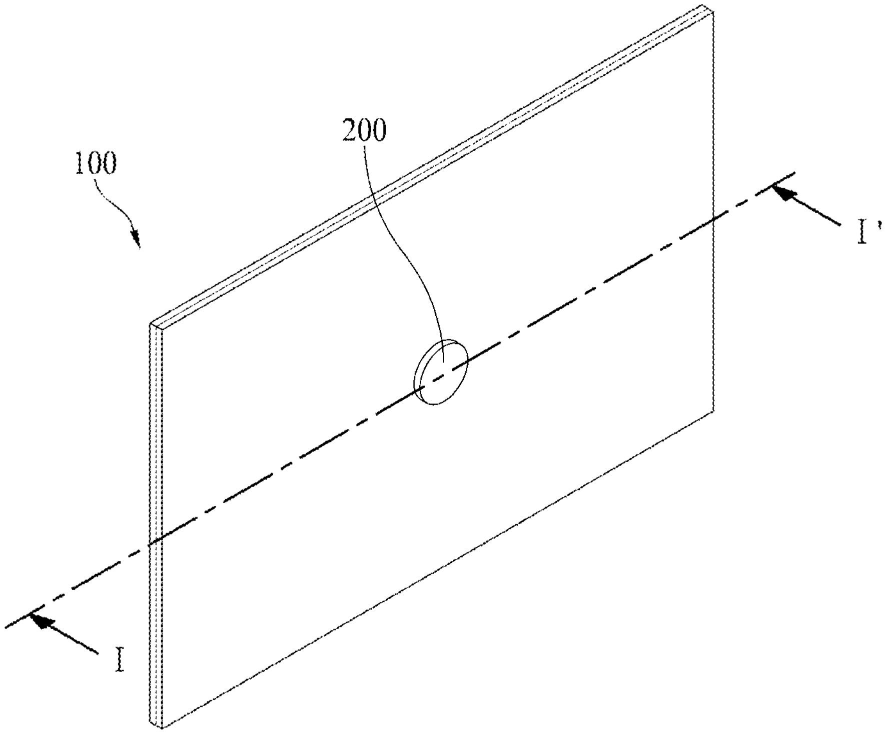
FIG. 1A illustrates a display apparatus including a sound generating device according to an embodiment of the present disclosure.

Reference will now be made in detail to the exemplary embodiments of the present disclosure, examples of which are illustrated in the accompanying drawings. Wherever possible, the same reference numbers will be used throughout the drawings to refer to the same or like parts. Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. In a case where “comprise,” “have,” and “include” described in the present specification are used, another part may be added unless “only~” is used. The terms of a singular form may include plural forms unless referred to the contrary.

In construing an element, the element is construed as including an error region although there is no explicit description.

In describing a position relationship, for example, when the positional order is described as “on~,” “above~,” “below~,” and “next~,” a case which is not contact may be included unless “just” or “direct” is used.

In describing a time relationship, for example, when the temporal order is described as “after~,” “subsequent~,” “next~,” and “before~,” a case which is not continuous may be included unless “just” or “direct” is used.

It will be understood that, although the terms “first,” “second,” etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In description of the present disclosure, the terms “first,” “second,” “A,” “B,” “(a),” “(b),” and etc. may be used herein when describing components of the present disclosure. Each of these terminologies is not used to define an essence, order or sequence of a corresponding component but used merely to distinguish the corresponding component from other component(s). It will be understood that when an element or layer is described as being “connected,” coupled,” or “adhered” to another element or layer, the element or layer can be directly connected or adhered to the other element or layer, but the other element or layer can be “disposed” between elements or layers, or elements or layers can be “connected,” “coupled,” or “adhered” to each other through the other element or layer.

In description of embodiments of the present disclosure, the display apparatus used to encompass a display apparatus, such as a liquid crystal display module (LCM) or an organic light emitting display module (OLED module), that includes a display panel and a driving unit for driving the display panel. The display apparatus in the present disclosure may further encompass a set device (or a set apparatus) or a set electronic apparatus, as a final product, such as a notebook computer or a laptop computer, a television set, a computer monitor, equipment displays (e.g., display equipment in an automotive apparatus or other type of vehicle apparatus), or a mobile electronic apparatus that is a complete product or a final product (for example, a smartphone or an electronic pad, etc.) that includes the LCM or OLED module, or the like.

Accordingly, the display apparatus according to the present disclosure is used as a display apparatus itself, such as the LCM and OLED module, and also a set apparatus, which is a final consumer apparatus or an application product including the LCM or the OLED module.

In some cases, the LCM and OLED module including a display panel and a driving unit thereof may be referred to as "display apparatus," or the electronic apparatus as a final product including the LCM and OLED module may be differently referred to as "set apparatus" or "set device." For example, the display apparatus may include a liquid crystal display (LCD) panel or an organic light emitting display (OLED) panel and a source PCB as a controller for driving the same, and the set apparatus may further include a set PCB that is a controller set to be electrically connected to the source PCB and to control the overall operations of the set device or the set apparatus.

The display panel used for the embodiment of the present disclosure may be any type of display panel, for example, a liquid crystal display panel, an organic light emitting diode display panel, an electroluminescent display panel, and etc., but it is not limited to these types. For example, the display panel of the present disclosure may be any panel capable of generating sound in accordance with a vibration by a sound generating device. The display panel used for the embodiment of the present disclosure is not limited in its shape or size.

For example, in a case of a liquid crystal display panel, it may include a plurality of gate lines, a plurality of data lines, and a plurality of pixels provided in respective intersections of the gate and data lines. The liquid crystal display panel may include an array substrate including a thin film transistor corresponding to a switching device for controlling a light transmittance for each pixel, an upper substrate including a color filter and/or black matrix, and a liquid crystal layer formed between the array substrate and the upper substrate.

In a case of an organic light emitting display panel, it may include a plurality of gate lines, a plurality of data lines, and a plurality of pixels provided in respective intersections of the gate and data lines. The organic light emitting display panel may include an array substrate including a thin film transistor corresponding to a device for selectively applying a voltage to each pixel, an organic light emitting device layer on the array substrate, and an encapsulation substrate disposed on the array substrate to cover the organic light emitting device layer. The encapsulation substrate protects the thin film transistor and the organic light emitting device layer from an external shock, and prevents moisture or oxygen from permeating into the organic light emitting device layer. The organic light emitting device layer provided on the array substrate may be changed to an inorganic light emitting layer, for example, nano-sized material layer or quantum dot material layer The display panel may further include a backing, such as a metal plate attached to a rear surface of the display panel, but the backing is not limited to the metal plate, and another structure may be included.

The display apparatus including the sound generating device according to the embodiment of the present disclosure may be implemented at a user interface module in a vehicle, such as the central control panel area in an automobile. For example, such a display panel may be configured between two front seat occupants such that sounds due to vibrations of the display panel propagate towards the interior of the vehicle. As such, the audio experience within a vehicle can be improved when compared to having speakers only at the interior sides in the vehicle.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, a display apparatus according to embodiments of the present disclosure will be described in detail with reference to the accompanying drawings.

FIG. 1A illustrates a display apparatus including a sound generating device according to an embodiment of the present disclosure.

With reference to FIG. 1A, the display apparatus includes a display panel 100 configured to display an image, and a sound generating device 200 for generating sound by vibrating the display panel 100. For example, the sound generating device 200 may be attached to or placed at a rear surface of the display panel 100 corresponding to a display area of the display panel 100 to vibrate the display panel 100, thereby generating sound. Further, the sound generating device 200 may be directly attached to the rear surface of the display panel 100 to directly vibrate the display panel. The sound generating device 200 may be referred to as an actuator, exciter, or transducer.

Figure 1B:
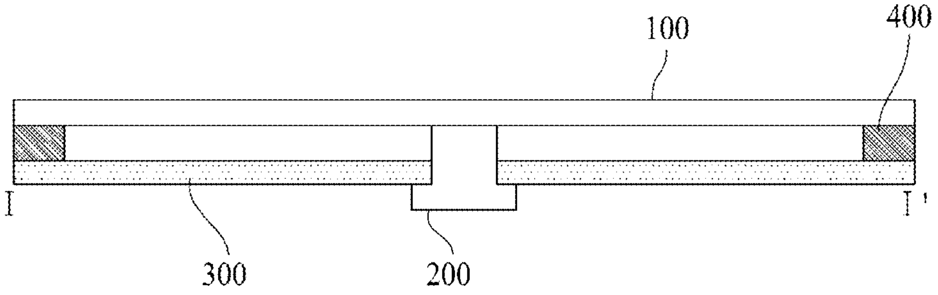
FIG. 1B is a cross-sectional view taken along I-I' of FIG. 1A.

FIG. 1B is a cross-sectional view taken along I-I' of FIG. 1A.

As shown in FIG. 1B, the display apparatus may include the sound generating device 200, and a supporting member 300. The supporting member 300 may support at least one of rear and side (lateral) surfaces of the display panel 100. The sound generating device 200 may be fixed to the supporting member 300.

In this disclosure, for example, the supporting member 300 may be a cover bottom. Alternatively, the supporting member 300 may further include a middle cabinet provided to surround a lateral surface of the display panel 100, connected with the cover bottom, and provided to accommodate one periphery of the display panel 100 so as to support the display panel 100. For example, the middle cabinet may have a "┤"-shaped cross section. The supporting member 300 may include the cover bottom, or may include the cover bottom and the middle cabinet, but is not limited to this structure. The supporting member 300 may include any structure capable of supporting the rear surface or lateral surface of the display panel 100. The supporting member 300 may be a plate-shaped member formed over a rear surface or entire surface of the display panel 100.

The supporting member 300 according to the present disclosure may be referred to as a cover bottom, a plate bottom, a back cover, a base frame, a metal frame, a metal chassis, a chassis base, or a m-chassis. Thus, the supporting member 300 may be embodied in all types of frame or plate-shape structures that may be used as a support for supporting the display panel 100 and disposed at the rear surface of the display apparatus.

An adhesion member 400 may be disposed in the periphery of the supporting member 300 and the display panel 100. The adhesion member 400 is provided to adhere the display panel 100 and the supporting member 300 to each other, and the adhesion member 400 may be a double-sided tape, but is not limited thereto.

Figure 2A:
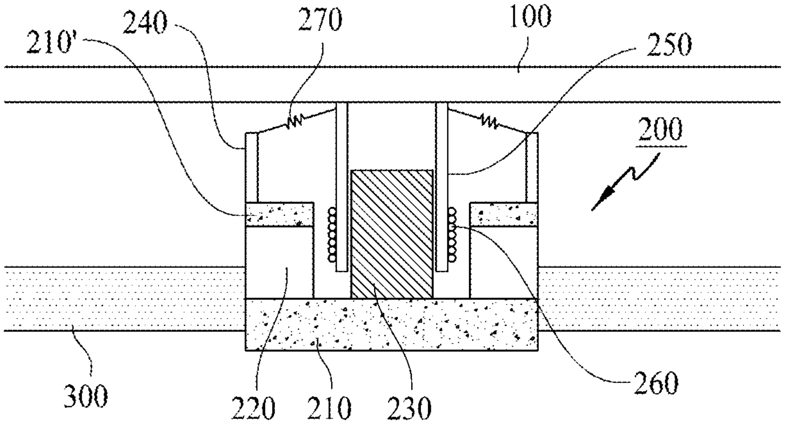
FIGS. 2A and 2B are cross-sectional views illustrating the sound generating device according to an embodiment of the present disclosure.
Figure 2B:
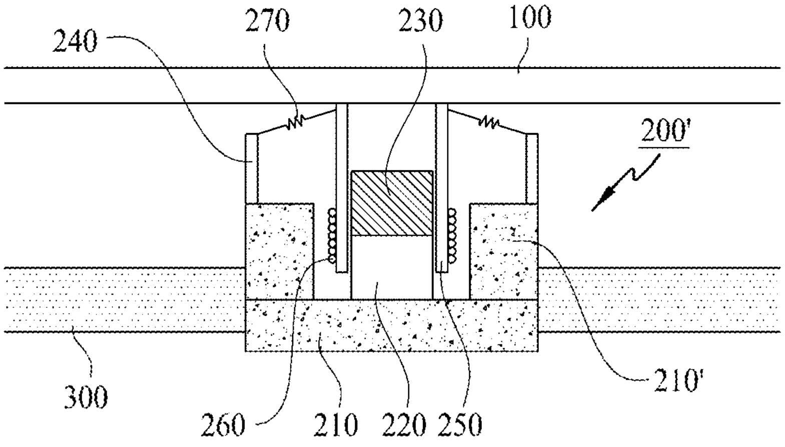

FIGS. 2A and 2B are cross-sectional views illustrating the sound generating device according to the embodiment of the present disclosure.

The sound generating device may be categorized into a first structure corresponding to an external magnetic type where a magnet is disposed at an external side of a coil, and a second structure corresponding to an internal magnetic type where a magnet is disposed at an internal side of a coil. The first structure may be expressed as a dynamic type or external magnetic type, and the second structure may be expressed as a micro type or internal magnetic type.

FIG. 2A illustrates the first structure, and FIG. 2B illustrates the second structure.

As illustrated in FIG. 2A, the sound generating device 200 may include plates 210 and 210', a magnet 220 on the plate 210, a center pole 230 on the plate 210, a bobbin 250 disposed around the center pole 230, and a coil 260 wound on an outer surface of the bobbin 250. For example, the magnet 220 may be disposed on the first plate 210, and the second plate 210' may be disposed on the magnet 220. The first plate 210 and the second plate 210' support the magnet 220, and fix the sound generating device 200 to the supporting member 300. Accordingly, the first plate 210 may be fixed to a supporting hole formed in the supporting member 300, and the magnet 220 may be fixedly supported between the first plate 210 and the second plate 210'.

At least one of the first plate 210 and the second plate 210' may be formed of a magnetic material such as iron (Fe). The first plate 210 and the second plate 210' are not limited to these terms, and they may be referred to as yokes.

The magnet 220 may use a sintered magnet of barium ferrite, and the magnet 220 may be formed of ferric oxide ($Fe2O_3$), barium carbonate ($BaCO_3$), neodymium (Nd) magnet, strontium ferrite with improved magnetic component, aluminum (Al), nickel (Ni), or alloy-casting magnet of cobalt (Co), but is not limited to these materials. For example, the neodymium magnet may be neodymium-iron-boron (Nd—Fe—B).

Then, a frame 240 is disposed on the second plate 210' along the periphery of the first plate 210. The center pole 230 is disposed on the center of the first plate 210. The center pole 230 and the first plate 210 may be formed as one body. The center pole 230 may be referred to as pole pieces. Pole pieces may be additionally provided on the center pole 230.

The bobbin 250 is disposed to surround the center pole 230. The coil 260 is wound on a lower outer area, for example, a lower outer surface of the bobbin 250, and a current or a voice signal for generating sound is applied to the coil 260.

The coil 260 may be wound on some area of the lower portion of the bobbin 250. The bobbin 250 and the coil 260 may be expressed as a voice coil. A damper 270 may be disposed between some area of an upper portion of the bobbin 250 and the frame 240, and the damper 270 may be expressed by other terms, such as an edge.

FIG. 2B illustrates the second structure where a magnet is disposed at an internal side of a coil.

As shown in FIG. 2B, the sound generating device 200' of the second structure may include a magnet 220 on a first plate 210, a center pole 230 on the magnet 220, a bobbin 250 disposed around the magnet 220 and the center pole 230, and a coil 260 wound on an outer surface of the bobbin 250. Here, the first plate 210 may be fixed to a supporting hole of the supporting member 300. The magnet 220 is disposed on the first plate 210, and the center pole 230 is disposed on the magnet 220. The center pole 230 may be referred to as pole pieces. Pole pieces may be additionally provided on the center pole 230. The bobbin 250 is disposed to surround the magnet 220 and the center pole 230, and the coil 260 is wound on the outer surface of the bobbin 250.

A second plate 210' is disposed on the periphery of the first plate 210, and a frame 240 is disposed outside the periphery of the second plate 210'. A damper 270 is disposed between the frame 240 and the bobbin 250.

In comparison to the first structure where the magnet is disposed at the external side of the coil, the second structure has advantages of small leakage magnetic flux and decreased entire size of the sound generating device.

The sound generating device used for the display apparatus according to the embodiment of the present disclosure is not limited to the structures of the FIGS. 2A and 2B. It is possible to use any sound generating device capable of generating the sound by vibrating the display panel.

Figure 3A:
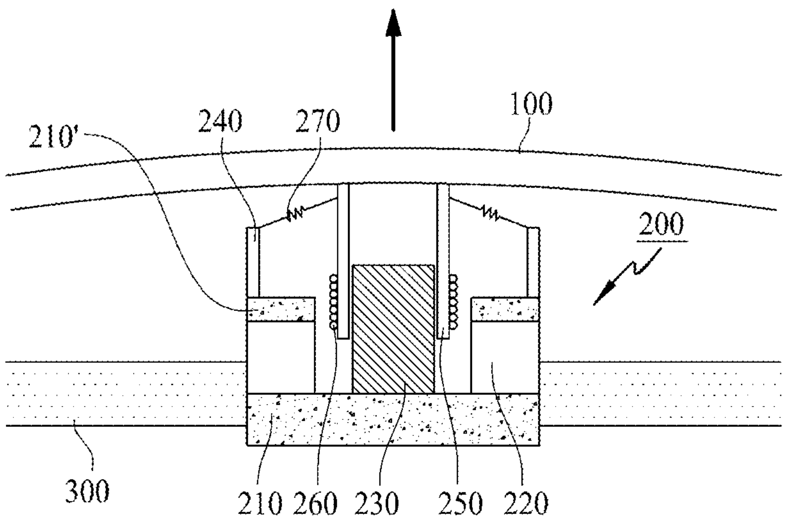
FIGS. 3A and 3B illustrate a sound generating method of the sound generating device with a first structure according to an embodiment of the present disclosure.
Figure 3B:
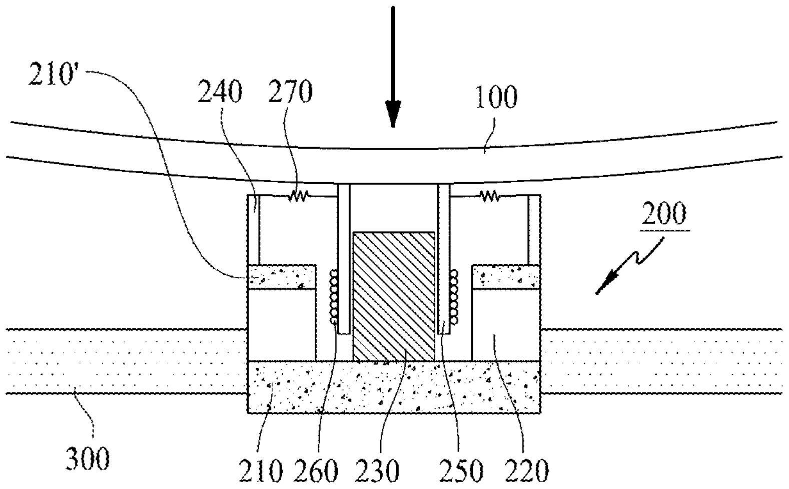

FIGS. 3A and 3B illustrate a sound generating method of the sound generating device with the first structure according to an embodiment of the present disclosure. FIG. 3A shows a state in which a current is applied.

The center pole 230 connected with a lower surface of the magnet 220 becomes the N pole, and the second plate 210' connected with an upper surface of the magnet 220 becomes the S pole, whereby an external magnetic field is generated between the coil 260. In this state, if the current for generating sound is applied to the coil 260, an applied magnetic field is formed around the coil 260, whereby a force for upwardly moving the bobbin 250 is generated by the applied magnetic field and the external magnetic field. If the current is applied to the coil 260, the magnetic field is generated around the coil 260, and the external magnetic field is generated by the magnet 220, whereby the entire bobbin 250 is guided and moved upward by the center pole 230 based on Fleming's law.

Because one surface of the bobbin 250 is in contact with the rear surface of the display panel 100, the display panel 100 is vibrated in an upper direction (indicated by an arrow) according to whether or not the current is applied to the coil 260, and a sound wave (or sound) is generated by the vibration of the display panel 100. In this state, if the current is stopped or a current is applied in the opposite direction, as shown in FIG. 3B, a force of downwardly moving the bobbin 250 is generated based on principles of FIG. 3A, whereby the display panel 100 is vibrated in a lower direction (indicated by an arrow).

The damper 270 is disposed between the frame 240 and the upper portion of the bobbin 250. The damper 270 is formed with a wrinkled structure having elasticity, whereby the damper 270 controls the up-and-down vibration of the bobbin 250 by contraction and relaxation movements in accordance with the up-and-down movement of the bobbin 250. That is, the damper 270 is connected with the bobbin 250 and the frame 240, whereby the up-and-down vibration of the bobbin 250 may be controlled by a restoring force of the damper 270. If the bobbin 250 vibrates to be higher or lower than a predetermined height, the bobbin 250 may be restored to its original position by the restoring force of the damper 270.

According to the direction and level of the current applied to the coil 260, the display panel 100 may be vibrated in the up-and-down direction so that it is possible to generate sound waves by the vibration.

Figure 4A:
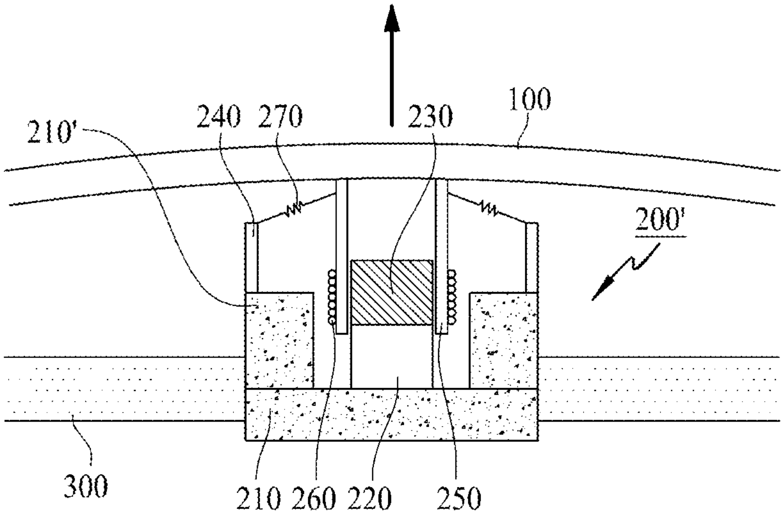
FIGS. 4A and 4B illustrate a sound generating method of the sound generating device with a second structure according to an embodiment of the present disclosure.
Figure 4B:
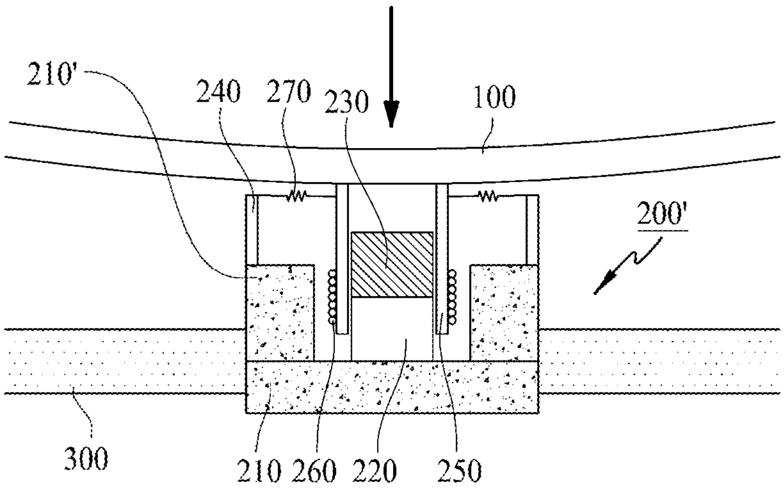

FIGS. 4A and 4B illustrate a sound generating method of the sound generating device with the second structure according to an embodiment of the present disclosure. FIG. 4A shows a state in which a current is applied.

The second plate 210' becomes the S pole, and the center pole 230 connected with an upper surface of the magnet 220 becomes the N pole, whereby an external magnetic field is generated between the coil 260. These may be opposite polarities to those described above. A same operation can be realized by changing a winding direction of the coil 260. In this case, if the current for generating sound is applied to the coil 260, an applied magnetic field is formed around the coil 260, whereby a force for upwardly moving the bobbin 250 is generated by the applied magnetic field and the external magnetic field. Here, if the current is applied to the coil 260, the magnetic field is generated around the coil 260, and the external magnetic field is generated by the magnet 220, whereby the entire bobbin 250 is guided and moved upward by the center pole 230 based on Fleming's law.

Because one surface of the bobbin 250 is in contact with the rear surface of the display panel 100, the display panel 100 is vibrated in an upper direction (indicated by an arrow) according to whether or not the current is applied to the coil 260, and a sound wave (or sound) is generated by the vibration of the display panel 100.

In this state, if the current is stopped or a current is applied in the opposite direction, as shown in FIG. 4B, a force of downwardly moving the bobbin 250 is generated based on principles of FIG. 4A, whereby the display panel 100 is vibrated in a lower direction (indicated by an arrow).

The damper 270 is disposed between the frame 240 and some portion of the upper portion of the bobbin 250. The damper 270 is formed with a wrinkled structure having elasticity, whereby the damper 270 controls the up-and-down vibration of the bobbin 250 by contraction and relaxation movements in accordance with the up-and-down movement of the bobbin 250. That is, the damper 270 is connected with the bobbin 250 and the frame 240, whereby the up-and-down vibration of the bobbin 250 may be controlled by a restoring force of the damper 270. If the bobbin 250 vibrates to be higher or lower than a predetermined height, the bobbin 250 may be restored to its original position by the restoring force of the damper 270. Accordingly, the display panel 100 may be vibrated in the up-and-down direction in accordance with the direction and level of the current applied to the coil 260, thereby generating sound waves by the vibration.

If providing one sound generating device, a sound pressure level might be small. To improve the sound pressure, it is possible to provide two sound generating devices, which will be described with reference to FIGS. 5A, 5B, and 6.

Figure 5A:
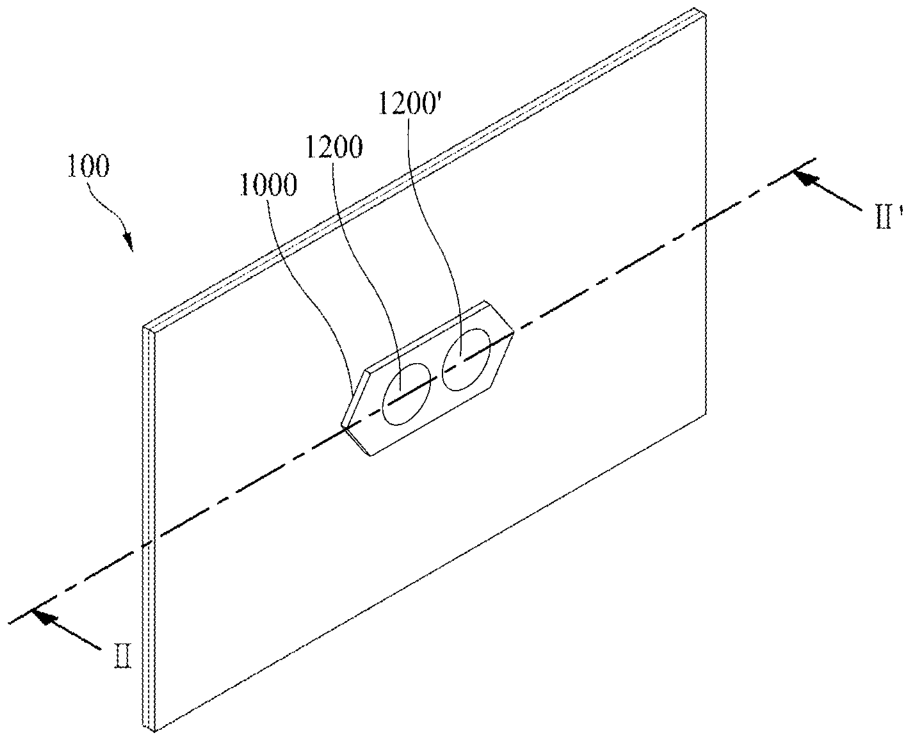
FIG. 5A illustrates a sound generating device according to another embodiment of the present disclosure.
Figure 5B:
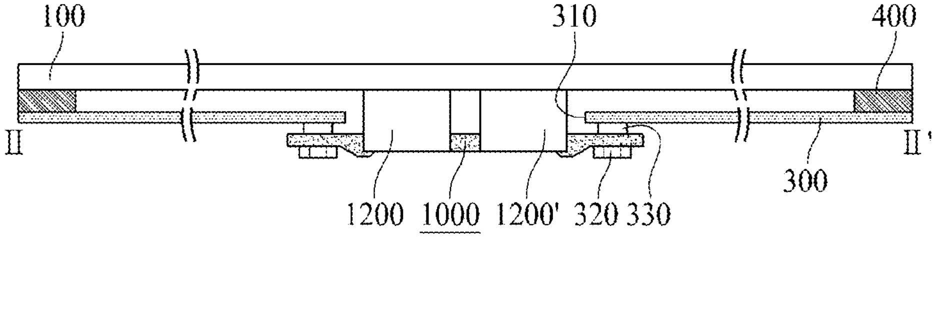
FIG. 5B is a cross-sectional view taken along II-II' of FIG. 5A.

FIG. 5A is a plane view illustrating a sound generating device according to another embodiment of the present disclosure, and FIG. 5B is a cross-sectional view taken along II-II' of FIG. 5A.

With reference to FIG. 5A, a display apparatus may include a display panel 100 configure to display an image, and first and second sound generating devices 1200 and 1200' for generating sound by vibrating the display panel 100. The first sound generating device 1200 and the second sound generating device 1200' are disposed adjacent to each other. If providing the plurality of sound generating devices spaced apart from one another, it is difficult to maintain uniformity of contact characteristics between the sound generating device and the display panel, which might cause deterioration of sound quality by interference or delay phenomenon of the plurality of the sound generating devices.

The display apparatus may include a fixing device 1000 for fixing the first sound generating device 1200 and the second sound generating device 1200'. The fixing device 1000 may be a mold structure manufactured by a molding process using a plastic material, but is not limited thereto. The fixing device 1000 will be described with reference to FIG. 6.

The first sound generating device 1200 and the second sound generating device 1200' may be applied with the aforementioned first or second structure described in FIGS. 2A and 2B.

With reference to FIG. 5B, the display apparatus may include the first sound generating device 1200, the second sound generating device 1200', and a supporting member 300.

The supporting member 300 may support at least one of rear and side surfaces of the display panel 100. The supporting member 300 may be a plate-shaped member of a metal or plastic material over a rear surface or an entire surface of the display panel 100.

The sound generating devices 1200 and 1200' may be accommodated in a supporting hole 310 provided to the supporting member 300. If the sound generating devices 1200 and 1200' are inserted into and fixed to the supporting hole 310, it is possible to decrease a height of the sound generating device 1200 and 1200' disposed between a rear surface of the display panel 100 and an inner surface of the supporting member 300, thereby realizing a small space or area for generating the sound.

The display apparatus may include a nut 330 fixed to the supporting member 300. The fixing device 1000 may be fixed to the nut 330 by the use of screw 320 inserted into a hole of the fixing device 1000. A screw through hole is formed inside the nut 330. Thus, after aligning the hole of the fixing device 1000 and the screw through hole of the nut 330, the screw 320 is tightened up so that the fixing device 1000 is fixed to the supporting member 300.

For example, the nut 330 may be a self-clinching nut. One example of the self-clinching nut may be a PEM® nut. If using a self-clinching nut, the vibration generated in the sound generating devices 1200 and 1200' is partially absorbed in the self-clinching nut so that the vibration transferred to the supporting member 300 may be reduced.

In the display apparatus according to the present disclosure, the supporting member 300 and the sound generating devices 1200 and 1200' are fixed to each other by using the nut and screw included in the supporting member 300 so that a thickness of the display panel 100 can be reduced.

An adhesion member 400 may be disposed in the periphery of the supporting member 300 and the display panel 100, thereby adhering the display panel 100 and the supporting member 300 to each other. The adhesion member 400 may be a double-sided tape.

Figure 6:
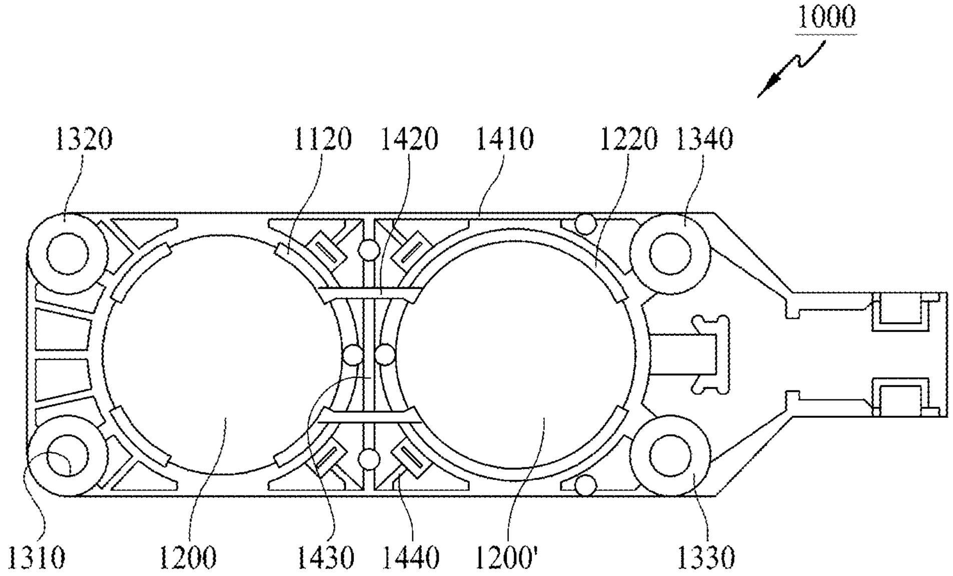
FIG. 6 illustrates a fixing device of the sound generating device according to another embodiment of the present disclosure.

FIG. 6 illustrates another embodiment of the fixing device in the sound generating device according to the present disclosure.

As illustrated in FIG. 6, the fixing device 1000 of the sound generating device may be an integrated type fixing device for supporting and fixing the first sound generating device 1200 and the second sound generating device 1200' being adjacent to each other. Thus, the first sound generating device 1200 and the second sound generating device 1200 fixed to each other using fixing device 1000 may be a pair of sound generating devices, which will be referred to as a pair of sound generating devices.

The fixing device 1000 of the sound generating devices may include a supporting portion for supporting the sound generating devices 1200 and 1200', a plurality of rib portions disposed in the periphery of the sound generating devices 1200 and 1200', and a plurality of mounting holes for fixing the fixing device 1000 and the supporting member 300 to each other. For example, the supporting portion may include a first supporting portion 1120 for supporting the first sound generating device 1200, and a second supporting portion 1220 for supporting the second sound generating device 1200'. The first supporting portion 1120 supports predetermined portions of lateral and rear surfaces of the first sound generating device 1200, and the first supporting portion 1120 may have a cylinder shape. The second supporting portion 1220 supports predetermined portions of lateral and rear surfaces of the second sound generating device 1200', and the second supporting portion 1220 may have a cylinder shape.

The first supporting portion 1120 and the second supporting portion 1220 may further include protrusions having two or four circular-arc shape. Herein, one surface of each of the protrusions is bent toward the inside of each sound generating device 1200 and 1200' so that it is possible to support a predetermined portion of a rear surface of each sound generating device 1200 and 1200', thereby preventing the sound generating devices 1200 and 1200' from being separated from the fixing device 1000.

The plurality of rib portions may be disposed in the periphery of the first supporting portion 1120 and the second supporting portion 1220, thereby maintaining hardness of the fixing device 1000 and preventing a deformation of the fixing device 1000 of the sound generating devices even in a case of long-time use. For example, the rib portion may include a first rib portion 1410 extending in a horizontal direction at the outer surface of the first supporting portion 1120 and the second supporting portion 1220, a second rib portion 1420 for connecting the first supporting portion 1120 and the second supporting portion 1220 with each other in the horizontal direction, and a third rib portion 1430 connected with the first rib portion 1410 in a vertical direction. Herein, the horizontal direction is a direction of a long side along which a pair of sound generating devices is disposed, and the vertical direction is a direction which is perpendicular to the horizontal direction. For example, the horizontal direction may be referred to as a landscape direction of the display panel, and the vertical direction may be referred to as a portrait direction of the display panel.

The first rib portion 1410 extends from the outer surface of the first supporting portion 1120 and the second supporting portion 1220 in the horizontal direction, to thereby form a horizontal-direction external structure of the fixing device 1000 of the sound generating devices. A central area of the first rib portion 1410, that is, the central area between the first supporting portion 1120 and the second supporting portion 1220 may be relatively higher or thicker than each of both side areas of the first rib portion 1410. Accordingly, even though a pair of sound generating devices is vibrated for a long time period, it is possible to prevent the fixing device 1000 of the sound generating devices from being deformed, and to reduce a change in the relative position between the display panel and a pair of sound generating devices.

The at least one second rib portion 1420 may be disposed inside the first rib portion 1410, and the second rib portion 1420 may be connected with the first supporting portion 1120 and the second supporting portion 1220 and formed as one body with the first supporting portion 1120 and the second supporting portion 1220. In FIG. 6, two second rib portions 1420 are shown, but the configuration is not limited thereto. For example, one, or three or more of the second rib portions 1420 may be provided.

At least one third rib portion 1430 may be disposed between two of the second rib portions 1420 or two of the first rib portions 1410, and the third rib portion 1430 may be extended in the transverse direction, and integrally connected to the first rib portion 1410 and the second rib portion 1420. In FIG. 6, one of the third rib portions 1430 is included, and the third rib portion 1430 may extend long between two of the first rib portions 1410, but the configuration is not limited thereto. For example, the third rib portion 1430 may extend short between two of the second rib portions 1420.

The rib portion may further include at least one fourth rib portion 1440 disposed between the first supporting portion 1120 and the first rib portion 1410, or between the second supporting portion 1220 and the first rib portion 1410, the at least one of fourth rib portion 1440 may be obliquely extended so as to prevent the fixing device 1000 of the sound generating devices from being bent and deformed by heat generated during a long-time use.

Accordingly, the display apparatus according to the present disclosure includes the fixing device 1000 for fixing a pair of sound generating devices, and the plurality of rib portions in the periphery of the sound generating devices so that it is possible to maintain hardness or rigidness of the sound generating devices, and to reduce the change of sound output characteristics even in a case of long-time use.

A distance between the first supporting portion 1120 and the second supporting portion 1220 may be larger than a minimum threshold value for forming the rib portion, and may be smaller than a maximum threshold value corresponding to a diameter of each of the first sound generating device 1200 and the second sound generating device 1200'. If the distance between the first supporting portion 1120 and the second supporting portion 1220 is greater than the minimum threshold value, the sound quality may be deteriorated. The distance between the first supporting portion 1120 and the second supporting portion 1220 is smaller than the diameter of each of the first sound generating device 1200 and the second sound generating device 1200', to thereby prevent deterioration of the sound quality. For example, if the sound generating device has size (diameter) ‘D’, the distance between the first supporting portion 1120 and the second supporting portion 1220 is set to be a value which is larger than about 7 mm corresponding to the minimum critical value, and is smaller than the size ‘D’ of the sound generating device. If the size ‘D’ of the sound generating device is about 28 mm, in case of about 0.85D (about 23.6 mm), there is only a slight difference in the sound output characteristics.

There are the plurality of mounting holes 1310, 1320, 1330, and 1340 for fixing the fixing device 1000 and the supporting member 300 to each other. The screw through hole is formed in the inner surface of the nut 330 shown in FIG. 5B. Thus, after aligning the mounting hole 1310, 1320, 1330, and 1340 of the fixing device 1000 and the screw through hole of the nut 330, the screw 320 is tightened up so that the fixing device 1000 is fixed to the supporting member 300.

Figure 7:
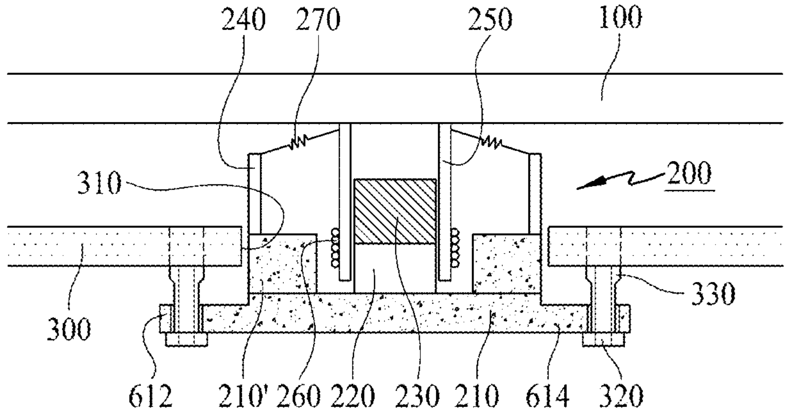
FIG. 7 illustrates a connection structure between the sound generating device and a supporting member according to the embodiment of the present disclosure.

FIG. 7 illustrates a connection structure between the sound generating device and the supporting member according to another embodiment of the present disclosure.

Embodiments of the present disclosure may be applied to both the first and second structures of the sound generating device. Hereinafter, an example of the second structure of the sound generating device will be described in detail.

As shown in FIG. 7, the sound generating device 200 may include a diameter expanding portion 614, and the diameter expanding portion 614 is formed as one body with the first plate 210 of the sound generating device 200. The first plate 210 of the sound generating device 200 is not a cylinder shape. Herein, one portion of the first plate 210 has a protrusion portion that is larger than a diameter of the remaining area of the first plate 210. The protrusion portion with a relatively-large diameter may be referred to as the diameter expanding portion 614. The diameter expanding portion 614 may have a ring shape, and an extension portion 612 for fixation of the sound generating device 200 is formed in a predetermined portion of the diameter expanding portion 614.

In the extension portion 612, there are a screw 320 and a nut 330. Using the nut 330 fixed to the supporting member 300, the sound generating device 200 is connected with the supporting member 300 by the screw 320. For example, the nut 330 may be a self-clinching nut. One example of a self-clinching nut may be a PEM® nut. If using a self-clinching nut, the vibration generated in the sound generating device 200 is partially absorbed in the self-clinching nut so that the vibration transferred to the supporting member 300 can be reduced.

The bobbin 250 of the sound generating device 200 is attached to the display panel 100. An adhesion member may be additionally provided to adhere the display panel 100 and one surface of the bobbin 250 to each other, and the adhesion member may be a double-sided tape.

The display apparatus may further include a heat-dissipation member disposed on the sound generating device 200 so that heat generated by the vibration of the sound generating device 200 is dissipated. The heat-dissipation member is disposed between the display panel 100 and the adhesion member. The heat-dissipation member prevents the heat from being transmitted from the sound generating device 200 to the display panel 100. The heat generated in the sound generating device 200 is diffused to the wide area or whole area by the heat-dissipation member so that deterioration of picture quality in the display panel 100 caused by a sudden temperature change in a local area of the display panel 100 overlapped with the sound generating device 200 can be prevented.

The heat-dissipation member may be embodied in a polygonal or circular plate shape having a uniform thickness, and a size of the heat-dissipation member is relatively larger than a size of the sound generating device 200. The heat-dissipation member may be provided on the entire rear surface of the display panel 100. For example, the heat-dissipation member may be embodied in a heat-dissipation sheet or heat-dissipation tape of a metal material with high thermal conductivity, for example, aluminum (Al), copper (Cu), silver (Ag), and their alloys.

If the circular sound generating device is applied to the display panel, a sound pressure may be lowered. To overcome this problem, as shown in FIGS. 5 and 6, a pair of sound generating devices may be applied to the display panel. When a pair of sound generating devices is applied to the display panel, it is possible to improve the sound output characteristics. However, when a pair of sound generating devices is applied to the display panel, an eccentric vibration might occur due to a mutual interference between the two sound generating devices included in one pair, which causes changes in the sound characteristics of the high-pitched sound band. In order to overcome this problem, sound generating devices capable of improving the sound characteristics in the low-pitched sound band, middle-pitched sound band and high-pitched sound band have been researched and studied, which will be described in detail as follows.

Figure 8A:
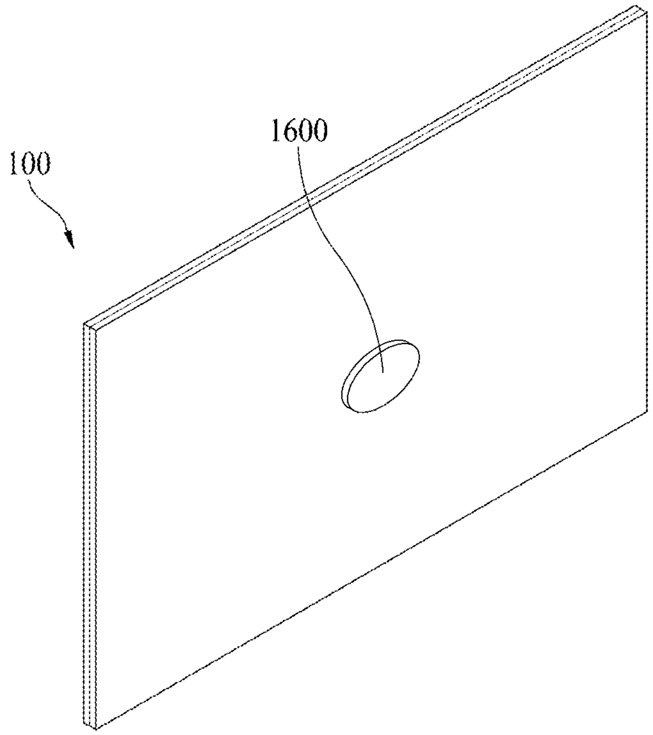
FIGS. 8A and 8B illustrate a sound generating device according to another embodiment of the present disclosure.
Figure 8B:
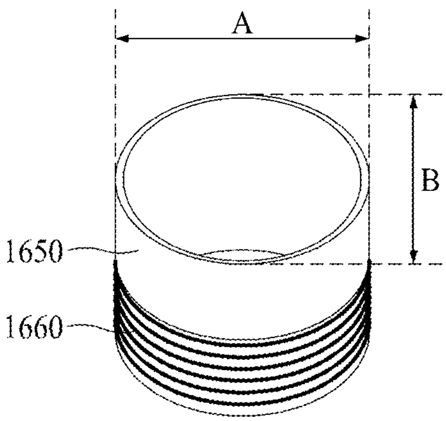

FIGS. 8A and 8B illustrate a sound generating device according to another embodiment of the present disclosure. As shown in FIG. 8A, the sound generating device 1600 may include a magnet disposed on the plate, a center pole on the plate, a bobbin disposed around the center pole, and a coil wound on an outer surface of the bobbin as described in FIG. 2.

If providing a pair of sound generating devices, a horizontal vibration or lateral vibration in the high-pitched sound might occur due to a mutual interference between the pair of sound generating devices. Thus, one sound generating device is provided to overcome the horizontal vibration or lateral vibration in the high-pitched sound. If one sound generating device is formed in a circular shape, a size of the sound generating device is increased, and furthermore, it is difficult to improve the sound output characteristics in the high-pitched sound. To overcome these problems, various experiments for applying non-circular sound generating devices have been conducted. In comparison to the circular sound generating device, the non-circular sound generating devices are more suitable to reduce the horizontal vibration or lateral vibration caused by the up-and-down vibration of the bobbin.

For example, the horizontal vibration or lateral vibration may be caused by a weight of the bobbin. This is because that the sound pressure is influenced by an abnormal vibration generated when the display panel is vibrated by the weight of the bobbin. The weight of the bobbin is influenced by a weight of the coil wound around the bobbin. Thus, in order to decrease the weight of the coil, various experiments have been conducted. Based on experiment results, the coil is formed of relatively-light aluminum (Al) instead of copper (Cu).

To prevent picture quality of the display panel from being deteriorated by the heat generated in the coil and transferred to the bobbin, the coil is formed of a material with good heat-dissipation characteristics. Heat conductivity of aluminum (Al) is relatively higher than heat conductivity of copper (Cu), whereby the coil of aluminum (Al) is favorable to improvement of the heat-dissipation characteristics.

If providing the coil of aluminum (Al), a soldering process for a manufacturing process of the sound generating device is not easy due to an oxide film in air. Thus, a metal layer for cladding the coil of aluminum (Al) is additionally provided. The metal layer may include a first metal layer for dispersing the heat of the sound generating device 1600, and a second metal layer for covering the first metal layer. The first metal layer may be formed of aluminum (Al), and the second metal layer may be formed of one among copper (Cu), silver (Ag) and gold (Au). For example, a copper clad aluminum wire (CCAW), that is, a wire formed of aluminum (Al) cladded with copper (Cu), can be provided. Herein, the second metal layer is thinly formed on an outer surface of the first metal layer of aluminum (Al). Thus, the weight of the coil is not influenced by the second metal layer. If the coil is included the metal layer for cladding aluminum (Al), the weight of the coil may be reduced by about 60% in comparison to the coil of copper (Cu).

The bobbin may be formed of a material with good heat-dissipation characteristics so as to prevent picture quality of the display panel from being deteriorated by the heat generated in the coil and transferred to the bobbin. Based on various experiments, the bobbin may be formed of a polyimide film with good heat-dissipation characteristics. The polyimide film does not change physical characteristics within a wide temperature range from −273° C. to +400° C., and has heat resistance, electric insulation, flexibility and noninflammability. And the polyimide film has good thermal and mechanical strengths, thereby improving reliability on the bobbin. The polyimide film has good heat-dissipation characteristics so that it is possible to reduce the heat by the vibration of the bobbin. For example, the polyimide film may be KAPTON, which may be condensation of pyromellitec dianhydride and 4,4'-oxydianiline.

As shown in FIG. 8B, the coil 1660 is wound around the bobbin 1650. The bobbin 1650 is formed in an oval shape. An oval shape may include an elliptical shape, an egg-shape, a rectangular shape with rounded corners, or other non-circular curved shape having a width different than its height. In case of the oval-shaped bobbin 1650, a ratio of a long axis diameter (A) to a short axis diameter (B) is 1.3~2:1. For example, the long axis diameter (A) may be 42.5 mm, and the short axis diameter (B) may be 28.5 mm, but is not limited to these values. The bobbin 1650 may be formed of the polyimide film. The coil 1660 may be formed in a structure including an aluminum layer and another layer for cladding the aluminum layer, for example, the another layer formed of one among copper (Cu), silver (Ag) and gold (Au).

Because the bobbin 1650 is provided in the oval shape, and formed of the polyimide film, and the coil 1660 is formed of aluminum (Al) cladded with one among copper (Cu), silver (Ag), and gold (Au), it is possible to provide the display panel with the sound generating device capable of decreasing the weight of the coil, improving the sound output characteristics in the high-pitched sound band, and improving the heat-dissipation characteristics. The sound output characteristics will be described with reference to FIG. 9. Further, it is possible to reduce the heat by the vibration of the bobbin included in the sound generating device, whereby a temperature of the sound generating device may be lowered, which will be described with reference to FIG. 10.

Figure 9:
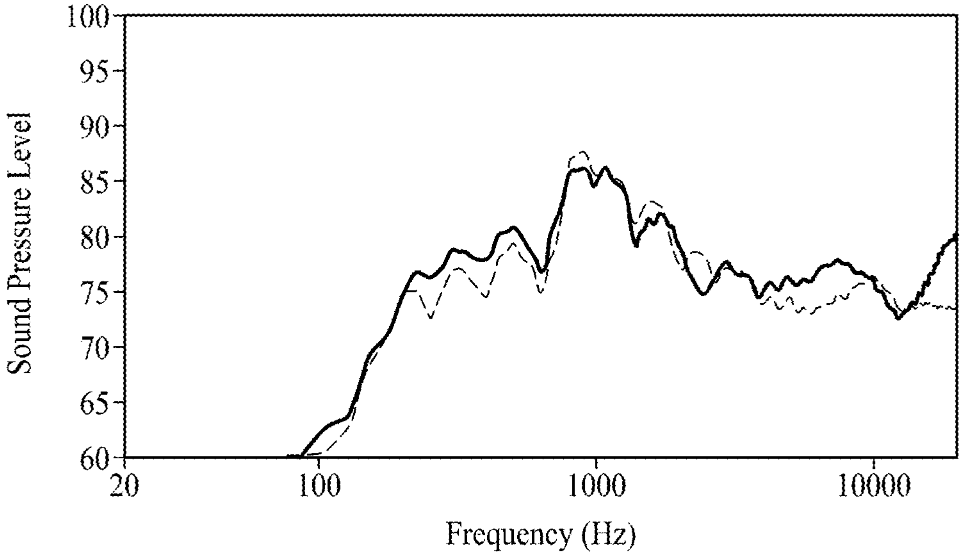
FIG. 9 illustrates the sound output characteristics in the sound generating device according to another embodiment of the present disclosure.

FIG. 9 illustrates the sound output characteristics of the sound generating device according to another embodiment of the present disclosure.

In FIG. 9, a dotted line indicates the sound output characteristics in a pair of sound generating devices, and a solid line indicates the sound output characteristics in the oval-shaped sound generating device. Herein, the horizontal axis indicates the frequency (Hz), and the vertical axis indicates the sound pressure level (dB).

The sound output characteristics may be measured by a sound analyzing apparatus. The sound analyzing apparatus may include a sound card for receiving sound from a control PC, and transmitting sound to the control PC, an amplifier for amplifying the sound generated from the sound card, and transmitting the amplified sound to the sound generating device, and a microphone for collecting the sound generated in the display panel through the sound generating device. The sound collected in the microphone is provided to the control PC through the sound card, and then the control PC checks the provided sound, and analyzes the sound of the sound generating device.

As shown in FIG. 9, if applying the oval-shaped sound generating device, it is possible to improve the sound output characteristics in the middle-pitched sound band of 200 Hz or more than 200 Hz. For example, the sound output characteristics of the sound between 200 Hz and 500 Hz may be improved. Thus, the sound output characteristics can be improved in the high-pitched sound band of 3 kHz or more than 3 kHz. For example, the sound output characteristics of the sound between 5 kHz and 8 kHz may be improved.

Figure 10A:
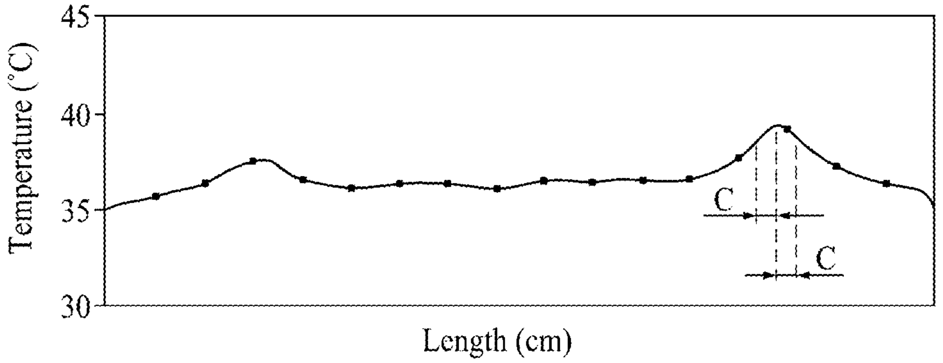
FIGS. 10A and 10B illustrate temperature measurement results in the sound generating device according to another embodiment of the present disclosure.
Figure 10B:
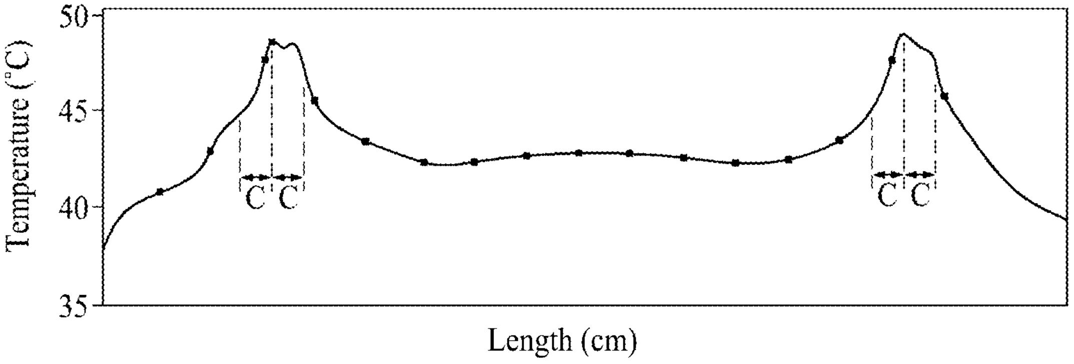

FIGS. 10A and 10B shows temperature measurement results in the sound generating device according to another embodiment of the present disclosure.

FIG. 10A shows temperature measurement results when the oval-shaped sound generating device is applied, and FIG. 10B shows temperature measurement results when a pair of sound generating devices is applied. Herein, the horizontal axis indicates a length (cm) of the display panel, and the vertical axis indicates a temperature (° C.). The temperature is measured by the use of thermo-graphic camera, and the temperature of the sound generating device disposed on the display panel is measured.

In FIG. 10A, the temperature difference from the center of the sound generating device to a left or right point spaced by ‘C’ is indicated as ‘ΔT’. Herein, ‘C’ is about 45 mm, and ‘ΔT’ in the oval-shaped sound generating device is measured to be about 1° C. With reference to FIG. 10B, ‘ΔT’ in a pair of sound generating devices is measured to be about 3.2° C.

Accordingly, if applying the oval-shaped sound generating device, the temperature of the sound generating device is lowered so that the heat generation by the vibration of the bobbin is reduced. Thus, it is possible to prevent picture quality of the display panel from being deteriorated by the heat generated by the driving of the sound generating device.

Figure 11A:
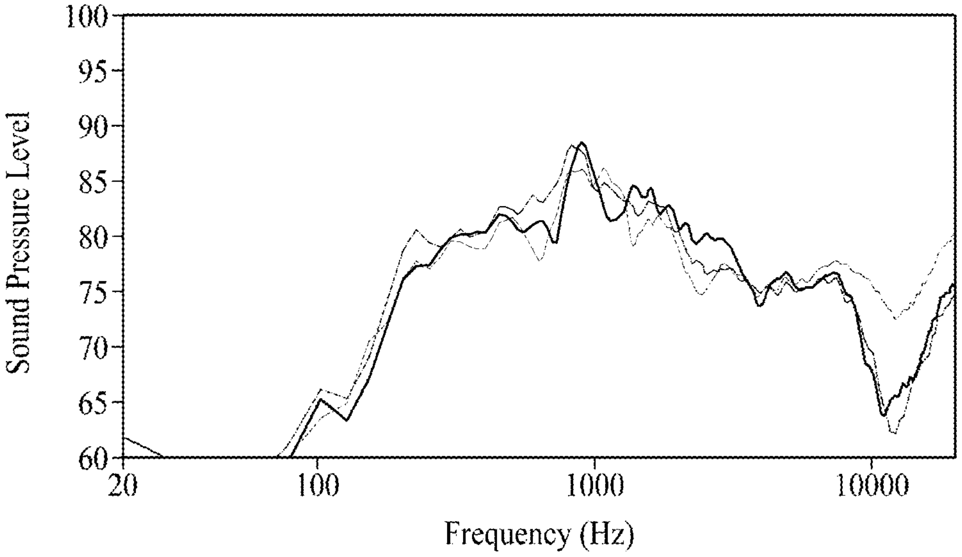
FIGS. 11A and 11B illustrate the directional characteristics in the sound generating device according to another embodiment of the present disclosure.
Figure 11B:
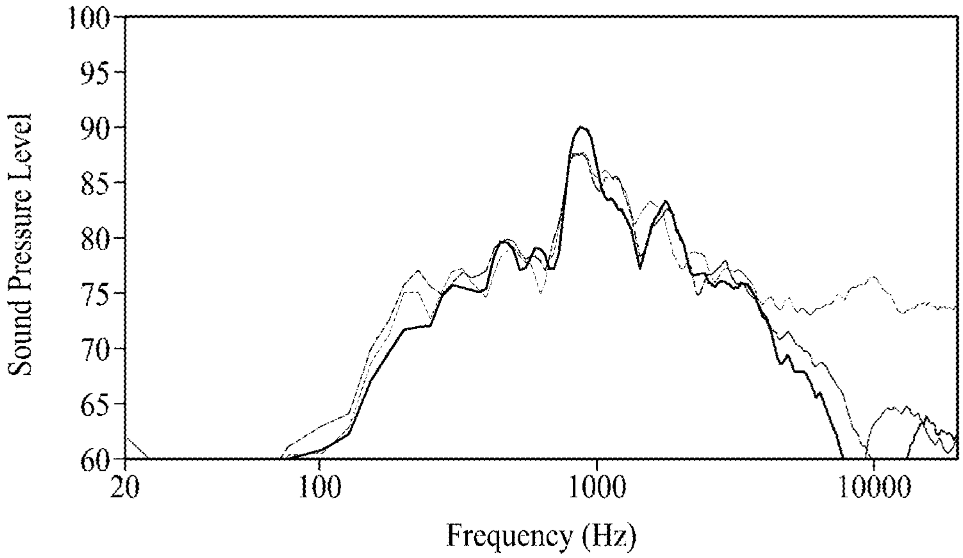

FIGS. 11A and 11B illustrate the directional characteristics in the sound generating device according to another embodiment of the present disclosure. FIG. 11A shows the directional characteristics in the oval-shaped sound generating device, and FIG. 11B shows the directional characteristics in a pair of the sound generating devices. Herein, the horizontal axis indicates a frequency (Hz), and the vertical axis indicates a sound pressure level (dB).

The directional characteristics may express a change value of a sound pressure level with respect to an angle in front of the display panel. For example, the front is expressed by ‘0°’, an angle between the front and a left-side point moved by 30° with respect to the front is expressed by ‘−30°’, and an angle between the front and a right-side point moved by 30° with respect to the front is expressed by ‘+30°’.

FIGS. 11A and 11B, ‘0°’ is indicated by a dotted line, ‘−30°’ is indicated by a solid line, and ‘+30°’ is indicated by an alternated long and short dash line.

With reference to FIG. 11A, in case of the high-pitched sound band of 3 kHz or more than 3 kHz, the sound pressure level is maintained constantly in accordance with the directional angle in the oval-shaped sound generating device.

With reference to FIG. 11B, in case of the high-pitched sound band of 3 kHz or more than 3 kHz, the sound pressure level is changed in accordance with the directional angle in a pair of sound generating devices.

Accordingly, in a case of an oval-shaped sound generating device, the difference of the sound pressure is not changed in accordance with the directional angle, whereby it is possible to improve the sound output characteristics in the high-pitched sound band.

Figure 12A:
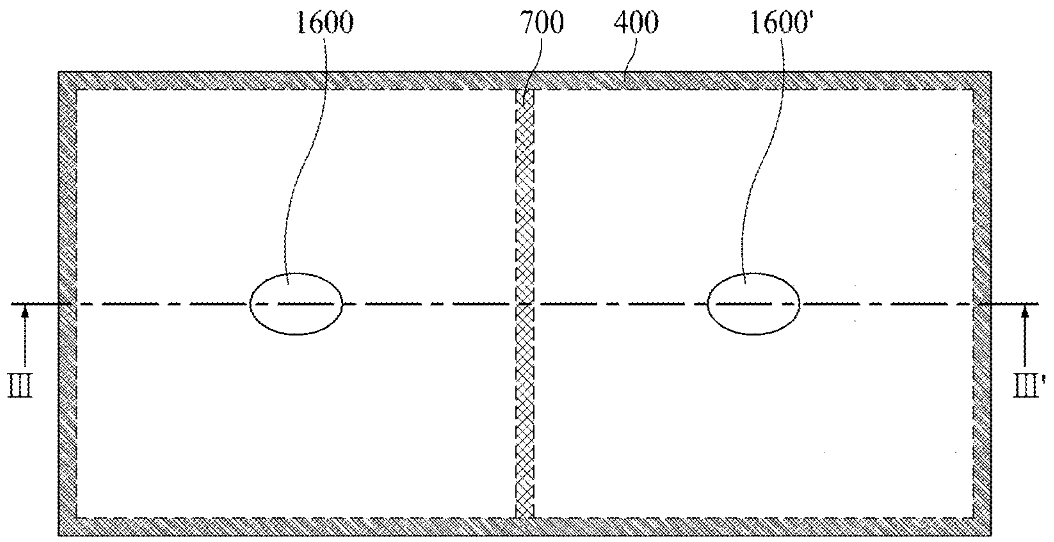
FIGS. 12A to 12C illustrate an embodiment of the sound generating device and partition in the display apparatus according to the present disclosure.
Figure 12B:
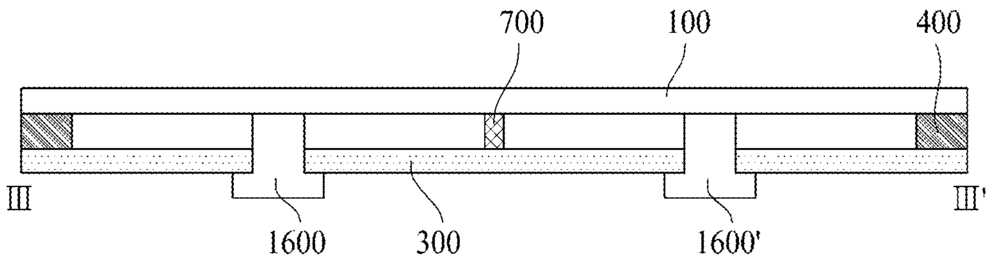

FIGS. 12A and 12B illustrate an embodiment of the sound generating device and partition in the display apparatus according to the present disclosure. With reference to FIG. 12A, the display panel 100 includes first and second areas, the first area corresponds to a left area of the display panel 100, and the second area corresponds to a right area of the display panel 100. The oval-shaped first sound generating device 1600 is disposed in the first area of the display panel 100, and the oval-shaped second sound generating device 1600' is disposed in the second area of the display panel 100.

The first sound generating device 1600 and the second sound generating device 1600' may be formed of the oval-shaped sound generating devices. The first sound generating device 1600 and the second sound generating device 1600' may output middle-high-pitched sound band with different levels so that it is possible to output stereo sound by the left and right sound separation.

A partition 700 may be disposed between the first sound generating device 1600 and the second sound generating device 1600'. The partition 700 corresponds to an air gap or space for generating sound when the display panel 100 is vibrated by the sound generating device 1600 and/or 1600'. The partition 700 may be the space or air gap for generating sound or transferring sound. The partition 700 may be an enclosure or baffle, but it is not limited to these terms. The partition 700 may be an entire area of four outer sides of the display panel 100. The partition 700 may be formed in a sealed structure or unsealed structure.

The partition 700 may separate the left and right sound generated in the first sound generating device 1600 and the second sound generating device 1600'. The vibration of the display panel 100 in the space or air gap defined as the partition 700 attenuates or absorbs in the center of the display panel 100 so that it is possible to prevent the left-side sound from being transferred to the area for the right-side sound, or to prevent the right-side sound from being transferred to the area for the left-side sound. Accordingly, the partition 700 separates the left-side sound and the right-side sound from each other, and improves the sound output characteristics.

The first sound generating device 1600 and the second sound generating device 1600' may output the middle-high-pitched sound band. Herein, the low-pitched sound band is the sound of 200 Hz or less than 200 Hz, the middle-pitched sound band is the sound between 200 Hz and 3 kHz, and the high-pitched sound band is the sound of 3 kHz or more than 3 kHz, but is not limited to these ranges.

The partition 700 may be formed of polyurethane or polyolefin, but is not limited to these materials. The partition 700 may be formed of a single-sided tape or double-sided tape, or may be formed of a material with elasticity, which is capable of being compressed to some extent.

Accordingly, the middle-high-pitched sound band may be output from the oval-shaped sound generating devices 1600 and 1600'. The partition 700 is disposed between the oval-shaped sound generating devices 1600 and 1600' so that the left-side sound and the right-side sound can be separated from each other, thereby improving the sound stereo characteristics.

FIG. 12B is a cross-sectional view taken along of FIG. 12A. As shown in FIG. 12B, the display apparatus may include the sound generating devices 1600 and 1600', the partition 700, and the supporting member 300. The supporting member 300 may support at least one of the rear and side (lateral) surfaces of the display panel 100. The sound generating devices 1600 and 1600' may be fixed to the supporting member 300. The sound generating device 1600 and 1600' and the supporting member 300 are connected the same as the aforementioned in FIG. 7.

The supporting member 300 may be disposed on the rear surface or entire surface of the display panel 100. The supporting member 300 may be formed of one among metal, glass and plastic materials or at least two among metal, glass, and plastic materials. If the supporting member 300 is formed of the glass material, it is possible to realize a good design effect.

The adhesion member 400 may be disposed in the periphery between the display panel 100 and the supporting member 300, thereby adhering the display panel 100 and the supporting member 300 to each other. The adhesion member 400 may be a double-sided tape, but it is not limited thereto.

The heat-dissipation member may be disposed on the sound generating devices 1600 and 1600' so that heat generated by the vibration of the sound generating devices 1600 and 1600' is dissipated. The heat-dissipation member prevents the heat from being transmitted from the sound generating devices 1600 and 1600' to the display panel 100. Accordingly, the heat generated in the sound generating devices 1600 and 1600' is diffused to the large area by the heat-dissipation member so that it is possible to prevent deterioration of picture quality in the display panel 100 caused by a sudden temperature change in an area of the display panel 100 overlapped with the sound generating devices 1600 and 1600'.

The heat-dissipation member may be embodied in a polygonal or circular plate shape having a uniform thickness, and a size of the heat-dissipation member is relatively larger than a size of the sound generating devices 1600 and 1600'. The heat-dissipation member may be provided on the entire rear surface of the display panel 100. For example, the heat-dissipation member may be embodied in a heat-dissipation sheet or heat-dissipation tape of a metal material with high thermal conductivity, for example, aluminum (Al), copper (Cu), silver (Ag), and their alloys.

Figure 12C:
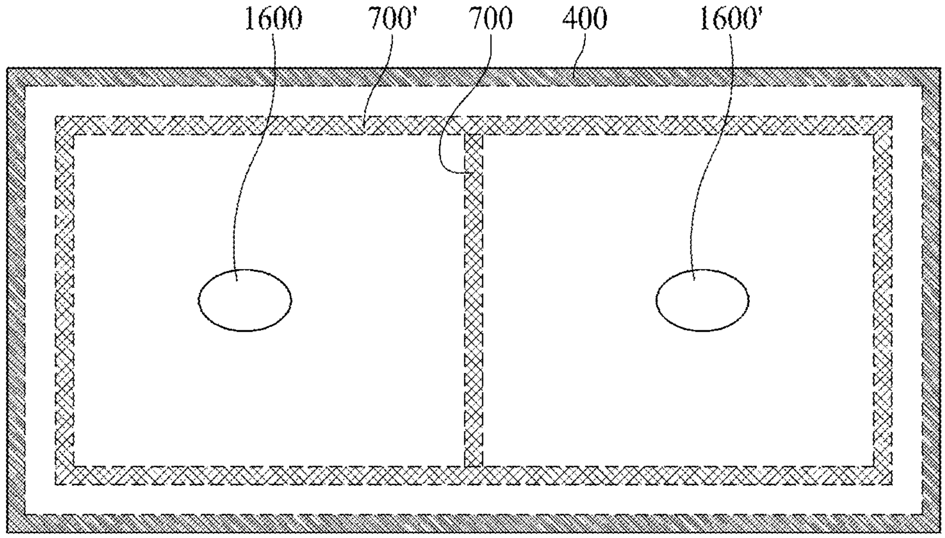

FIG. 12C illustrates another embodiment of the sound generating device and partition in the display apparatus according to the present disclosure. In FIG. 12C, the partition 700 is disposed in order to separate the left and right sound generated in the first sound generating device 1600 and the second sound generating device 1600'. A second partition 700' may be provided along four outer sides of the display panel 100. The second partition 700' prevents the sound from leaking in each lateral surface of the display panel 100 so that the sound is output only to the front direction of the display panel 100, thereby improving the sound output characteristics.

If the adhesion member 400 is formed of a foam pad, it may serve as the second partition 700'. In this case, it is possible to omit the second partition 700'.

Figure 13A:
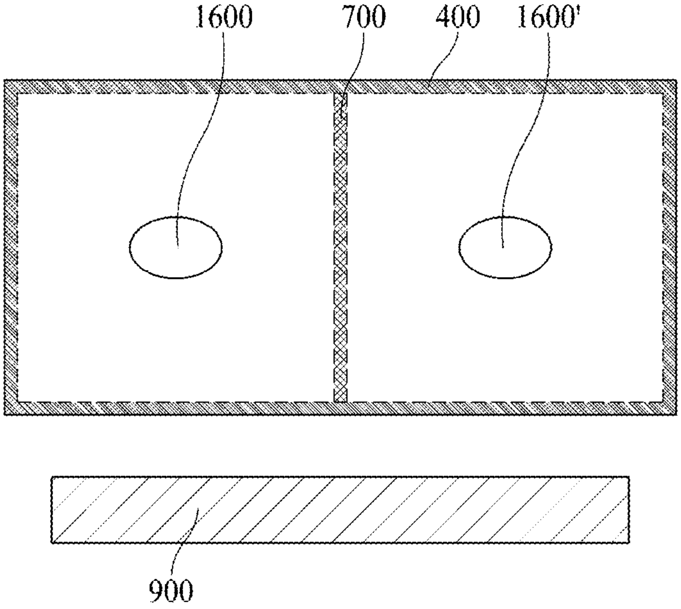
FIGS. 13A and 13B illustrate the sound generating device and low-pitched sound generating device in the display apparatus according to the present disclosure.
Figure 13B:
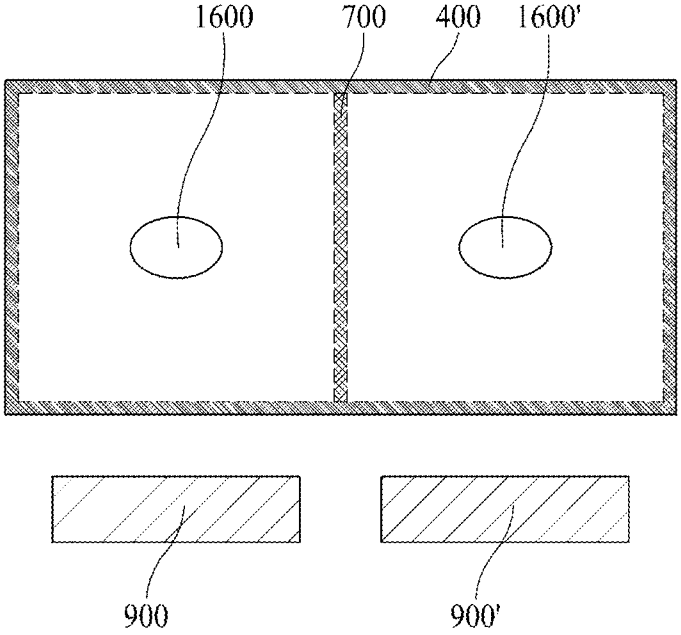

FIGS. 13A and 13B illustrate the sound generating device and low-pitched sound generating device in the display apparatus according to the present disclosure.

As shown in FIGS. 13A and 13B, the display apparatus according to the present disclosure may further include a low-pitched sound generating device 900 provided in the outer portion of the display panel 100 to improve the low-pitched sound band. The low-pitched sound generating device 900 may be formed of a general speaker, for example, a woofer speaker capable of generating sound in the range of several kHz or less than several kHz, but is not limited thereto.

FIG. 13A illustrates an embodiment of one low-pitched sound generating device without separation of left and right areas. It is possible to provide two or more low-pitched sound generating devices for separation of the left and right areas of low-pitched sound band. In this case, the low-pitched sound band corresponds to the sound of 200 Hz or less than 200 Hz, but is not limited thereto.

In FIG. 13B, the first sound generating device 1600 and the second sound generating device 1600' are formed of the oval-shaped sound generating devices. At least one low-pitched sound generating device may be disposed in each of the first and second areas. For example, the left-side low-pitched sound generating device 900 is disposed at a lower portion of the first sound generating device 1600, and the right-side low-pitched sound generating device 900' is disposed at a lower portion of the second sound generating device 1600'. Accordingly, the display apparatus according to the present disclosure includes the left-side and right-side sound generating devices for generating the middle-high-pitched sound band by vibrating the display panel 100, and the low-pitched sound generating devices provided to generate the low-pitched sound band so that it is possible to improve the sound output characteristics for all ranges of the sound.

In FIGS. 13A and 13B, the adhesion member for adhering the display panel and the supporting member to each other may be provided in the periphery of the display panel and the supporting member, as explained in FIG. 12.

Figure 14A:
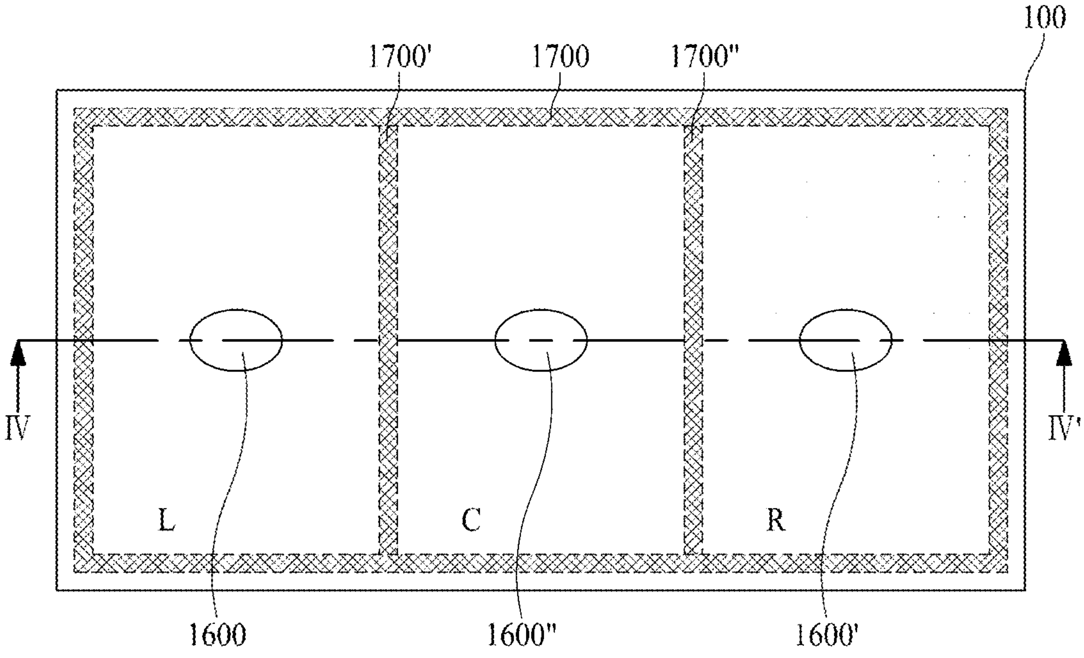
FIGS. 14A to 14E illustrate another embodiment of the sound generating device and partition in the display apparatus according to the present disclosure.
Figure 14B:
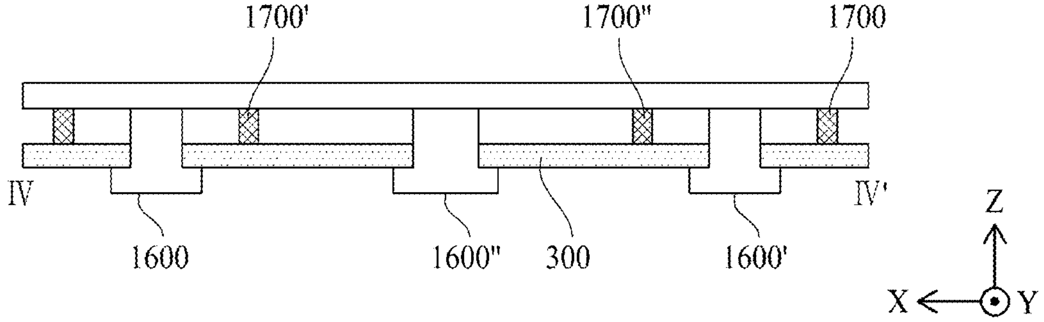
Figure 14C:
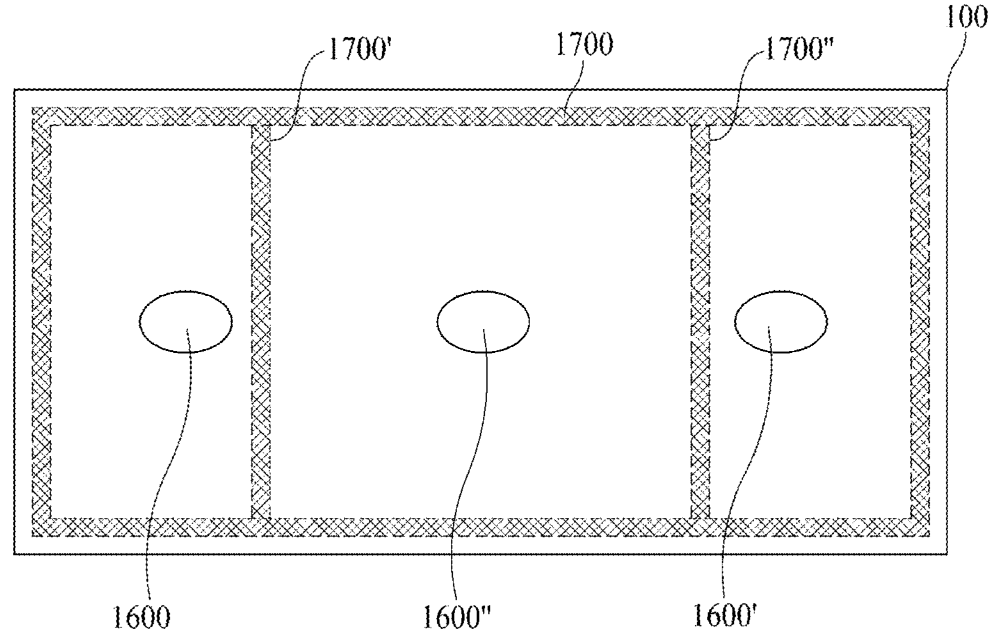

FIGS. 14A to 14C illustrate another embodiment of the sound generating device and partition in the display apparatus according to the present disclosure.

As illustrated in FIG. 14A, the display panel 100 includes first, second, and third areas. The first area corresponds to a left area (L) of the display panel 100, the second area corresponds to a right area (R) of the display panel 100, and the third area corresponds to a central area (C) between the left area (L) and the right area (R) of the display panel 100. An oval-shaped first sound generating device 1600 may be disposed in the first area of the display panel 100, an oval-shaped second sound generating device 1600' may be disposed in the second area of the display panel 100, and an oval-shaped third sound generating device 1600" may be disposed in the third area of the display panel 100.

The first sound generating device 1600 and the second sound generating device 1600' may output middle-high-pitched sound band, and the third sound generating device 1600" may output middle-low-pitched sound band. Accordingly, the third sound generating device 1600" may be a woofer speaker capable of outputting the middle-low-pitched sound band, and the first sound generating device 1600 and the second sound generating device 1600' enable the stereo sound output, whereby the display apparatus according to the present disclosure may have the sound output characteristics of 2.1 channel type.

If the first, second, and third sound generating devices 1600, 1600', and 1600" have the same size, it is possible to realize the more-improved sound output characteristics in the middle-high-pitched sound band and the middle-low-pitched sound band, thereby providing a display apparatus with the improved stereo sound output characteristics.

A partition enables a separation of middle-high-pitched sound band in the first and second areas, and enables a separation of middle-low-pitched sound band in the third area. The partition may include a first partition 1700' disposed between the first area and the third area, a second partition 1700" disposed between the third area and the second area, and a third partition 1700 disposed in the periphery of the display panel 100. Accordingly, the first partition 1700' prevents the vibration of the first area of the display panel 100 from being transferred to the third area of the display panel 100, and the second partition 1700" prevents the vibration of the second area of the display panel 100 from being transferred to the third area of the display panel 100. The first partition 1700' prevents the vibration of the third area of the display panel 100 from being transferred to the first area of the display panel 100, and the second partition 1700" prevents the vibration of the third area of the display panel 100 from being transferred to the second area of the display panel 100.

The first partition 1700', the second partition 1700", and the third partition 1700 may be formed of a double-sided tape or single-sided tape of polyurethane or polyolefin having a uniform thickness (or height) and width, but is not limited thereto. The first partition 1700', the second partition 1700", and the third partition 1700 may be formed of a material with elasticity, which is capable of being compressed to some extent, and the first partition 1700', the second partition 1700", and the third partition 1700 may be referred to as a foam pad.

FIG. 14B is a cross-sectional view taken along IV-IV' of FIG. 14A.

As shown in FIG. 14B, the display apparatus may include the sound generating devices 1600, 1600' and 1600", the partitions 1700 and 1700', and a supporting member 300. The supporting member 300 may support at least one of rear and side surfaces (lateral surface) of the display panel 100. The sound generating devices 1600, 1600' and 1600" may be fixed to the supporting member 300. The sound generating device 1600, 1600' and 1600" and the supporting member 300 are connected similar to that described with reference to FIG. 7.

FIG. 14C illustrates another embodiment of the sound generating device and partition in the display apparatus according to the present disclosure.

As shown in FIG. 14C, in a case where a size of the third area is larger than a size of the first area and the second area, even though the first, second, and third sound generating devices 1600, 1600', and 1600" have the same sound output, it is possible to stably output the middle-low-pitched sound band owing to the relatively-large size of the third sound generating device 1600" for generating the middle-low-pitched sound band. A first partition 1700' is disposed between the first sound generating device 1600 and the third sound generating device 1600", a second partition 1700" is disposed between the second sound generating device 1600' and the third sound generating device 1600", and a third partition 1700 disposed in the periphery of the display panel 100. A detailed description for the partitions is similar to that described with reference to FIG. 14A.

The sound waves generated by vibrating the display panel 100 through the use of sound generating device radially progresses from the center of the sound generating device, which is referred to as a progressive wave. If the progressive wave is reflected on one side of the partition, and progresses to an opposite direction, it is referred to as a reflected wave. If this reflected wave is overlapped and interfered with the progressive wave, it is not progressed, and it is in a standing state, which is referred to as a standing wave. The standing wave causes the reduction of sound pressure, thereby deteriorating the sound output characteristics. Thus, to prevent the reduction of sound pressure by the standing wave generated due to the interference between the progressive wave and the reflected wave, a bent portion is formed in the partition. The standing wave causing the reduction of sound pressure generates at a point having the large progressive wave and the large reflected wave. Accordingly, the bent portion may be disposed in the position having the largest sound wave approaching from the sound generating device, which will be described with reference to FIGS. 14D and 14E.

Figure 14D:
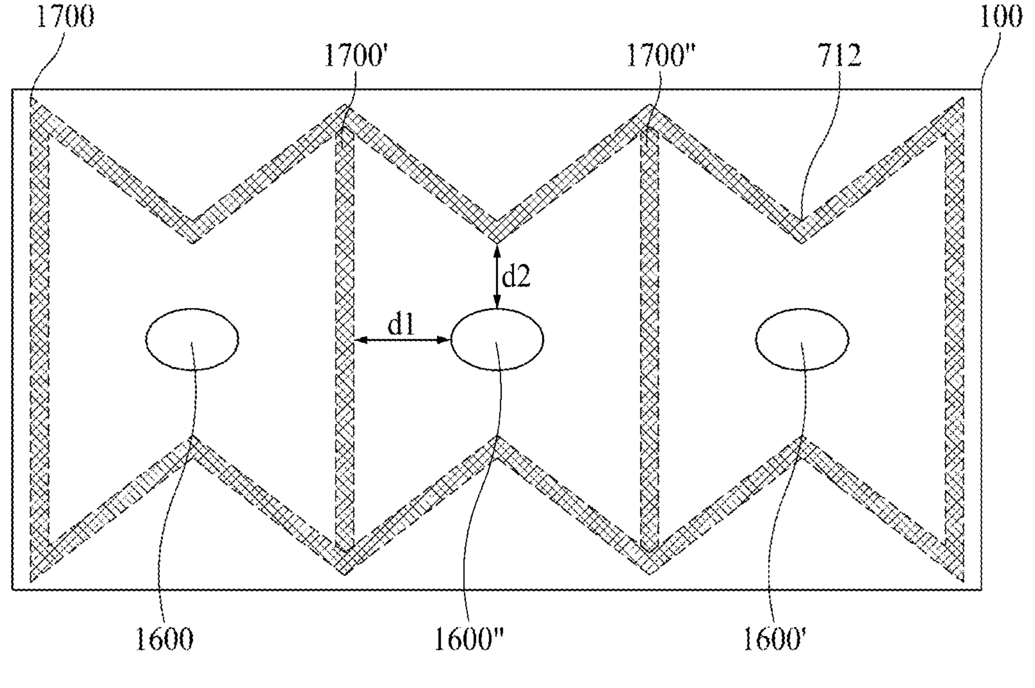
Figure 14E:
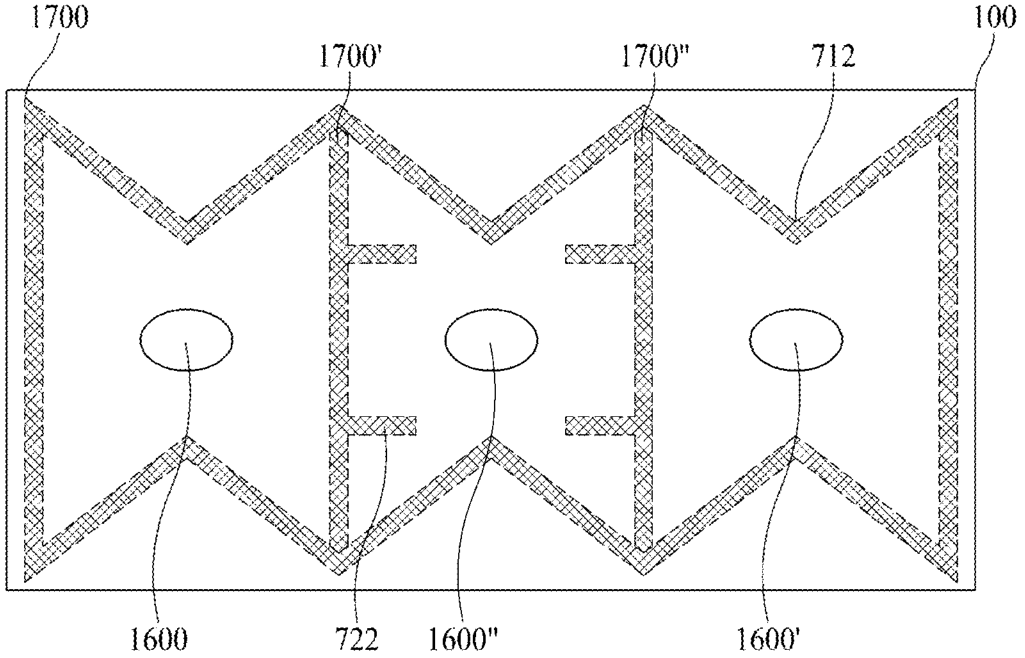

FIGS. 14D and 14E show the partition, and the bent portion is further provided in at least one side of the partition.

FIG. 14D illustrates another embodiment of the sound generating device and partition in the display apparatus according to the present invention.

The display panel 100 includes four sides, and the bent portion 712 is formed in the first side corresponding to one or more sides among the four sides. Thus, the bent portion 712 is formed in such a way that the two sides corresponding to the lower and upper sides of the four sides are provided to have a predetermined inclined angle with respect to a horizontal direction (or transverse direction) of the display panel 100. The bent portion 712 is provided with two straight-line portions, and the bent portion 712 is formed at a point where the two straight-line portions meet. The bent portion 712 may be formed in a straight line shape, a curved line shape, or a round shape, but the structure is not limited to these shapes.

The inclined angle (θ) of the bent portion 712 may be adjusted based on requirement for restriction of the standing wave, and the inclined angle (θ) of the bent portion 712 may be adjusted within a range from 10° to 30°. For example, in a case of a sound output range for a low-pitched sound band or a large output of the sound generating device, an inclined angle (θ) of the bent portion 712 becomes large. In a case of a sound output range for a high-pitched sound band or a small output of the sound generating device, an inclined angle (θ) of the bent portion 712 becomes small. In this case, the inclined angle (θ) of the bent portion 712 may be the angle obtained by one side of the third partition 1700 and the horizontal direction (or transverse direction) of the display panel 100. Herein, the horizontal direction or transverse direction corresponds to the direction of the long side of the display apparatus, and the vertical direction or longitudinal direction corresponds to the direction of the short side of the display apparatus.

With reference to FIG. 14D, in case of the oval-shaped sound generating device 1600, 1600' and 1600", it has the strong sound wave progressing in the short axis direction of the oval shape. Thus, the side parallel to the long axis direction is referred to as the first side, and the bent portion 712 is provided in the first side. Accordingly, the bent portion 712 is bent toward the short axis direction of the oval shape.

The partition may be provided in consideration of the ratio of the long axis diameter to the short axis diameter in the oval shape. The third sound generating device 1600" will be described. For example, if the ratio of the long axis diameter to the short axis diameter in the oval shape is 1.5:1, 'd1' may be 1.5 mm, and 'd2' may be 1 mm. Accordingly, in the oval-shaped third sound generating device 1600", the first partition 1700' may be disposed at an interval of 1.5 mm, and the second partition 1700" may be disposed at an interval of 1.5 mm. In case of with the bent portion 712 included in the third partition 1700, the bent portion 712 may be bent at an internal of 1 mm with respect to the oval-shaped third sound generating device 1600" toward the oval-shaped third sound generating device 1600". The first partition 1700' and the second partition 1700" may be disposed at an interval of proportion corresponding to the long axis diameter of the oval-shaped third sound generating device 1600", and the third partition 1700 may be disposed at an interval of proportion corresponding to the short axis diameter of the oval-shaped third sound generating device 1600". A portion of the third partition 1700 is separated from the oval shaped sound generating device 1600" by a first distance d1, and the at least one of the first partion partition 1700' or the second partition 1700" is separated from the oval shaped sound generating device 1600" by a second distance d2, wherein a ratio of the first distance d1 to the second distance d2 is substantially equal to a ratio of a short axis diameter to a long axis diameter of the oval shaped sound generating device 1600". Herein, the above values of 'd1' and 'd2' are just examples, but the values are not limited to these example values.

Because the partition may be provided in consideration of the ratio of the long axis diameter to the short axis diameter in the oval shape, it is possible to decrease the reduction of sound pressure by the standing wave or reflected wave, to thereby improve the sound output characteristics.

In the configuration of FIG. 14E, both a bent portion 712 and a protrusion portion 722 are provided. For example, the bent portion 712 is formed in at least one side of the third partition 1700, and at least one protrusion portion 722 is formed in the side perpendicular to the side with the bent portion 712. The protrusion portion 722 is disposed toward the third sound generating device 1600".

The protrusion portion 722 is capable of trapping the reflected wave, and decreasing the reduction of sound pressure by the standing wave. At least one protrusion portion 722 may be formed in at least one side of the third partition 1700, and the protrusion portions 722 may be symmetrically disposed with respect to the sound generating device. FIG. 14E shows that at least one protrusion portion 722 is formed in any one side of the first side and the second side being perpendicular to the first side among the four sides of the display panel 100.

FIGS. 14D and 14E show a sealed structure of the third partition. For example, the third partition 1700 may be formed in the zigzag shape and sealed structure, or the third partition 1700 may be formed in the zigzag shape and unsealed structure. If the third partition 1700 has the unsealed structure, a cost for the third partition 1700 is reduced in comparison to the case of the sealed structure. There is no difference in sound output characteristics between the third partition 1700 having the sealed structure and the third partition 1700 having the unsealed structure.

In FIGS. 14A to 14E, the adhesion member for adhering the display panel and the supporting member to each other may be provided between the periphery of the display panel and the periphery of the supporting member, as explained with reference to FIGS. 11A and 11B.

FIGS. 15A to 15G illustrate another embodiment of the sound generating device and partition in the display apparatus according to the present disclosure.

With reference to FIGS. 15A to 15G, a dual-structure partition including two or more partitions may be provided. For a mono sound of outputting the same sound in the left and right areas, the left and right areas of the display panel 100 have the same vibration characteristics, whereby it may cause a problem related with the reduction of sound pressure by maximized resonant phenomenon and interference phenomenon in a specific frequency band. To decrease an influence of the sound output characteristics caused by the difference of resonant frequency of the middle-high-pitched sound band generated in the first sound generating device of the first area corresponding to the left area and the second sound generating device of the second area corresponding to the right area, it may have a structure including two or more partitions. FIG. 15 shows the dual-structure partition, but three or more partitions may be provided. If there are the three or more partitions, even though the sound inference becomes serious in the left and right areas, it is possible to prevent the reduction of sound pressure, thereby preventing discontinuity of the sound output characteristics.

The first sound generating device 1600, the second sound generating device 1600' and the third sound generating device 1600" are formed of the oval-shaped sound generating devices. Accordingly, the first and second sound generating devices may output the low-middle-high-pitched sound of the different levels of the low-middle-high-pitched sound band so that it is possible to output the stereo sound by the separation of the left and right areas. Because the first sound generating device is provided in the first area corresponding to the left area, the second sound generating device is provided in the second area corresponding to the right area, and the third sound generating device is not provided in the third area corresponding to the central area, the central area serves as a buffer area, whereby it is possible to improve the low-middle-high-pitched sound output characteristics of the low-middle-high-pitched sound band in the left and right areas of the display panel 100.

Figure 15A:
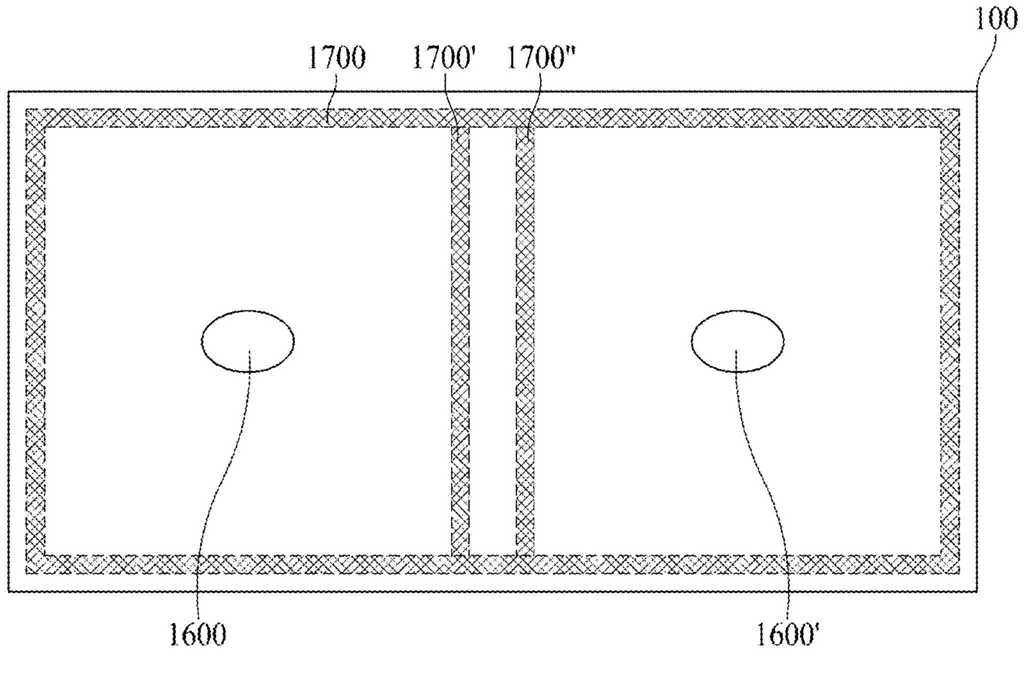
FIGS. 15A to 15G illustrate another embodiment of the sound generating device and partition in the display apparatus according to the present disclosure.

In FIG. 15A, the first sound generating device 1600 is disposed in the first area corresponding to the left area of the display panel 100, and the second sound generating device 1600' is disposed in the second area corresponding to the right area of the display panel 100. At least two partitions including the first partition 1700' and the second partition 1700" may be disposed between the first sound generating device 1600 and the second sound generating device 1600', or the first partition 1700' with at least two sub partitions may be disposed between the first sound generating device 1600 and the second sound generating device 1600'. The third partition 1700 may be disposed in the periphery of the display panel 100. Accordingly, the two partitions are provided in the central area of the display panel 100 so that it is possible to decrease an influence of the output characteristics caused by the difference of resonance frequency in the low-middle-high-pitched sound band between the left and right areas of the display panel 100.

FIG. 15C and FIGS. 15E to 15G show the partition of the dual structure including the two or more partitions, and the bent portion is further provided in at least one side of the partition.

Figure 15B:
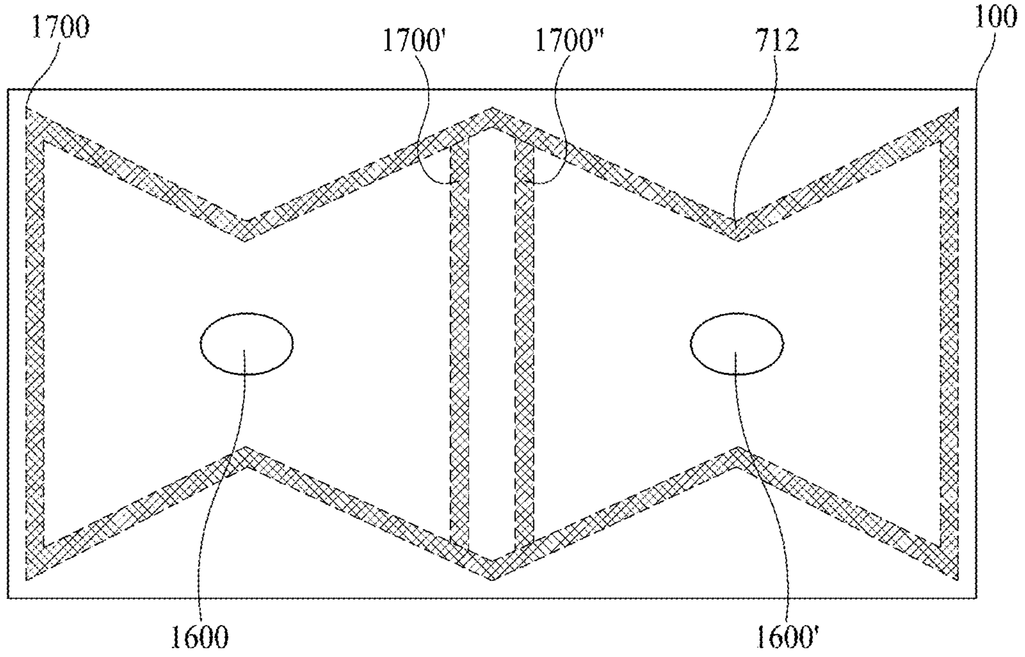
Figure 15C:
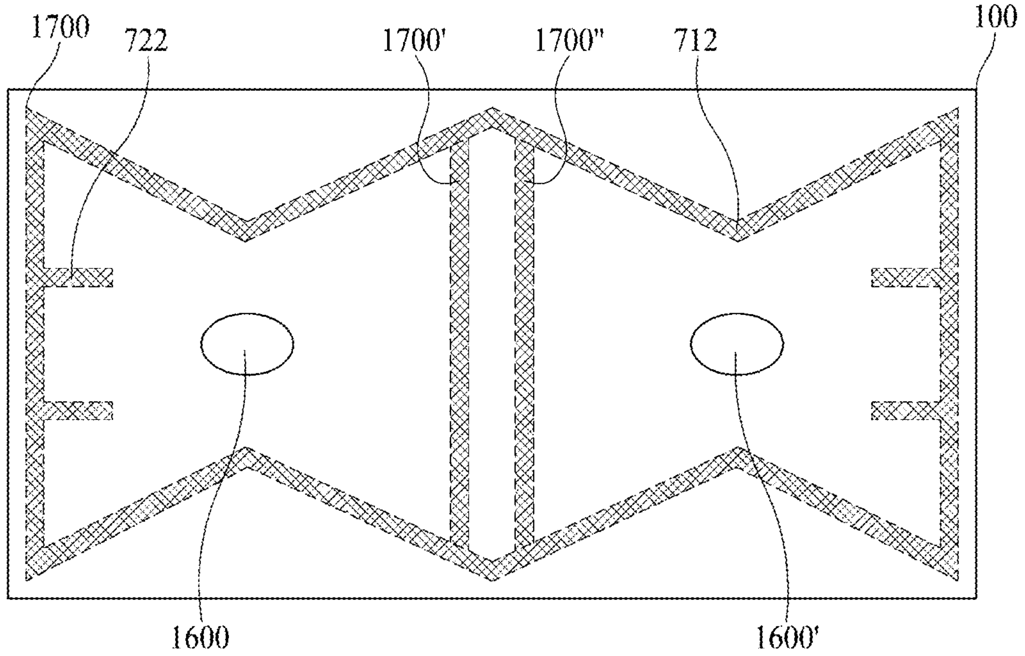

In FIGS. 15B and 15C, the first sound generating device 1600 is disposed in the first area corresponding to the left area of the display panel 100, and the second sound generating device 1600' is disposed in the second area corresponding to the right area of the display panel 100. At least two partitions including the first partition 1700' and the second partition 1700" may be disposed between the first sound generating device 1600 and the second sound generating device 1600', or the first partition 1700' with at least two sub partitions may be disposed between the first sound generating device 1600 and the second sound generating device 1600'. The third partition 1700 may be disposed in the periphery of the display panel 100. The bend portion 712 is provided in at least one side of the third partition 1700.

As explained in FIG. 14D, the partition may be disposed in consideration of the ratio of the long axis diameter to the short axis diameter in the oval shape. The bent portion 712 may be bent in the short axis direction of the oval-shaped sound generating device 1600 and 1600'. The first partition 1700' is disposed at an interval corresponding to the proportion of the long axis diameter of the oval-shaped first sound generating device 1600, and the second partition 1700" is disposed at an interval corresponding to the proportion of the long axis diameter of the oval-shaped second sound generating device 1600'. The third partition 1700 includes the bent portion 712 which is disposed at an interval corresponding to the proportion of the short axis diameter of the first sound generating device 1600 and the second sound generating device 1600', and is bent in the short axis direction of the oval-shaped sound generating device.

The third partition 1700 having the bent shape is disposed between the first partition 1700' and the second partition 1700". The bent shape is disposed toward the display panel 100. The bent shape may be formed in a straight line shape, a curved line shape, or a round shape between the first partition 1700' and the second partition 1700", but is not limited to these shapes.

In FIG. 15C, both a bent portion 712 and a protrusion portion 722 are provided. For example, the bent portion 712 is formed in at least one side of the third partition 1700, and at least one protrusion portion 722 is formed in the side perpendicular to the side with the bent portion 712. The protrusion portion 722 disposed in the left area of the display panel 100 is provided toward the first sound generating device 1600, and the protrusion portion 722 disposed in the right area of the display panel 100 is provided toward the second sound generating device 1600'.

The protrusion portion 722 is capable of trapping the reflected wave, and decreasing the reduction of sound pressure by the standing wave. At least one protrusion portion 722 may be formed in at least one side of the third partition 1700, and the protrusion portions 722 may be symmetrically disposed with respect to the sound generating device. FIG. 15C shows that at least one protrusion portion 722 is formed in any one side of the first side and the second side being perpendicular to the first side among the four sides of the display panel 100.

Figure 15D:
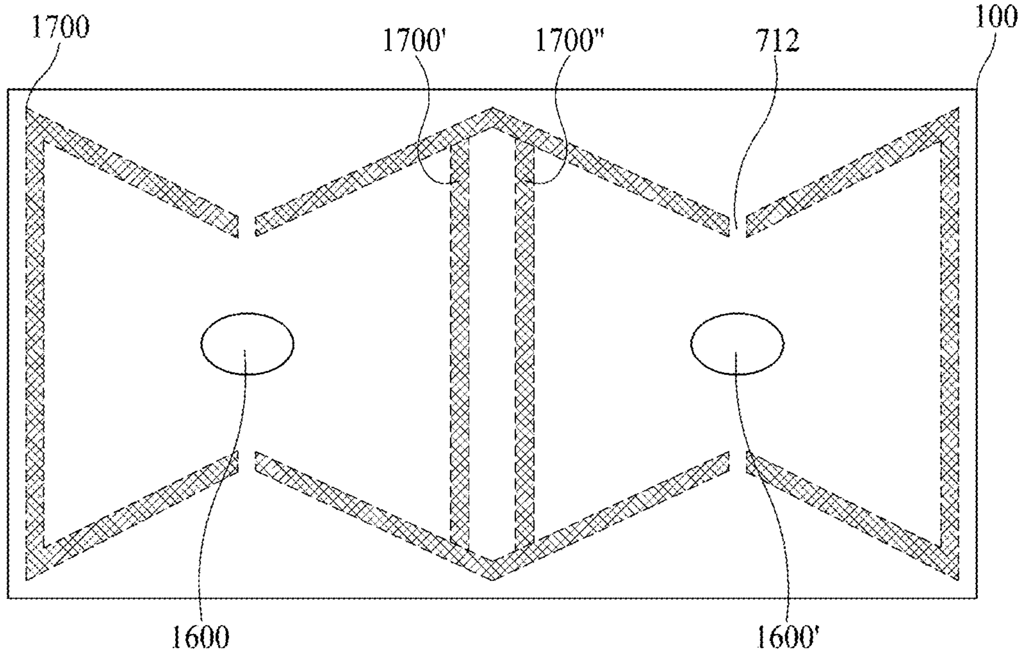
Figure 15E:
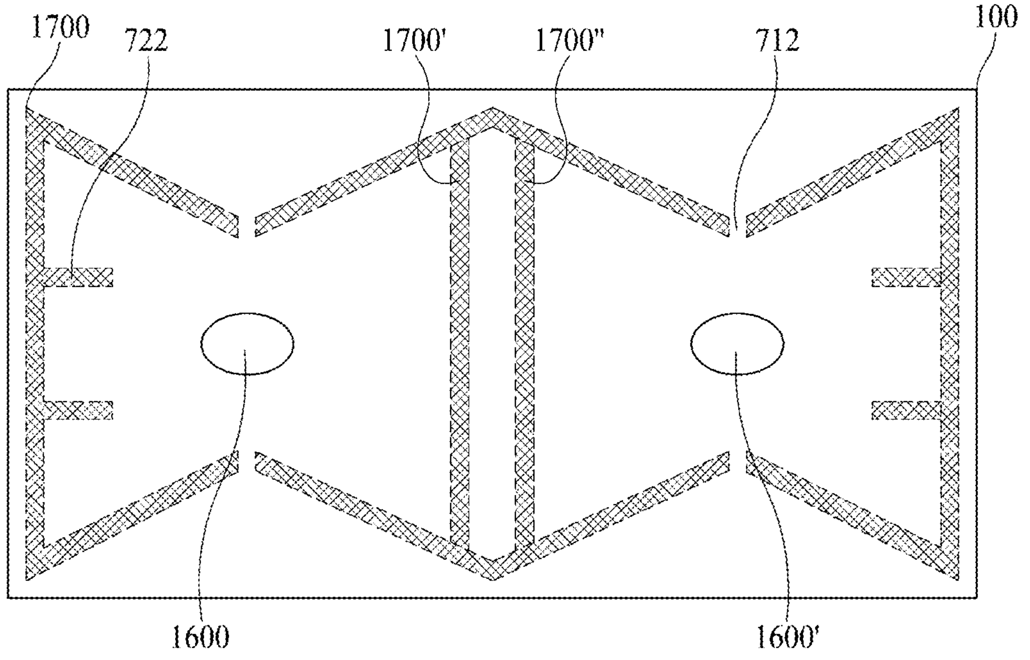

FIGS. 15B and 15C show a sealed structure of the third partition 1700, and FIGS. 15D and 15E show an unsealed structure of the third partition 1700. For example, the third partition 1700 may be formed in the zigzag shape and sealed structure, or the third partition 1700 may be formed in the zigzag shape and unsealed structure. The bent portion 712 may be formed in the sealed structure, and the bent shape disposed between the first partition 1700' and the second partition 1700" may be formed in the unsealed structure. If the third partition 1700 has the unsealed structure, a cost for the third partition 1700 is reduced in comparison to the case of the sealed structure. There is no difference in sound output characteristics between the third partition 1700 having the sealed structure and the third partition 1700 having the unsealed structure.

Figure 15F:
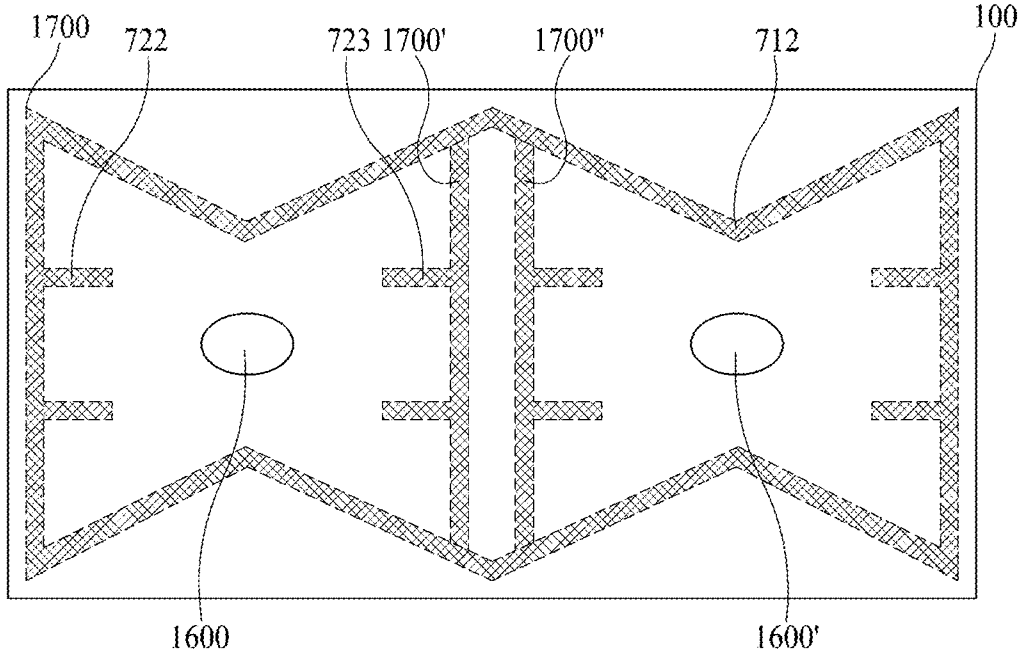
Figure 15G:
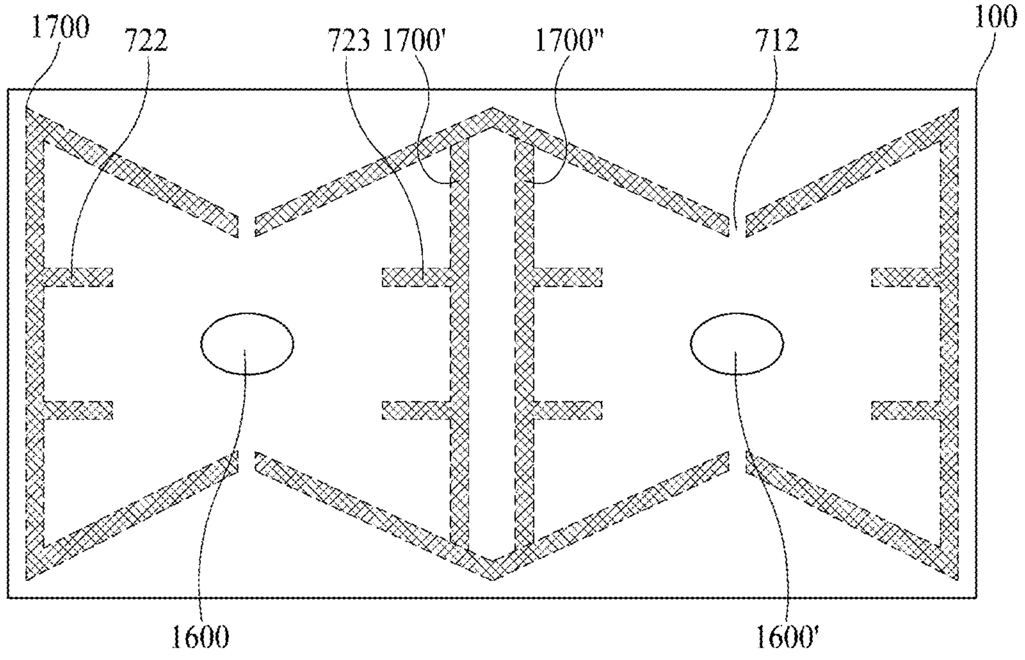

In FIGS. 15F and 15G, at least one protrusion 722 and second protrusion portion 723 are formed in the first-side of the four sides of the display panel 100, and the second-side perpendicular to the first-side. The protrusion portion 722 and second protrusion portion 723 in the left area of the display panel 100 are disposed toward the first sound generating device 1600, and the protrusion portion 722 and second protrusion portion 723 in the right area of the display panel 100 are disposed toward the second sound generating device 1600'. Because the protrusion portion 722 and second protrusion portion 723 are provided, it is possible to trap the reflected wave and to decrease the reduction of sound pressure by the standing wave.

FIG. 15F shows the sealed structure of the third partition 1700 and FIG. 15G shows the unsealed structure of the third partition 1700. A description for the first partition 1700', the second partition 1700" and the third partition 1700 is the same as that of FIGS. 15B to 15E.

In FIGS. 15A to 15G, the display panel 100 has the three areas, and the sound generating device is not disposed in the third area corresponding to the central area of the display panel 100. The size of the third area is relatively smaller than the size of each of the first area and the second area. In this case, the central area serves as the buffer area so that it is possible to improve the low-middle-high-pitched sound output characteristics of the low-middle-high-pitched sound band in the left and right areas of the display panel 100. The first area, the second area, and the third area may have the same size. The size of the third area may be larger than the size of each of the first area and the second area.

In FIGS. 15A to 15G, the adhesion member for adhering the display panel and the supporting member to each other may be provided in the periphery of the display panel and the supporting member, as explained in FIG. 12.

FIGS. 16A to 16L illustrate another embodiment of the sound generating device and partition in the display apparatus according to the present disclosure.

In FIGS. 16A to 16L, the display panel 100 includes first, second, and third areas. In this case, the first area corresponds to the left area of the display panel 100, the second area corresponds to the right area of the display panel 100, and the third area corresponds to the central area between the left area and the right area of the display panel 100. The first sound generating device disposed in the first area of the display panel 100 and the second sound generating device disposed in the second area of the display panel 100 may generate the middle-high-pitched sound band, and the third sound generating device disposed in the third area of the display panel 100 may generate the middle-low-pitched sound band. Accordingly, the third sound generating device may be a woofer speaker, which enables low frequency sound output, and the first sound generating device and the second sound generating device enable the stereo sound output, whereby the display apparatus according to the present disclosure may have the sound output characteristics of 2.1 channel type.

As shown in FIGS. 16A to 16D, at least one oval-shaped sound generating device may be disposed in each of the first and second areas, and the oval-shaped sound generating device may be disposed in the third area. For example, the first sound generating device 1600 including the two sub sound generating devices 1600-1 and 1600-2 is disposed in the first area, the second sound generating device 1600' including the two sub sound generating devices 1600'-1 and 1600'-2 is disposed in the second area, and the third sound generating device 1600" is disposed in the third area. The two sub sound generating devices are adjacent to each other, and are parallel to each other with respect to the horizontal direction or vertical direction of the display panel. The first sound generating device 1600, the second sound generating device 1600' and the third sound generating device 1600" are formed of the oval-shaped sound generating devices.

The first sound generating device 1600 disposed in the first area and the second sound generating device 1600' disposed in the second area may generate the middle-high-pitched sound band, and the third sound generating device 1600" disposed in the third area may generate the middle-low-pitched sound band. The first sound generating device 1600 of the first area may include the 1-1 sub sound generating device 1600-1 and the 1-2 sub sound generating device 1600-2. For example, the 1-1 sub sound generating device 1600-1 may generate the high-pitched sound band, and the 1-2 sub sound generating device 1600-2 may generate the middle-pitched sound band. The sound generated in the upper portion of the display panel 100 is relatively higher sound band than the sound generated in the lower portion of the display panel so that the sound range is provided at the high position.

The second sound generating device 1600' of the second area may include the 2-1 sub sound generating device 1600'-1 and the 2-2 sub sound generating device 1600'-2. The 2-1 sub sound generating device 1600'-1 may generate the high-pitched sound band, and the 2-2 sub sound generating device 1600'-2 may generate the middle-pitched sound band. The sound generated in the upper portion of the display panel 100 is relatively higher sound band than the sound generated in the lower portion of the display panel so that the sound range is provided at the high position.

The first partition 1400' is disposed between the first sound generating device 1600 and the third sound generating device 1600", and the second partition 1400" is disposed between the second sound generating device 1600' and the third sound generating device 1600". The first partition 1400' prevents the vibration of the display panel 100 from being transferred from the first area to the third area, and the second partition 1400" prevents the vibration of the display panel 100 from being transferred from the second area to the third area. The first partition 1400' prevents the vibration of the display panel 100 from being transferred from the third area to the first area, and the second partition 1400" prevents the vibration of the display panel 100 from being transferred from the third area to the second area. The third partition 1400 is disposed in the periphery of the display panel 100, and the third partition 1400 is formed in the sealed structure.

As explained in FIG. 14D, the partition may be disposed in consideration of the ratio of the long axis diameter to the short axis diameter in the oval shape. The bent portion may be bent in the short axis direction of the oval-shaped sound generating device 1600 and 1600'. The first partition 1400' is disposed at an interval corresponding to the proportion of the long axis diameter of the oval-shaped first sound generating device 1600, and the second partition 1400" is disposed at an interval corresponding to the proportion of the long axis diameter of the oval-shaped second sound generating device 1600'. The third partition 1400 is disposed at an interval corresponding to the proportion of the short axis diameter of the first sound generating device 1600 and the second sound generating device 1600', and includes the bent portions 1412, 1412', and 1412" that are bent in the short axis direction of the oval-shaped sound generating device.

Figure 16A:
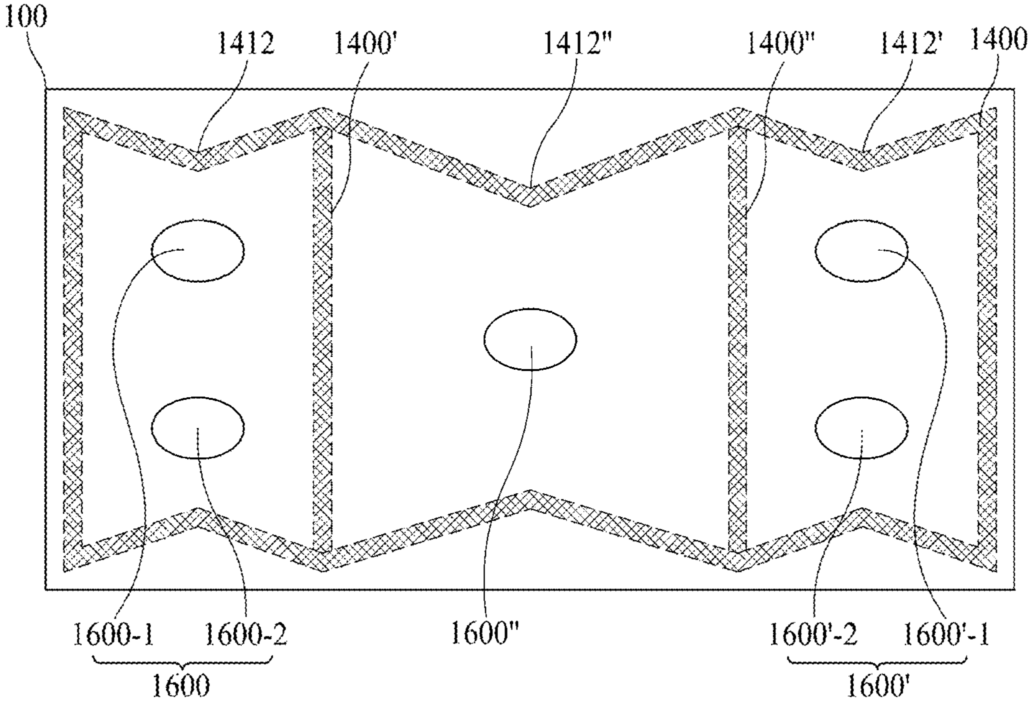
FIGS. 16A to 16L illustrate another embodiment of the sound generating device and partition in the display apparatus according to the present disclosure.
Figure 16B:
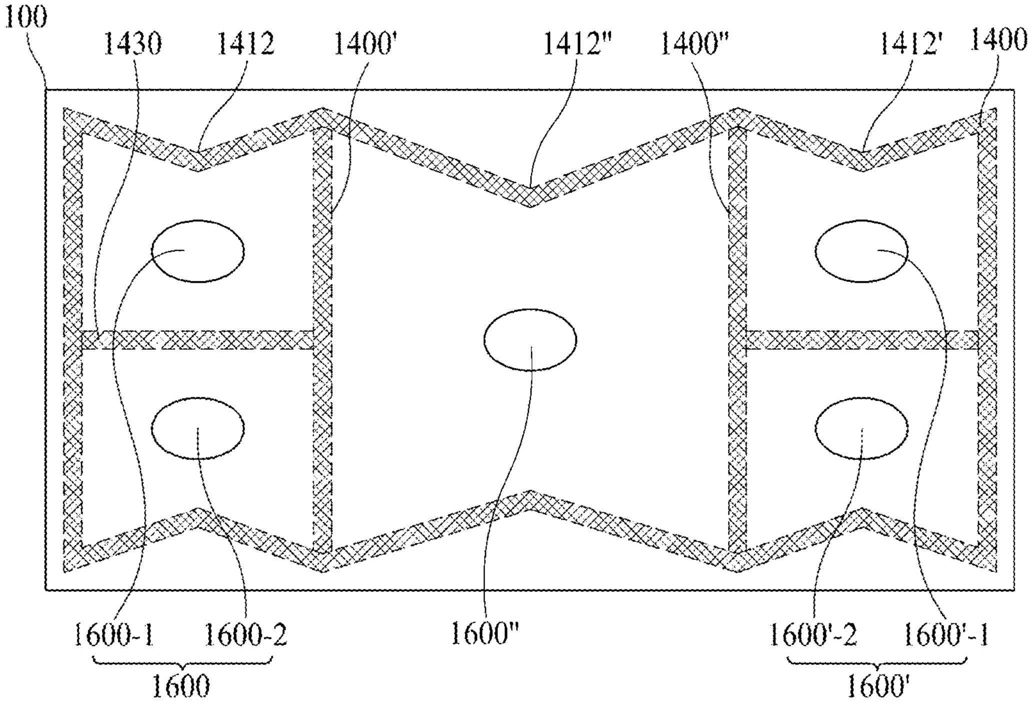

As shown in FIG. 16B, at least one oval-shaped sound generating device may be disposed in each of the first and second areas, and the oval-shaped sound generating device may be disposed in the third area. A fourth partition 1430 may be further disposed between the at least one oval-shaped sound generating device. For example, the first sound generating device 1600 including the two sub sound generating devices 1600-1 and 1600-2 is disposed in the first area, the second sound generating device 1600' including the two sub sound generating devices 1600'-1 and 1600'-2 is disposed in the second area, and the third sound generating device 1600" is disposed in the third area. The fourth partition 1430 is disposed between the two sub sound generating devices 1600-1 and 1600-2 of the first area, and the fourth partition 1430 is disposed between the two sub sound generating devices 1600'-1 and 1600'-2 of the second area.

The fourth partition 1430 separates the high-pitched sound band and the middle-pitched sound band generated in the 1-1 sub sound generating device 1600-1 and the 1-2 sub sound generating device 1600-2 included in the first sound generating device 1600, to thereby realize the more-improved sound output characteristics. The fourth partition 1430 separates the high-pitched sound band and the middle-pitched sound band generated in the 2-1 sub sound generating device 1600'-1 and the 2-2 sub sound generating device 1600'-2 included in the second sound generating device 1600', to thereby realize the more-improved sound output characteristics.

Figure 16C:
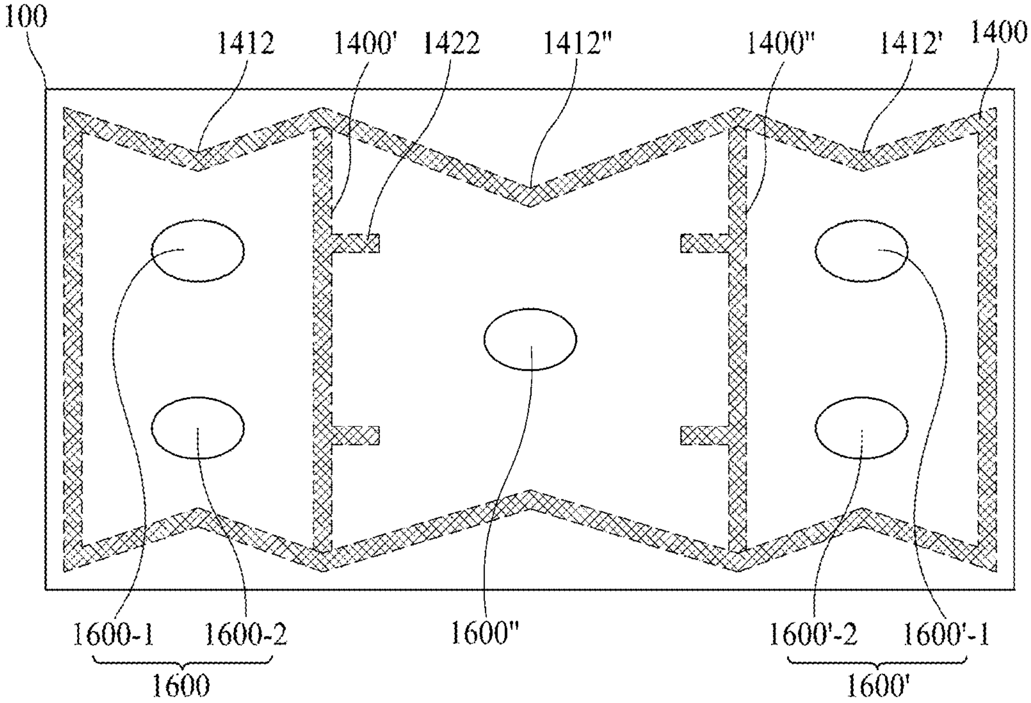

As illustrated in FIG. 16C, the third partition 1400 including the bent portion 712 that is bent toward the short axis direction of the oval-shaped sound generating device 1600, 1600', and 1600" may be provided, and one or more protrusion portion 1422 protruding toward the oval-shaped third sound generating device 1600" may be further provided in at least one side of the first partition 1400' or second partition 1400". For example, the protrusion portion 1422, which protrudes toward the third sound generating device 1600", is further formed in at least one side of the first partition 1400' or second partition 1400". Thus, it is possible to decrease the reduction of sound pressure by one of the standing wave and reflected wave in the middle-low-pitched sound band of the central area of the display panel 100.

Figure 16D:
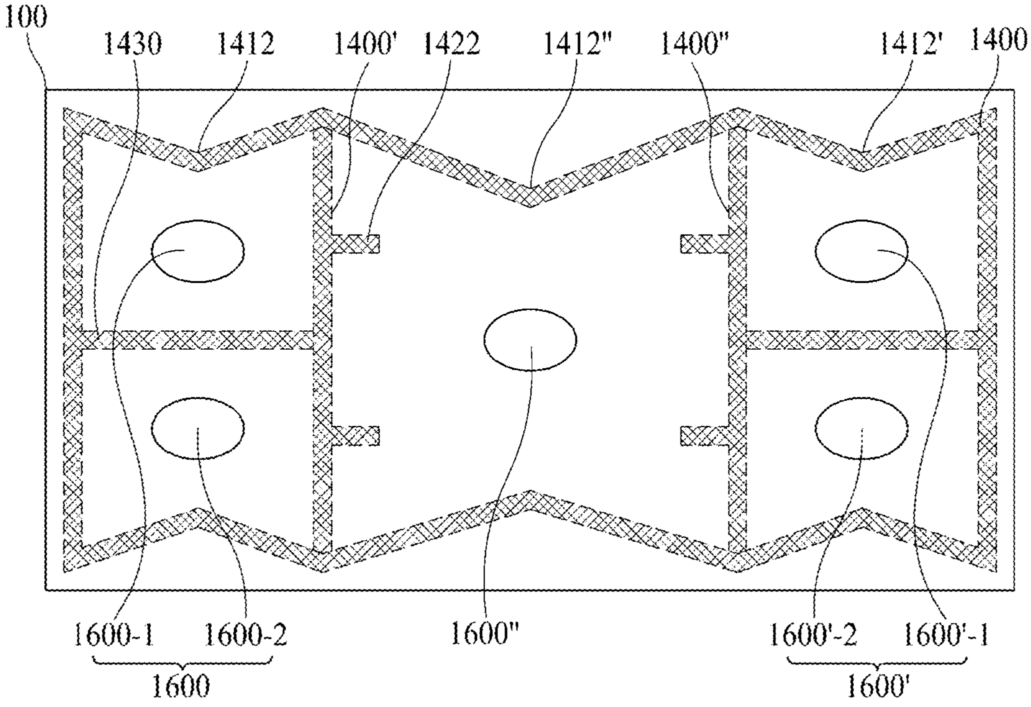

As shown in FIG. 16D, a fourth partition 1430 is further disposed between the two sub sound generating devices 1600-1 and 1600-2 of the first area, and the fourth partition 1430 is further disposed between the two sub sound generating devices 1600'-1 and 1600'-2 of the second area. A description for the fourth partition 1430 is the same as that of FIG. 16B.

In FIGS. 16E to 16H, the two sub sound generating devices of the circle-shaped and oval-shaped sound generating devices are disposed in each of the first and second areas, and the oval-shaped sound generating device is disposed in the third area. With reference to FIGS. 16E to 16H, the first sound generating device 1600 including the two sub sound generating devices 1600-1 and 1600-2 is disposed in the first area, the second sound generating device 1600' including the two sub sound generating devices 1600'-1 and 1600'-2 is disposed in the second area, and the third sound generating device 1600" is disposed in the third area.

In the first area, the circle-shaped sound generating device as the 1-1 sub sound generating device 1600-1 and the oval-shaped sound generating device as the 1-2 sub sound generating device 1600-2 are provided. In the second area, the circle-shaped sound generating device as the 2-1 sub sound generating device 1600'-1 and the oval-shaped sound generating device as the 2-2 sub sound generating device 1600'-2 are provided.

The circle-shaped sound generating device as the 1-1 sub sound generating device 1600-1 of the first area generates the high-pitched sound band, and the oval-shaped sound generating device as the 1-2 sub sound generating device 1600-1 of the first area generates the middle-pitched sound band. The circle-shaped sound generating device as the 2-1 sub sound generating device 1600'-1 of the second area generates the high-pitched sound band, and the oval-shaped sound generating device as the 2-2 sub sound generating device 1600'-1 of the second area generates the middle-pitched sound band. The third sound generating device 1600" of the third area generates the middle-low-pitched sound band. Accordingly, it is possible to provide the display apparatus capable of realizing the stereo sound output and the sound output characteristics of 2.1 channel type.

Figure 16E:
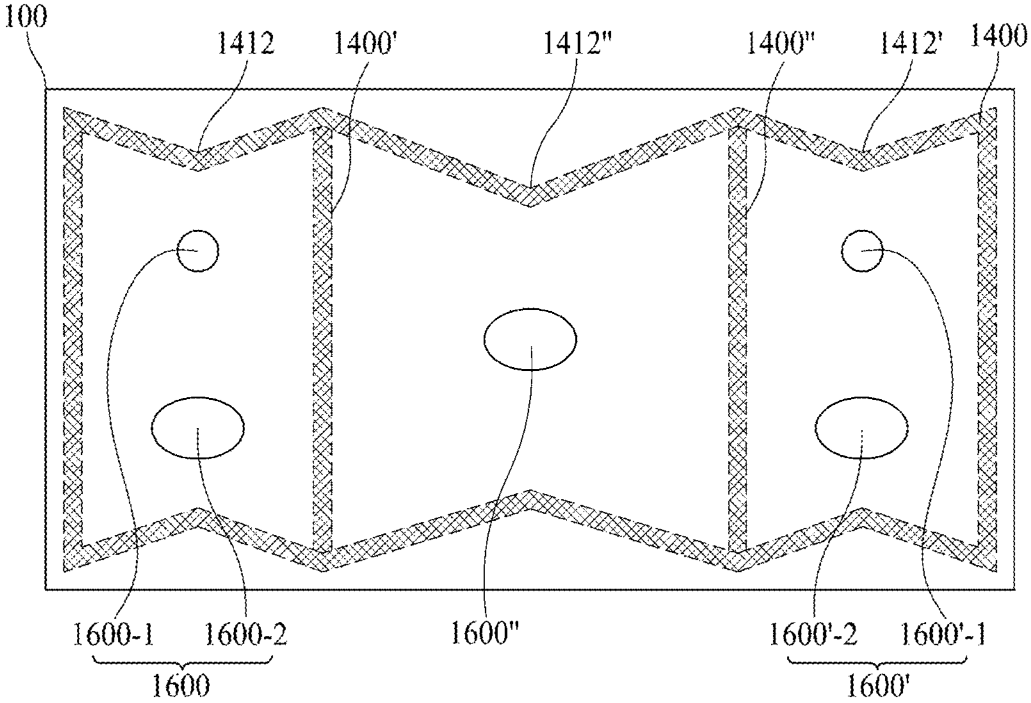
Figure 16F:
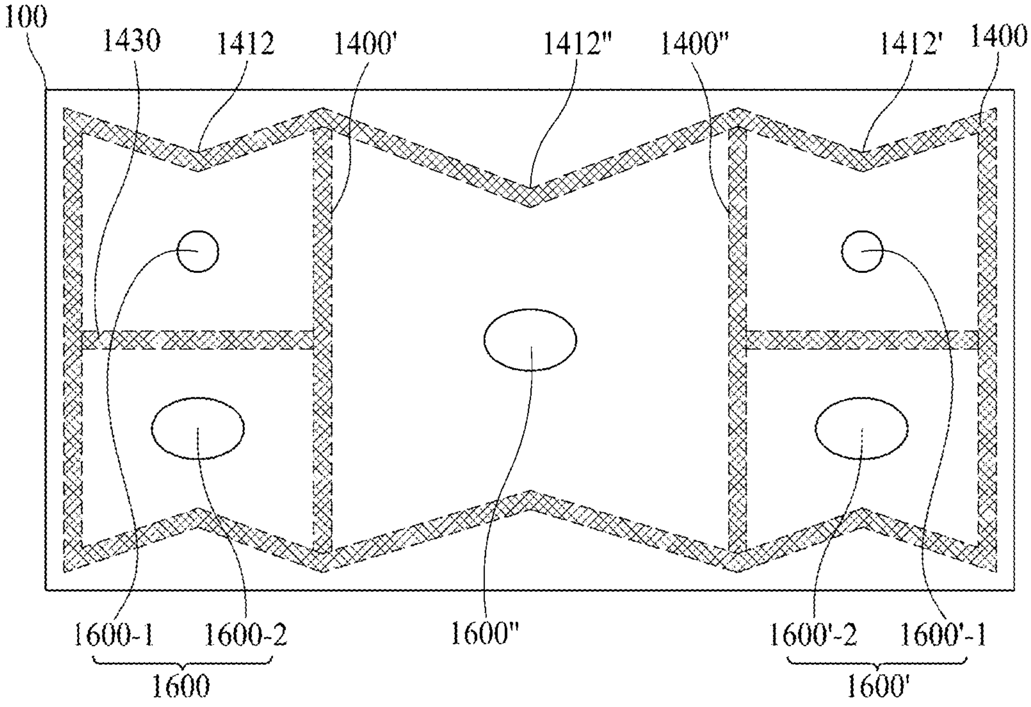
Figure 16G:
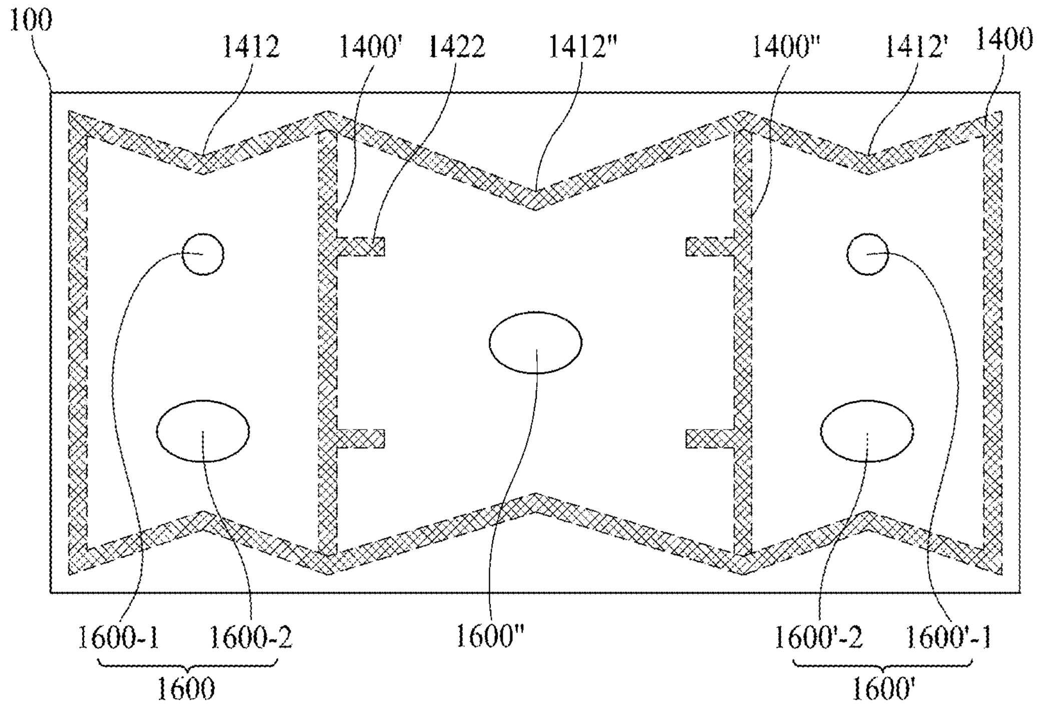
Figure 16H:
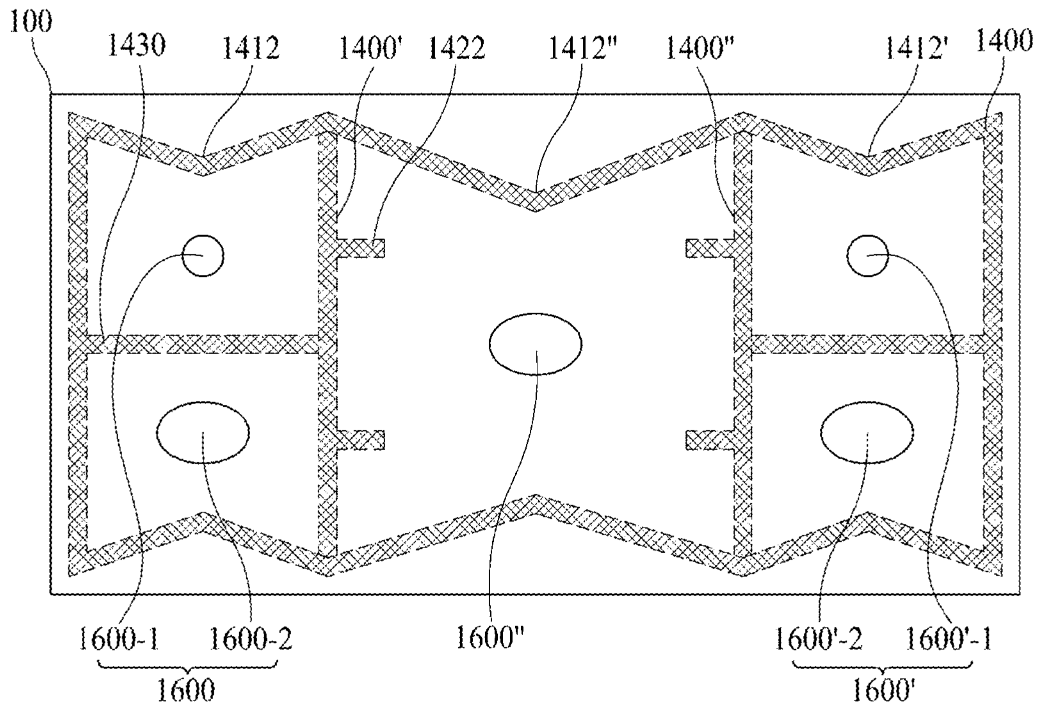
Figure 16I:
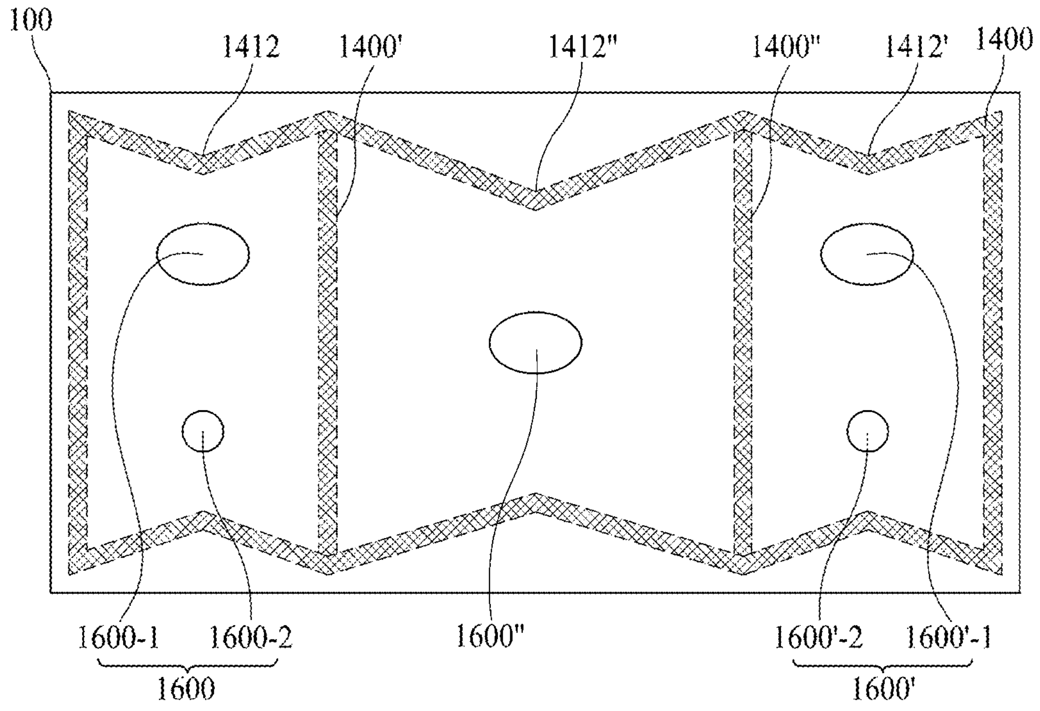
Figure 16J:
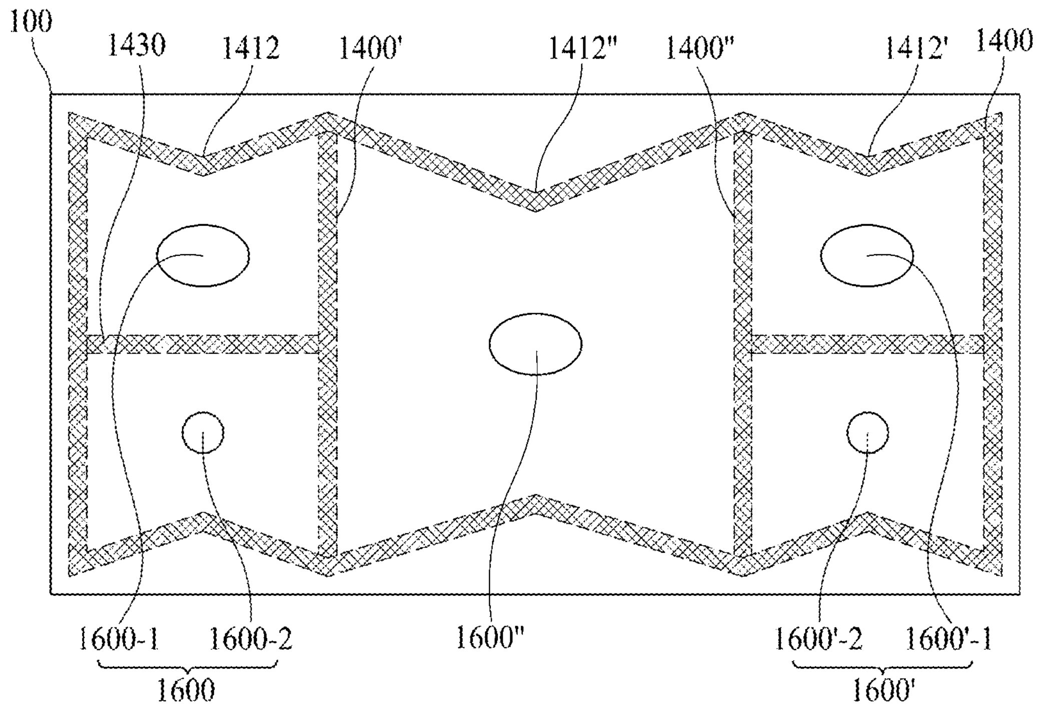
Figure 16K:
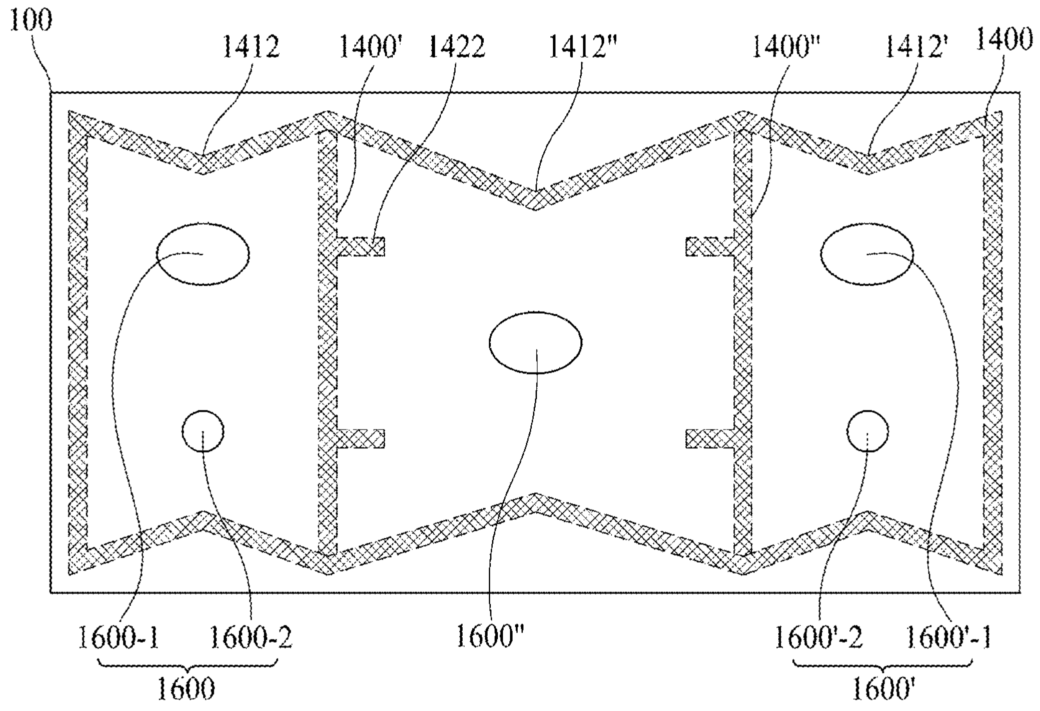

In FIG. 16E, the bent portion 1412 for the circle-shaped sound generating device of the 1-1 sub sound generating device 1600-1 may be bent toward the center of the circle-shaped sound generating device as the 1-1 sub sound generating device 1600-1. As shown in FIG. 14D, the bent portion 1412 for the oval-shaped sound generating device of the 1-2 sub sound generating device 1600-2 may be disposed at an interval corresponding to the proportion of the short axis diameter of the oval shape. The first partition 1400' and the second partition 1400" may be disposed at an interval corresponding to the proportion of the long axis diameter of the oval shape.

The sound generating device, the partition, and the protrusion portion in FIGS. 16E to 16H are similar to those of FIGS. 16A to 16D, and therefore, a detailed description for the same parts will be omitted.

Figure 16L:
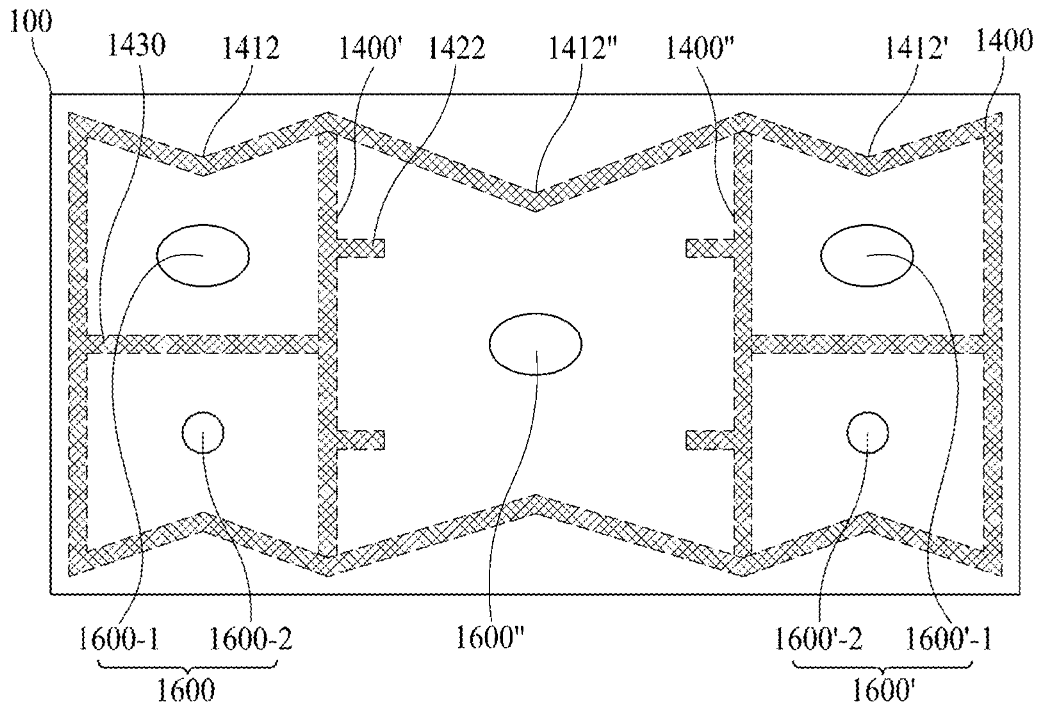

As illustrated in FIGS. 161 to 16L, the first sound generating device 1600 including the two sub sound generating devices 1600-1 and 1600-2 is disposed in the first area, the second sound generating device 1600' including the two sub sound generating devices 1600'-1 and 1600'-2 is disposed in the second area, and the third sound generating device 1600" is disposed in the third area. In the first area, there are the oval-shaped sound generating device as the 1-1 sub sound generating device 1600-1, and the circle-shaped sound generating device as 1-2 sub sound generating device 1600-2. In the second area, there are the oval-shaped sound generating device as the 2-1 sub sound generating device 1600'-1, and the circle-shaped sound generating device as the 2-2 sub sound generating device 1600'-2.

The oval-shaped sound generating device as the 1-1 sub sound generating device 1600-1 of the first area generates the high-pitched sound band, and the circle-shaped sound generating device as the 1-2 sub sound generating device 1600-1 of the first area generates the middle-pitched sound band. The oval-shaped sound generating device as the 2-1 sub sound generating device 1600'-1 of the second area generates the high-pitched sound band, and the circle-shaped sound generating device as the 2-2 sub sound generating device 1600'-1 of the second area generates the middle-pitched sound band. The third sound generating device 1600" of the third area generates the middle-low-pitched sound band. Accordingly, it is possible to provide the display apparatus capable of realizing the stereo sound output and the sound output characteristics of 2.1 channel type.

The sound generating device, the partition and the protrusion portion in FIGS. 161 to 16L are similar to those of FIGS. 16A to 16D, and therefore, a detailed description for the same parts will be omitted.

In FIGS. 16A and 16L, the adhesion member for adhering the display panel and the supporting member to each other may be provided in the periphery of the display panel and the supporting member, as explained with reference to FIGS. 12A to 12C.

FIGS. 16A to 16L show a sealed structure of the third partition. For example, the third partition 1400 may be formed in the zigzag shape and sealed structure, or the third partition 1400 may be formed in the zigzag shape and unsealed structure. If the third partition 1400 has the unsealed structure, a cost for the third partition 1700 is reduced in comparison to the case of the sealed structure. There is no difference in sound output characteristics between the third partition 1700 having the sealed structure and the third partition 1700 having the unsealed structure.

The partition of the unsealed structure will be described with reference to FIGS. 17A to 17L. FIGS. 17A to 17L illustrate another embodiment of the sound generating device and partition in the display apparatus according to the present disclosure.

In FIGS. 17A to 17L, the display panel 100 includes first, second, and third areas. In this case, the first area corresponds to the left area of the display panel 100, the second area corresponds to the right area of the display panel 100, and the third area corresponds to the central area between the left area and the right area of the display panel 100. The first sound generating device disposed in the first area of the display panel 100 and the second sound generating device disposed in the second area of the display panel 100 may generate the middle-high-pitched sound band, and the third sound generating device disposed in the third area of the display panel 100 may generate the middle-low-pitched sound band. Accordingly, the third sound generating device may be a woofer speaker, which enables the low frequency sound output, and the first sound generating device and the second sound generating device enable the stereo sound output, whereby the display apparatus according to the present disclosure may have the sound output characteristics of 2.1 channel type.

In FIGS. 17A to 17D, at least one oval-shaped sound generating device may be disposed in each of the first and second areas, and the oval-shaped sound generating device may be disposed in the third area. For example, the first sound generating device 1600 including the two sub sound generating devices 1600-1 and 1600-2 is disposed in the first area, the second sound generating device 1600' including the two sub sound generating devices 1600'-1 and 1600'-2 is disposed in the second area, and the third sound generating device 1600" is disposed in the third area. The two sub sound generating devices are adjacent to each other, and are parallel to each other with respect to the horizontal direction or vertical direction of the display panel. The first sound generating device 1600, the second sound generating device 1600', and the third sound generating device 1600" are formed of the oval-shaped sound generating devices.

The first sound generating device 1600 disposed in the first area and the second sound generating device 1600' disposed in the second area may generate the middle-high-pitched sound band, and the third sound generating device 1600" disposed in the third area may generate the middle-low-pitched sound band. The first sound generating device 1600 of the first area may include the 1-1 sub sound generating device 1600-1 and the 1-2 sub sound generating device 1600-2. For example, the 1-1 sub sound generating device 1600-1 may generate the high-pitched sound band, and the 1-2 sub sound generating device 1600-2 may generate the middle-pitched sound band. The sound generated in the upper portion of the display panel 100 is relatively higher-ranged than the sound generated in the lower portion of the display panel so that the sound range is provided at the high position.

The second sound generating device 1600' of the second area may include the 2-1 sub sound generating device 1600'-1 and the 2-2 sub sound generating device 1600'-2. For example, the 2-1 sub sound generating device 1600'-1 may generate the high-pitched sound band, and the 2-2 sub sound generating device 1600'-2 may generate the middle-pitched sound band. The sound generated in the upper portion of the display panel 100 is relatively higher-ranged than the sound generated in the lower portion of the display panel so that the sound range is provided at the high position.

The first partition 1400' is disposed between the first sound generating device 1600 and the third sound generating device 1600", and the second partition 1400" is disposed between the second sound generating device 1600' and the third sound generating device 1600". The first partition 1400' prevents the vibration of the display panel 100 from being transferred from the first area to the third area, and the second partition 1400" prevents the vibration of the display panel 100 from being transferred from the second area to the third area. The first partition 1400' prevents the vibration of the display panel 100 from being transferred from the third area to the first area, and the second partition 1400" prevents the vibration of the display panel 100 from being transferred from the third area to the second area. The third partition 1400 is disposed in the periphery of the display panel 100, and the third partition 1400 is formed in the sealed structure.

As explained in FIG. 14D, the partition may be disposed in consideration of the ratio of the long axis diameter to the short axis diameter in the oval shape. The bent portion may be bent in the short axis direction of the oval-shaped sound generating device 1600 and 1600'. The first partition 1400' is disposed at an interval corresponding to the proportion of the long axis diameter of the oval-shaped first sound generating device 1600, and the second partition 1400" is disposed at an interval corresponding to the proportion of the long axis diameter of the oval-shaped second sound generating device 1600'. The third partition 1400 is disposed at an interval corresponding to the proportion of the short axis diameter of the first sound generating device and the second sound generating device 1600 and 1600', and includes the bent portions 1412, 1412', and 1412" that are bent in the short axis direction of the oval-shaped sound generating device.

The third partition 1400 is disposed in the periphery of the display panel 100, and the third partition 1400 is formed in the unsealed structure. For example, the first bent portion 1412, the second bent portion 1412' and the third bent portion 1412" may be formed in the unsealed structure, or at least one of the first bent portion 1412, the second bent portion 1412' and the third bent portion 1412" may be formed in the unsealed structure.

Figure 17A:
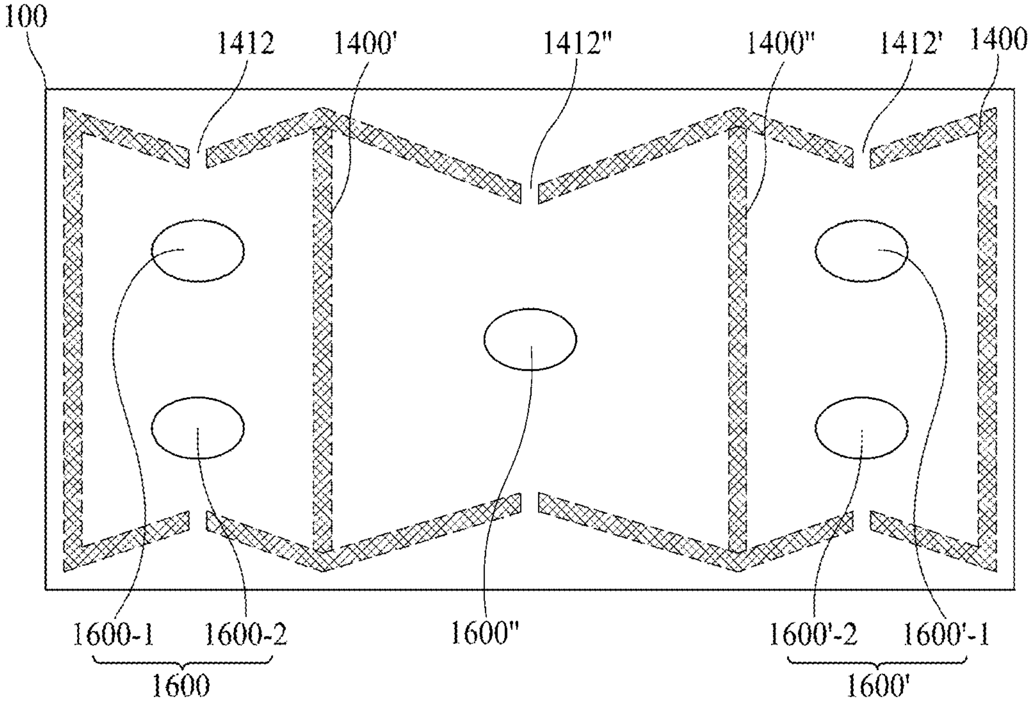
FIGS. 17A to 17L illustrate another embodiment of the sound generating device and partition in the display apparatus according to the present disclosure.
Figure 17B:
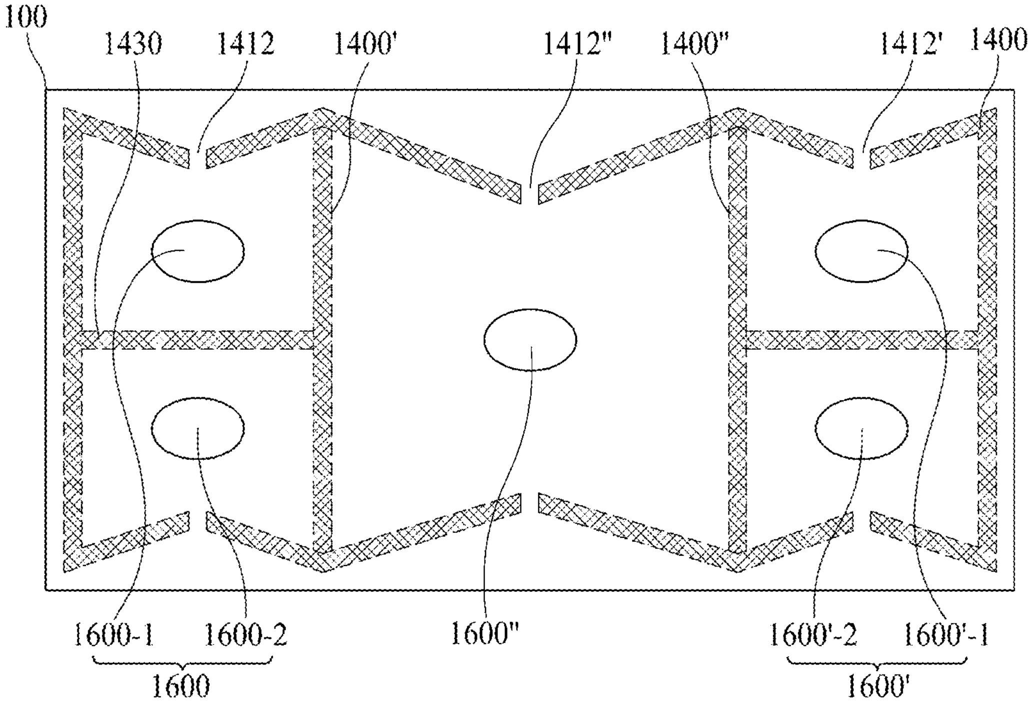
Figure 17C:
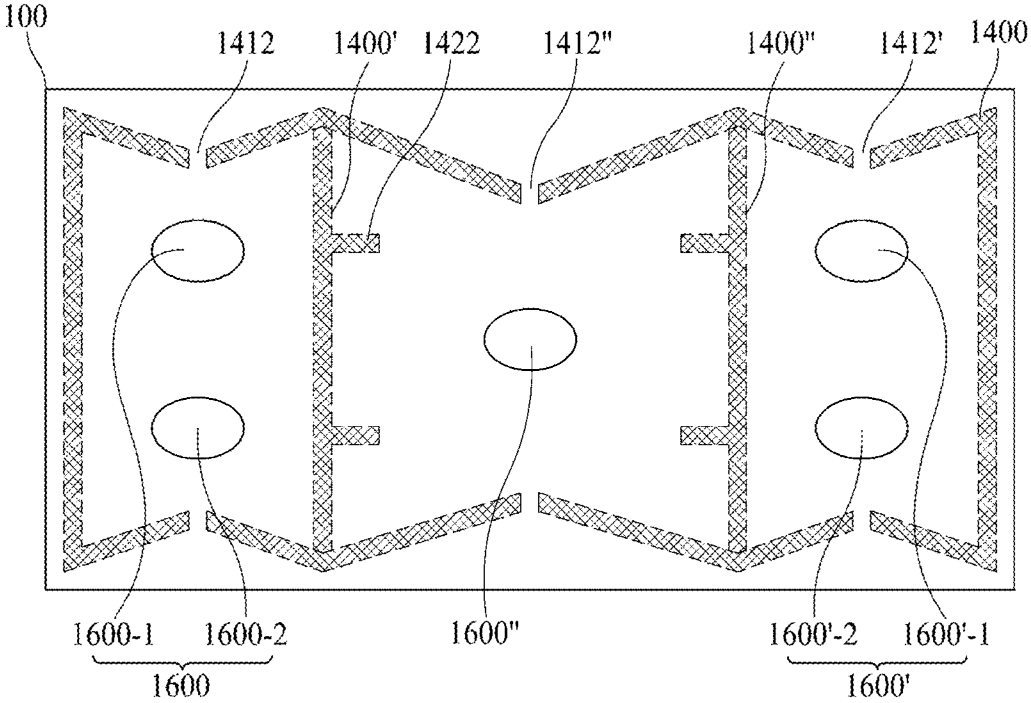
Figure 17D:
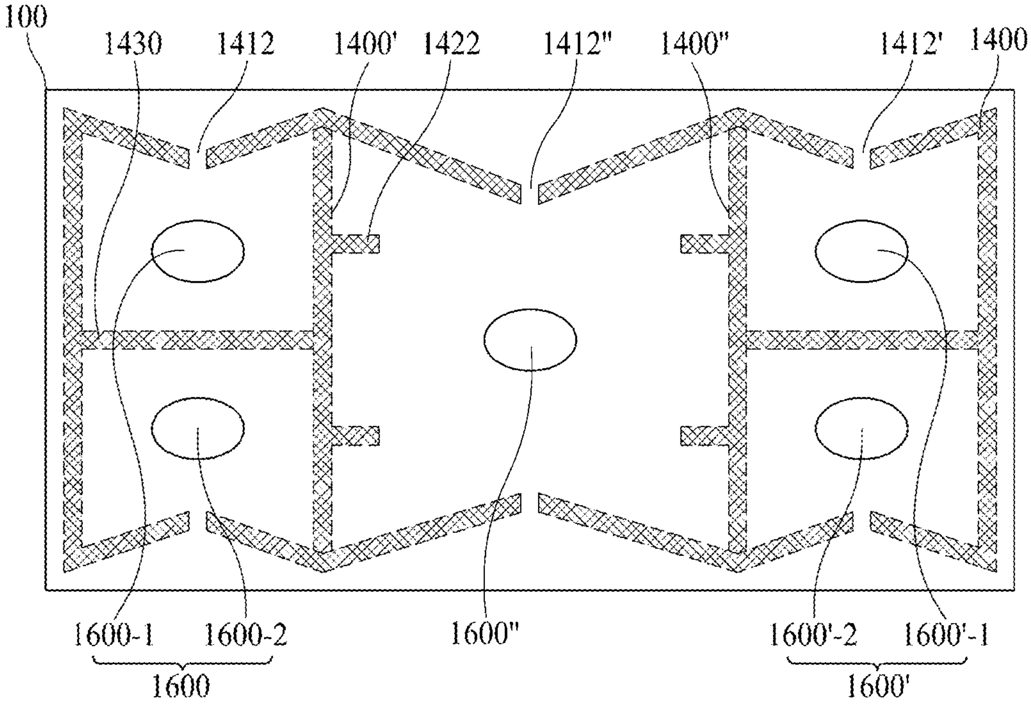

With reference to FIG. 17C, the third partition 1400 including the bent portion 712 that is bent toward the short axis direction of the oval-shaped sound generating device 1600, 1600' and 1600" may be provided, and one or more protrusion portion 1422 protruding toward the oval-shaped third sound generating device 1600" may be further provided in at least one side of the first partition 1400' or second partition 1400". For example, the protrusion portion 1422, which protrudes toward the third sound generating device 1600", is formed in at least one side of the first partition 1400' or second partition 1400". Thus, it is possible to decrease the reduction of sound pressure by one of the standing wave and reflected wave in the middle-low-pitched sound band of the central area of the display panel 100.

Figure 17E:
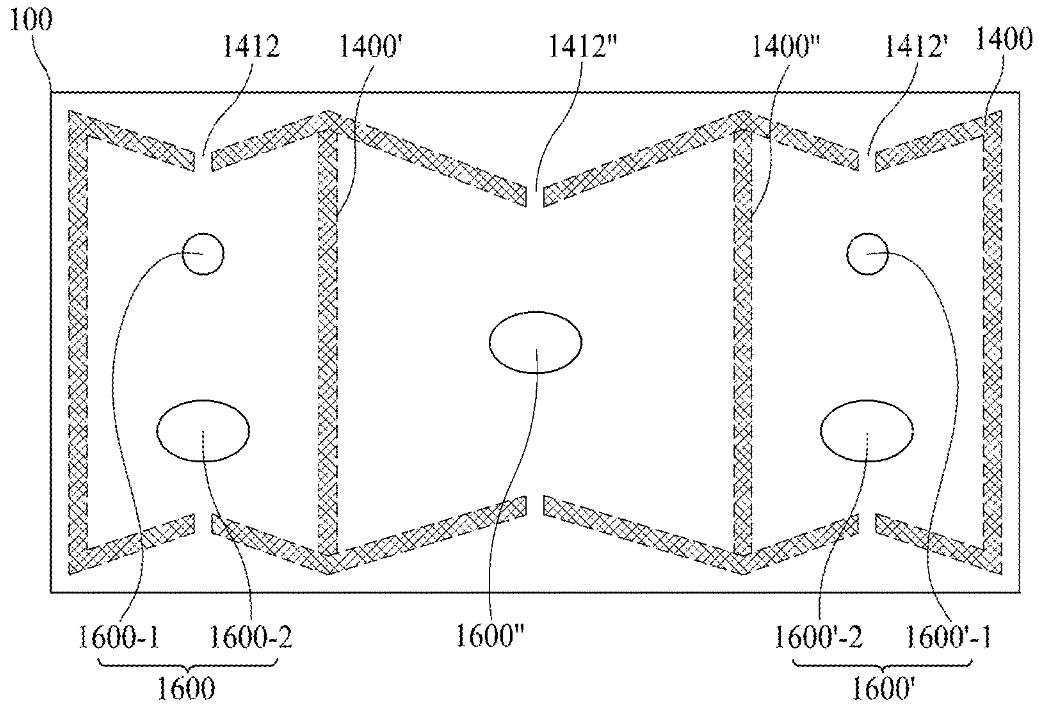
Figure 17F:
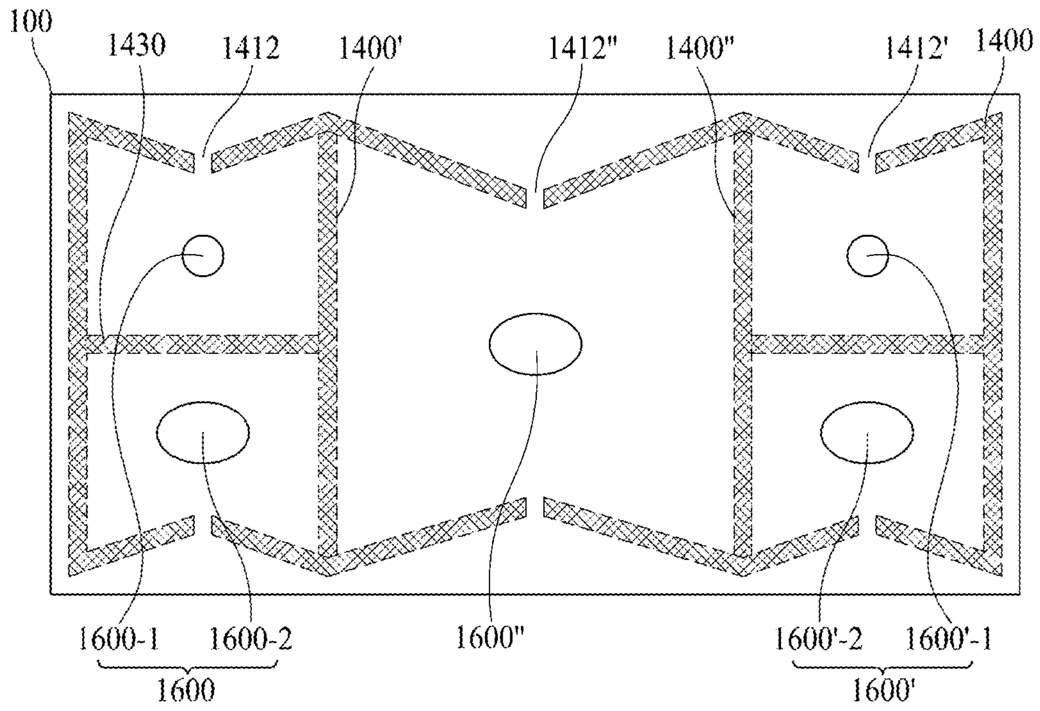
Figure 17G:
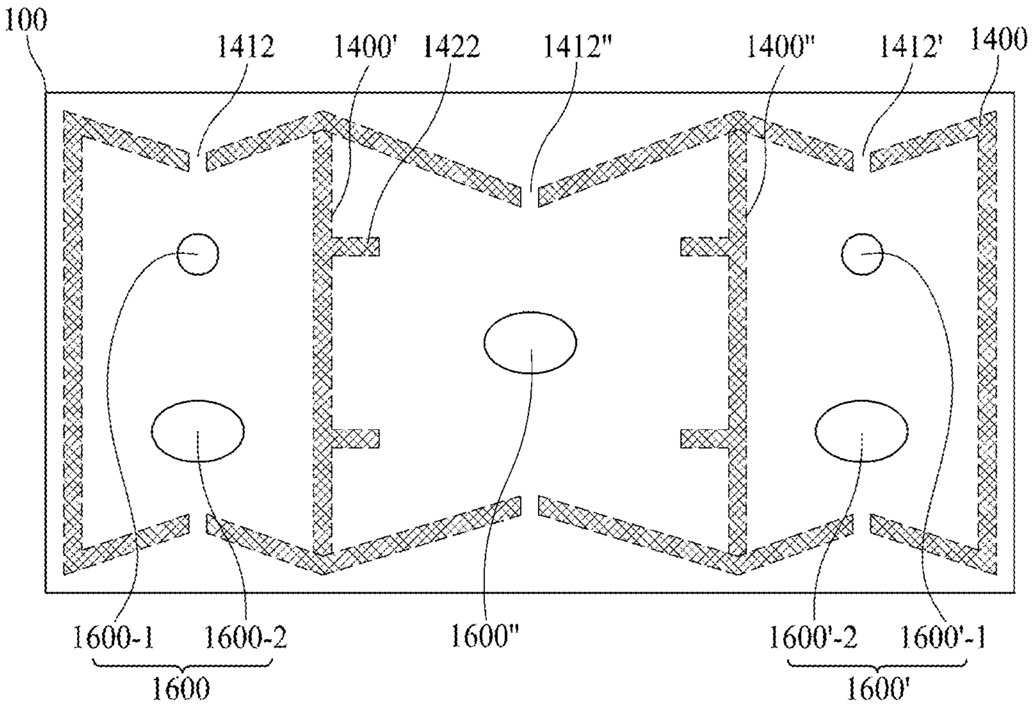
Figure 17H:
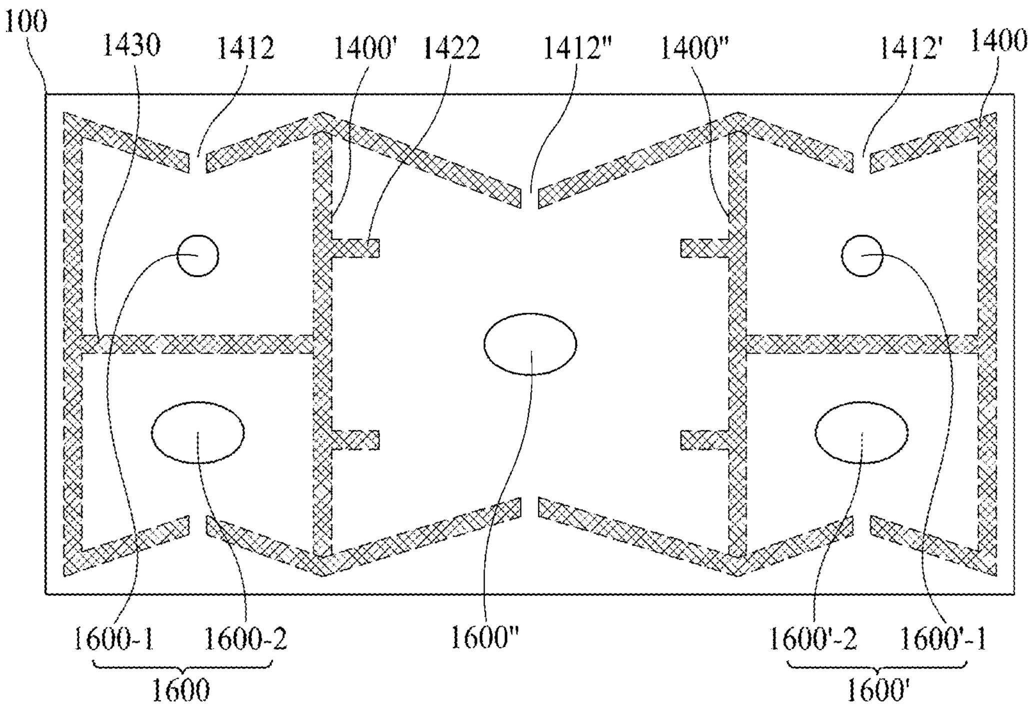
Figure 17I:
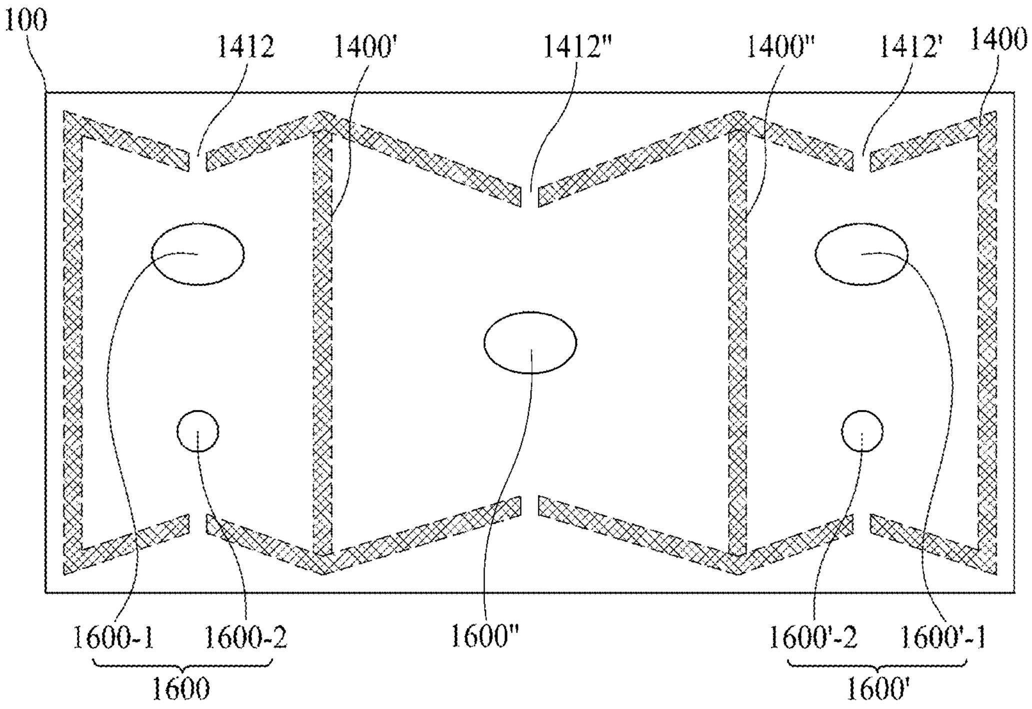
Figure 17J:
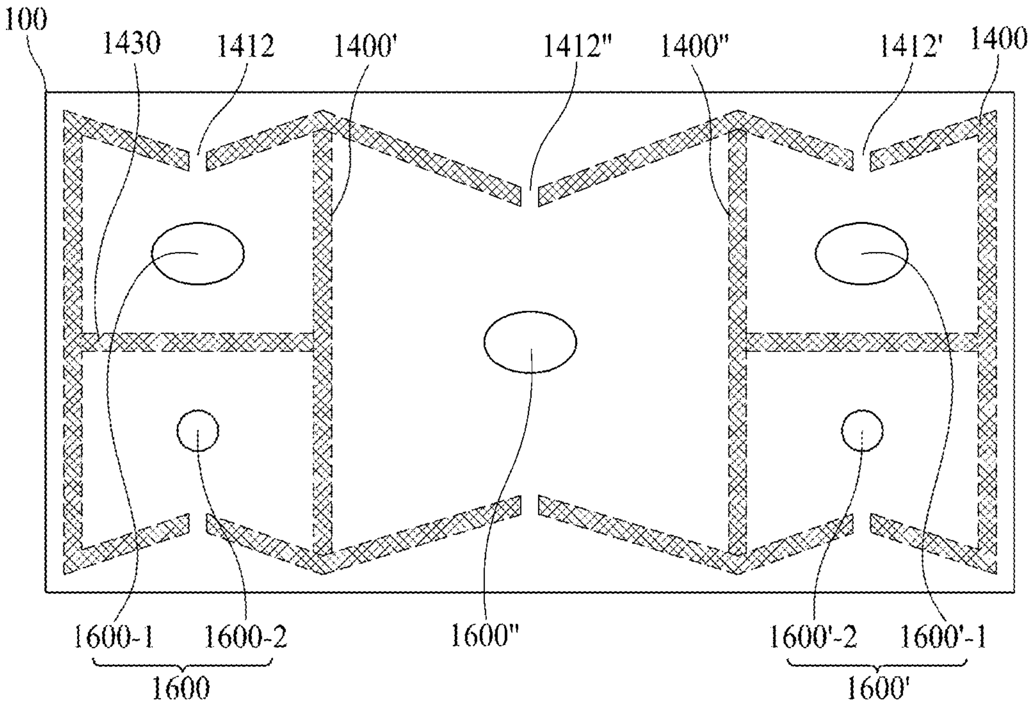
Figure 17K:
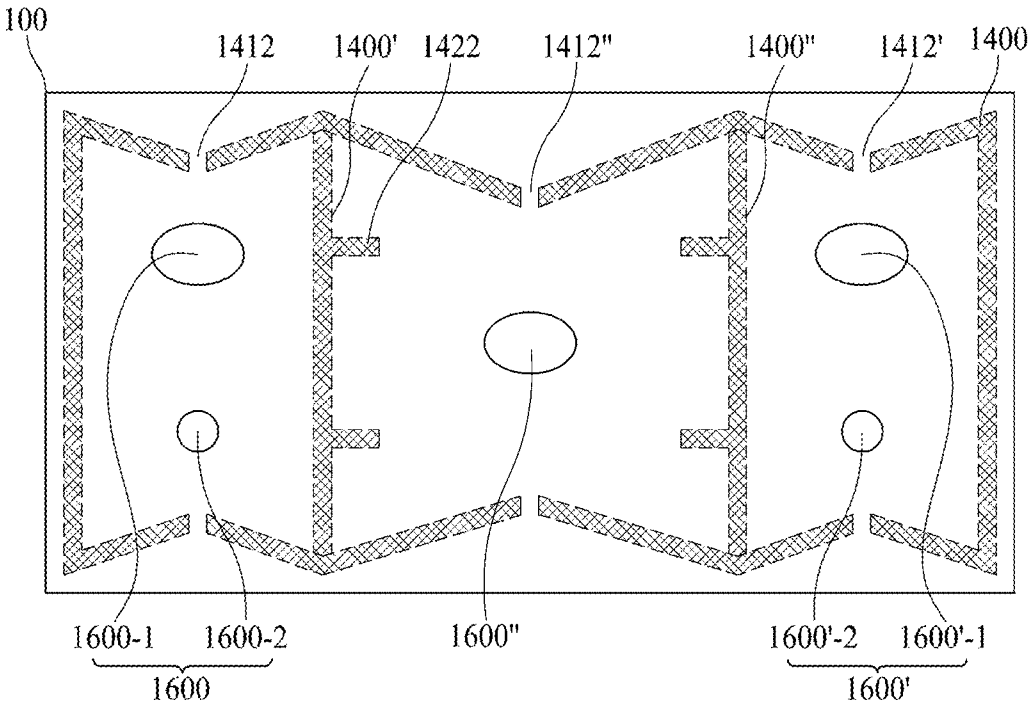

As shown in FIG. 17E, the bent portion 1412 for the circle-shaped sound generating device of the 1-1 sub sound generating device 1600-1 may be bent toward the center of the circle-shaped sound generating device corresponding to the 1-1 sub sound generating device 1600-1. As explained in FIG. 14D, the bent portion 1412 for the oval-shaped sound generating device of the 1-2 sub sound generating device 1600-2 may be disposed at an interval corresponding to the proportion of the short axis diameter of the oval shape. The first partition 1400' and the second partition 1400" may be disposed at an interval corresponding to the proportion of the long axis diameter in the oval shape of the third sound generating device 1600".

Figure 17L:
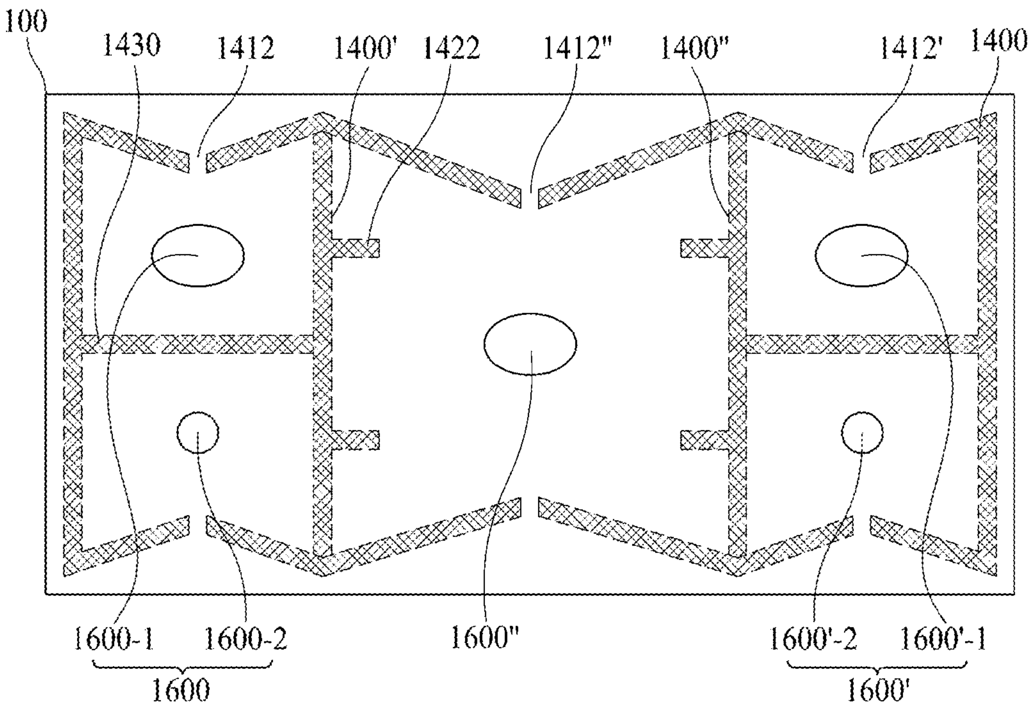

A description of FIGS. 17A to 17L is similar to that of FIGS. 16A to 16L. In FIGS. 17A to 17L, the first bent portion 1412, the second bent portion 1412' and the third bent portion 1412" are formed in the unsealed structure, or at least one of the first bent portion 1412, the second bent portion 1412' and the third bent portion 1412" may be formed in the unsealed structure. In FIGS. 17A and 17L, the adhesion member for adhering the display panel and the supporting member to each other may be provided in the periphery of the display panel and the supporting member, as explained with reference to FIGS. 12A to 12C.

According to an embodiment of the present disclosure, a display apparatus comprises a display panel configured to display an image; and a sound generating device on the rear surface of the display panel and configured to generate sound by vibrating the display panel, wherein the sound generating device includes a plate; a magnet and a center pole on the plate; and an oval-shaped bobbin around the center pole.

According to one or more embodiments of the present disclosure, the bobbin may be formed of the polyimide film.

According to one or more embodiments of the present disclosure, a coil may be disposed around the bobbin, and the coil may include a first metal layer for dissipating heat generated in the sound generating device, and a second metal layer for covering the first metal layer.

According to one or more embodiments of the present disclosure, the first metal layer may be formed of aluminum (Al), and the second metal layer may be formed of one among copper (Cu), silver (Ag) and gold (Au).

According to one or more embodiments of the present disclosure, the display apparatus may further include a heat-dissipation member between the display panel and the sound generating device.

According to one or more embodiments of the present disclosure, the display apparatus may further include a supporting member on the rear surface of the display panel and configured to support the sound generating device.

According to one or more embodiments of the present disclosure, the supporting member may be formed of one among metal, glass and plastic materials, or at least two among metal, glass and plastic materials.

According to one or more embodiments of the present disclosure, the sound generating device having the oval-shaped bobbin may generate middle-high-pitched sound band.

According to an embodiment of the present disclosure, a display apparatus comprises a display panel configured to display an image, the display panel having a first area and a second area; a sound generating device on the first and second areas; and at least one partition between the first and second areas, wherein the sound generating device for generating sound by vibrating the display panel has an oval shape.

According to one or more embodiments of the present disclosure, the display apparatus may further include at least one low-pitched sound generating device in the periphery of the display panel.

According to one or more embodiments of the present disclosure, the display apparatus may further include at least one low-pitched sound generating device in the outer portion the display panel corresponding to the first and second areas.

According to one or more embodiments of the present disclosure, the display apparatus may further include a third partition in the periphery of the display panel, wherein the third partition includes the bent portion that is bent in the short axis direction of the oval-shaped sound generating device.

According to one or more embodiments of the present disclosure, the display apparatus may further include the third partition in the periphery of the display panel, wherein the at least one partition includes first and second partitions, and the third partition includes a bent portion that is bent in a short axis direction of the oval-shaped sound generating device, and at least one protrusion portion that protrudes from at least one side of the first and second partitions toward the oval-shaped sound generating device.

According to one or more embodiments of the present disclosure, the display apparatus may further include a third partition in the periphery of the display panel, wherein the third partition is disposed at an interval corresponding to the proportion of the short axis direction in the oval-shaped sound generating device, and at least one partition is disposed at an interval corresponding to the proportion of the long axis direction in the oval-shaped sound generating device.

According to one or more embodiments of the present disclosure, the stereo sound may be generated in the first and second areas of the display panel.

According to one or more embodiments of the present disclosure, the sound generating device may include a magnet, a center pole, a bobbin and a coil, wherein the bobbin may be formed of the polyimide film, and the coil may be formed of aluminum (Al) cladded with one among copper (Cu), silver (Ag), and gold (Au).

According to one or more embodiments of the present disclosure, the sound generating device may include a magnet, a center pole, a bobbin and a coil, wherein a ratio of the long axis diameter to the short axis diameter in the bobbin is 1.3~2:1.

According to an embodiment of the present disclosure, a display apparatus comprises a display panel configured to display an image, the display panel having first, second and third areas; at least one sound generating device on at least one of the first, second and third areas; at least one of first partition between the first and third areas; and at least one of second partition between the second and third areas, wherein at least one sound generating device includes a circle-shaped or an oval-shaped sound generating device and is configured to generate sound by vibrating the display panel.

According to one or more embodiments of the present disclosure, the first area may correspond to the right area of the display panel, the second area may correspond to the left area of the display panel, and the third area may correspond to the central area of the display panel.

According to one or more embodiments of the present disclosure, the middle-high-pitched sound band may be generated in the first and second areas, and the middle-low-pitched sound band may be generated in the third area.

According to one or more embodiments of the present disclosure, the display apparatus may further include a third partition in the periphery of the display panel, wherein the third partition includes the bent portion that is bent in the short axis direction of the oval-shaped sound generating device.

According to one or more embodiments of the present disclosure, the display apparatus may further include a third partition in the periphery of the display panel, wherein the third partition includes a bent portion that is bent in the short axis direction of the oval-shaped sound generating device, and one or more protrusion portions that protrude from at least one side of the first and second partitions toward the sound generating device.

According to one or more embodiments of the present disclosure, the display apparatus may further include a third partition in the periphery of the display panel, the third partition is disposed at an interval corresponding to the proportion of the short axis direction in the oval-shaped sound generating device, and the at least one first and second partitions are disposed at an interval corresponding to the proportion of the long axis direction in the oval-shaped sound generating device.

According to one or more embodiments of the present disclosure, the oval-shaped sound generating device may be disposed in each of the first, second and third areas.

According to one or more embodiments of the present disclosure, the at least one oval-shaped sound generating device may be disposed in each of the first and second areas, and the oval-shaped sound generating device may be disposed in the third area.

According to one or more embodiments of the present disclosure, the display apparatus may further include a fourth partition between each of the at least one sound generating device, wherein the at least one oval-shaped sound generating device is disposed in each of the first and second areas, and the oval-shaped sound generating device is disposed in the third area.

According to one or more embodiments of the present disclosure, the oval-shaped sound generating device and the circle-shaped sound generating device may be disposed in each of the first and second areas, and the oval-shaped sound generating device may be disposed in the third area.

According to one or more embodiments of the present disclosure, the display apparatus may further include the fourth partition between the oval-shaped sound generating device and the circle-shaped sound generating device, wherein the oval-shaped sound generating device and circle-shaped sound generating device are disposed in each of the first and second areas, and the oval-shaped sound generating device is disposed in the third area.

According to one or more embodiments of the present disclosure, the sound generating device may include a magnet, a center pole, a bobbin and a coil, wherein the bobbin is formed of the polyimide film, and the coil is formed of aluminum (Al) cladded with one among copper (Cu), silver (Ag), and gold (Au).

According to one or more embodiment of the present disclosure, the sound generating device may include a magnet, a center pole, a bobbin and a coil, wherein a ratio of a long axis diameter to a short axis diameter in the bobbin is 1.3~2:1.

According to the present disclosure, the display apparatus includes the sound generating device capable of generating sound by vibrating the display panel, whereby the sound is output to the front direction of the display panel, to thereby improve a user's immersion.

The display apparatus according to the present disclosure may include the sound generating device capable of generating sound by vibrating the display panel. Thus, there is no need for the speaker so that it enables to improve the degree of freedom on design of the set apparatus and arrangement of the speaker.

With the display apparatus according to the present disclosure, the supporting member and the sound generating device may be fixed by the use of screw and nut in the supporting member, thereby reducing the thickness of the display panel.

The display apparatus according to the present disclosure may include the heat-dissipation member disposed on the display panel so that it is possible to improve the sound output characteristics in the low sound, and to prevent picture quality of the display panel from being deteriorated by the heat generated in accordance with the driving of the sound generating device.

Because the display apparatus according to the present disclosure may include the oval-shaped sound generating device, it is possible to provide the display apparatus with the improved sound quality of the middle-pitched sound band and high-pitched sound band.

Because the display apparatus according to the present disclosure may include at least one partition between the sound generating devices, it can enable the separation of sound by the partition, so that it is possible to realize the stereo sound, and to improve the sound output characteristics.

The display apparatus according to the present disclosure may include the sound generating device for generating the middle-high-pitched sound band by vibrating the display panel, and the low-pitched sound generating device for generating the low sound band so that it is possible to realize the good sound output characteristics in the entire frequency range or full range.

In the display apparatus according to the present disclosure, the middle-low-pitched sound generating device may be disposed in the central area of the display panel, and the middle-high-pitched sound generating devices are respectively disposed in the left and right areas of the display panel, so that it is possible to realize the good sound output characteristics in the wide sound band or full sound band, and to realize the stereo sound output, and the sound output characteristics of 2.1 channel type.

The display apparatus according to the present disclosure may include the partition with the bent portion or the protrusion portion so that it is possible to prevent deterioration of sound quality caused by the standing wave or reflected wave in the display panel, and to improve the sound output characteristics.

According to an embodiment of the present disclosure, a display apparatus comprises a display panel configured to display an image; and a sound generating device on a rear surface of the display panel and configured to vibrate the display panel to generate sound, wherein the sound generating device includes: a plate; a magnet and a center pole on the plate; and an oval-shaped bobbin around the center pole.

According to one or more embodiments, the magnet may form the center pole.

According to one or more embodiments, a ratio of a long axis diameter to a short axis diameter in the bobbin may be between 1.3:1 and 2.0:1.

According to one or more embodiments, the bobbin may be formed of a polyimide film.

According to one or more embodiments, a coil may be disposed around the bobbin, and the coil may include a first metal layer for dissipating heat generated in the sound generating device, and a second metal layer for covering the first metal layer.

According to one or more embodiments, the first metal layer may include aluminum (Al), and the second metal layer may include one among copper (Cu), silver (Ag), and gold (Au).

According to one or more embodiments, the display apparatus may further comprise a heat-dissipation member between the display panel and the sound generating device.

According to one or more embodiments, the display apparatus may further comprise a supporting member on the rear surface of the display panel and configured to support the sound generating device, wherein the supporting member includes at least one among metal, glass, and plastic materials.

According to one or more embodiments, the sound generating device having the oval-shaped bobbin generates sound in a middle-high-pitched sound band.

According to an embodiment of the present disclosure, a display apparatus comprises a display panel configured to display an image, the display panel having a first area and a second area; first and second sound generating devices on the first and second areas, respectively; and at least one partition between the first and second areas, wherein the first and second sound generating devices are configured to vibrate the display panel to generate sound, and wherein at least one of the first and second sound generating devices has an oval shape.

According to one or more embodiments, the display apparatus may further comprise at least one low-pitched sound generating device disposed at an outer portion of the display panel.

According to one or more embodiments, the display apparatus may further comprise at least two low-pitched sound generating devices disposed at an outer portion of the display panel respectively corresponding to the first and second areas.

According to one or more embodiments, the display apparatus may further comprise a third partition in the periphery of the display panel, wherein the third partition includes a bent portion that is bent in a short axis direction of the oval-shaped sound generating device.

According to one or more embodiments, the display apparatus may further comprise a third partition in the periphery of the display panel, wherein the at least one partition includes first and second partitions, and wherein the third partition includes a bent portion that is bent in a short axis direction of the oval-shaped sound generating device, and at least one protrusion portion that protrudes from at least one side of the first and second partitions toward the oval-shaped sound generating device.

According to one or more embodiments, the display apparatus may further comprise a third partition in the periphery of the display panel, wherein a portion of the third partition is separated from the oval-shaped sound generating device by a first distance and the at least one partition is separated from the oval-shaped sound generating device by a second distance, and wherein a ratio of the first distance to the second distance is substantially equal to a ratio of a short axis diameter to a long axis diameter of the oval-shaped sound generating device.

According to one or more embodiments, a stereo sound is generated in the first and second areas of the display panel.

According to one or more embodiments, the at least one of the first and second sound generating device includes a magnet, a center pole, a bobbin, and a coil, wherein a ratio of a long axis diameter to a short axis diameter in the bobbin is between 1.3:1 and 2.0:1.

According to an embodiment of the present disclosure, a display apparatus comprises a display panel configured to display an image, the display panel having first, second, and third areas; a first sound generating device on one of the first, second, and third areas; a first partition between the first and third areas; and a second partition between the second and third areas, wherein the first sound generating device includes an oval-shaped sound generator and is configured to vibrate the display panel to generate sound.

According to one or more embodiments, the display apparatus further comprises a second sound generating device on another one of the first, second, and third areas.

According to one or more embodiments, the display apparatus further comprises a third sound generating device on a remaining one of the first, second, and third areas.

According to one or more embodiments, a middle-high-pitched sound band is generated in the first and second areas, and a middle-low-pitched sound band is generated in the third area.

According to one or more embodiments, the display apparatus further comprises a third partition in the periphery of the display panel, wherein the third partition includes a bent portion that is bent in a short axis direction of the oval-shaped sound generator.

According to one or more embodiments, the third partition further includes at least one protrusion that protrudes from at least one side of the third partition toward the oval-shaped sound generator.

According to one or more embodiments, the display apparatus further comprises a third partition in the periphery of the display panel, wherein the third partition includes a bent portion that is bent in a short axis direction of the oval-shaped sound generator, and at least one protrusion that protrudes from at least one side of the first and second partitions toward the oval-shaped sound generator.

According to one or more embodiments, the display apparatus further comprises a third partition in the periphery of the display panel, wherein the third partition is disposed at an interval corresponding to the proportion of the short axis direction in the oval-shaped sound generator, wherein the at least one sound generating device includes an oval-shaped sound generator, and wherein the at least one first and second partitions are disposed at an interval corresponding to the proportion of the long axis direction in the oval-shaped sound generator.

According to one or more embodiments, the display apparatus further comprises a fourth sound generating device in the first area and a fifth sound generating device in the second area.

According to one or more embodiments, the display apparatus further comprises a fourth partition in the first area between the first and fourth sound generating devices, and a fifth partition in the second area between the second and fifth sound generating devices.

According to one or more embodiments, the second sound generating device may include an oval-shaped sound generator, the fourth sound generating device may include one of an oval-shaped sound generator and a circle-shaped sound generator, and the fifth sound generating device may include one of an oval-shaped sound generator and a circle-shaped sound generator.

According to one or more embodiments, the first sound generating device may include a magnet, a center pole, a bobbin, and a coil, wherein the bobbin has an oval shape, and wherein a ratio of a long axis diameter to a short axis diameter in the bobbin is between 1.3:1 and 2.0:1.

It will be apparent to those skilled in the art that various modifications and variations can be made in the display apparatus of the present disclosure without departing from the technical idea or scope of the disclosure. Thus, it is intended that the present disclosure cover the modifications and variations of this disclosure provided they come within the scope of the appended claims and their equivalents.

What is claimed is:

1. A display apparatus, comprising:

a display panel configured to display an image by emitting light, the display panel having a first area, a second area, and a third area;

a first sound generating device in the first area corresponding to a left area of the display panel, the first sound generating device having two sub-sound generating devices which are parallel to each other with respect to a vertical direction of the display panel;

a second sound generating device in the second area corresponding to a right area of the display panel, the second sound generating device having two sub-sound generating devices which are parallel to each other with respect to a vertical direction of the display panel;

a third sound generating device in the third area corresponding to a central area of the display panel;

a first partition between the first area and the third area;

a second partition between the second area and the third area; and a third partition in a periphery of the display panel, wherein the third partition includes one of a sealed structure and an unsealed structure.

2. The display apparatus of claim 1, wherein the third partition includes:

a first side and a second side perpendicular to the first side; and at least one bent portion in at least one of the first side and the second side of the third partition.

3. The display apparatus of claim 2, wherein the at least one bent portion is disposed toward the at least one or more of the first sound generating device, the second sound generating device, and the third sound generating device.

4. The display apparatus of claim 2, wherein the third sound generating device include an oval-shaped bobbin, and wherein the at least one bent portion in the third area is configured to bent in a direction parallel to a short axis direction of the oval-shaped bobbin.

5. The display apparatus of claim 1, wherein the third partition includes:

a first side and a second side perpendicular to the first side;

at least one bent portion in at least one of the first side and the second side of the third partition; and one or more protrusions at the first partition and the second partition.

6. The display apparatus of claim 5, wherein the at least one bent portion is disposed toward the at least one or more of the first sound generating device, the second sound generating device, and the third sound generating device.

7. The display apparatus of claim 5, wherein the at least one bent portion in the third area is configured to bent in a direction parallel to a short axis direction of the oval-shaped bobbin.

8. The display apparatus of claim 5, wherein the one or more protrusions is configured to extend toward the third sound generating device.

9. The display apparatus of claim 1, wherein at least one of the two sub-sound generating devices includes an oval-shaped bobbin.

10. The display apparatus of claim 9, further comprising a fourth partition between the two sub-sound generating devices in each of the first area and the second area.

11. The display apparatus of claim 9, further comprising a fourth partition between the two sub-sound generating devices in each of the first area and the second area, wherein the third partition includes:

a first side and a second side perpendicular to the first side; and at least one bent portion in at least one the first side and the second side of the third partition.

12. The display apparatus of claim 1, wherein at least one of the first to third sound generating devices includes an oval-shaped bobbin, and wherein a ratio of a long axis diameter to a short axis diameter in the oval-shaped bobbin is between 1.3:1 and 2.0:1.

13. The display apparatus of claim 1, further comprising a metal plate between the display panel and the first to the third sound generating device.

14. The display apparatus of claim 13, wherein a size of the metal plate is larger than a size of the first to the third sound generating device.

15. The display apparatus of claim 1, wherein a size of the third area is larger than a size of the first area and a size of the second area.

16. The display apparatus of claim 1, wherein a size of the third area is same as a size of the first area and a size of the second area.

17. The display apparatus of claim 1, wherein at least one of the first sound generating device and the second sound generating device includes a magnet, a center pole, an oval-shaped bobbin, and a coil.

* * * * *